US005604824A

United States Patent [19]
Chui et al.

[11] Patent Number: 5,604,824
[45] Date of Patent: Feb. 18, 1997

[54] METHOD AND APPARATUS FOR COMPRESSION AND DECOMPRESSION OF DOCUMENTS AND THE LIKE USING SPLINES AND SPLINE-WAVELETS

[75] Inventors: Charles K. Chui; Pak-Kay Yuen, both of College Station, Tex.

[73] Assignee: Houston Advanced Research Center, The Woodlands, Tex.

[21] Appl. No.: 310,731

[22] Filed: Sep. 22, 1994

[51] Int. Cl.$^6$ .................................................... G06K 9/36
[52] U.S. Cl. .................... 382/248; 382/232; 364/487; 364/807; 364/728.01; 73/602
[58] Field of Search ...................... 382/56, 248; 364/487, 364/481, 728.01, 421, 807; 367/50; 348/407; 73/602

[56] References Cited

U.S. PATENT DOCUMENTS

| | | | |
|---|---|---|---|
| 4,974,187 | 11/1990 | Lawton | 364/728.01 |
| 5,014,134 | 5/1991 | Lawton et al. | 358/261.3 |
| 5,101,446 | 3/1992 | Resnikoff et al. | 382/248 |
| 5,253,530 | 10/1993 | Letcher, III | 73/602 |
| 5,262,958 | 11/1993 | Chui et al. | 364/487 |
| 5,384,725 | 1/1995 | Coifman et al. | 364/807 |
| 5,392,255 | 2/1995 | LeBras et al. | 367/50 |
| 5,495,292 | 2/1996 | Zhang et al. | 348/407 |

FOREIGN PATENT DOCUMENTS

WO91/03902  3/1991  WIPO .......................... H04N 1/419

OTHER PUBLICATIONS

Chui, et al., "Wavelets on a Bounded Interval", *Numerical Methods of Approximation Theory*, vol. 9 (Dec. 1992), pp. 53–75.

Chui, et al., "Nonorthogonal Wavelet Packets", *SIAM J. Math. Anal.*, vol. 24, No. 3, (SIAM, May 1993), pp. 712–738.

Chui, et al., "Fast integral wavelet transform on a dense set of time–scale domain", *CAT report 310* (Center for Approximation Theory, Texas A & M University, Sep. 1993).

Chui and Li, "Dyadic Affine Decompositions and Functional Wavelet Transformers" *CAT Report 295* (Center for Approximation Theory, Texas A&M University, Apr., 1993).

Chui and Wang, "On Compactly Supported Spline Wavelets and Duality Principle," *Trans. of Am. Math. Society*, vol. 330, No. 2 (Apr. 1992) pp. 903–915.

Chui, et al., "Compactly Supported Box–Spline Wavelets," *Approx. Theory and its Appl.*, vol. 8, No. 3 (Sep. 1992), pp. 77–100.

Chui, *An Introduction to Wavelets* (Academic Press, 1992), pp. 182–186.

Bradley and Brislawn, "The Wavelet/Scalar Quantization Compression Standard for Digital Fingerprint Images", Tec. Rep. LA–UR–94–827, *Pro. IEEE ISCAS–94*, (IEEE, 1994).

Coifman, Meyer, et al., "Signal Processing and Compression with Wave Packets," (1992).

(List continued on next page.)

*Primary Examiner*—Jose L. Couso
*Assistant Examiner*—Anh Hong Do
*Attorney, Agent, or Firm*—Anderson, Levine & Lintel

[57] ABSTRACT

An apparatus and a corresponding method for performing compression and reconstruction of documents are disclosed. Compression of the document is performed by applying a scaling function and a wavelet function first in one direction (e.g., rows) and then in another direction (e.g., columns) to digital data representing the document. The scaling and wavelet functions correspond to spline and wavelet functions that are compactly supported over a convolution interval, and which can also be implemented by way of integer operations. Byte-packing may also be applied to the image data, without regard to pixel boundaries, allowing not only binary (two-color) documents to be compressed but also enabling the compression of more complex color documents. The spline-wavelet compression and reconstruction may be performed according to alternative methods, including dual-base wavelets, interpolatory wavelets, and wavelet packets.

42 Claims, 18 Drawing Sheets

OTHER PUBLICATIONS

Daubechies, "Orthonormal Bases of Compactly Supported Wavelets", *Communications on Pure and Applied Mathematics*, vol. XLI (John Wiley & Sons, 1988), pp. 909–966.

Antonini, et al., "Image Coding Using Wavelet Transform", *IEEE Transactions on Image Processing*, vol. 1, No. 2 (IEEE, 1992), pp. 205–220.

Rioul, et al., "Wavelets and Signal Processing", *IEEE Signal Processing Magazine*, vol. 8, No. 4 (IEEE, 1991), pp. 14–38.

Bradley & Brislawn, "The Wavelet/Scalar Quantization Compression Standard for Digital Fingerprint Images", Tec. Rep. LA–UR–94–827, (IEEE 94).

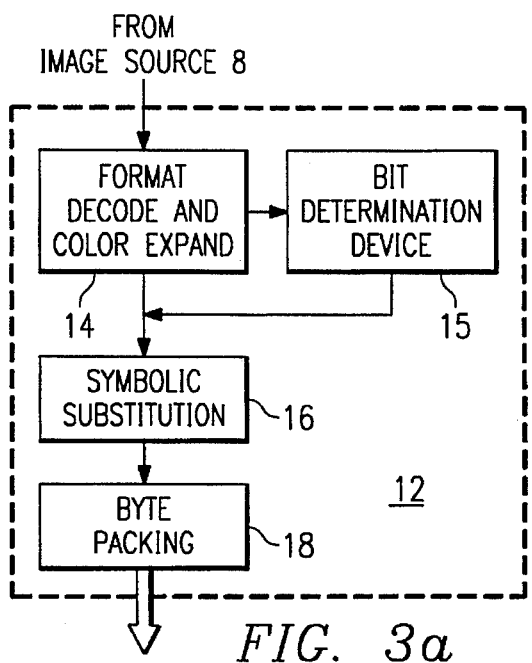
FIG. 3a
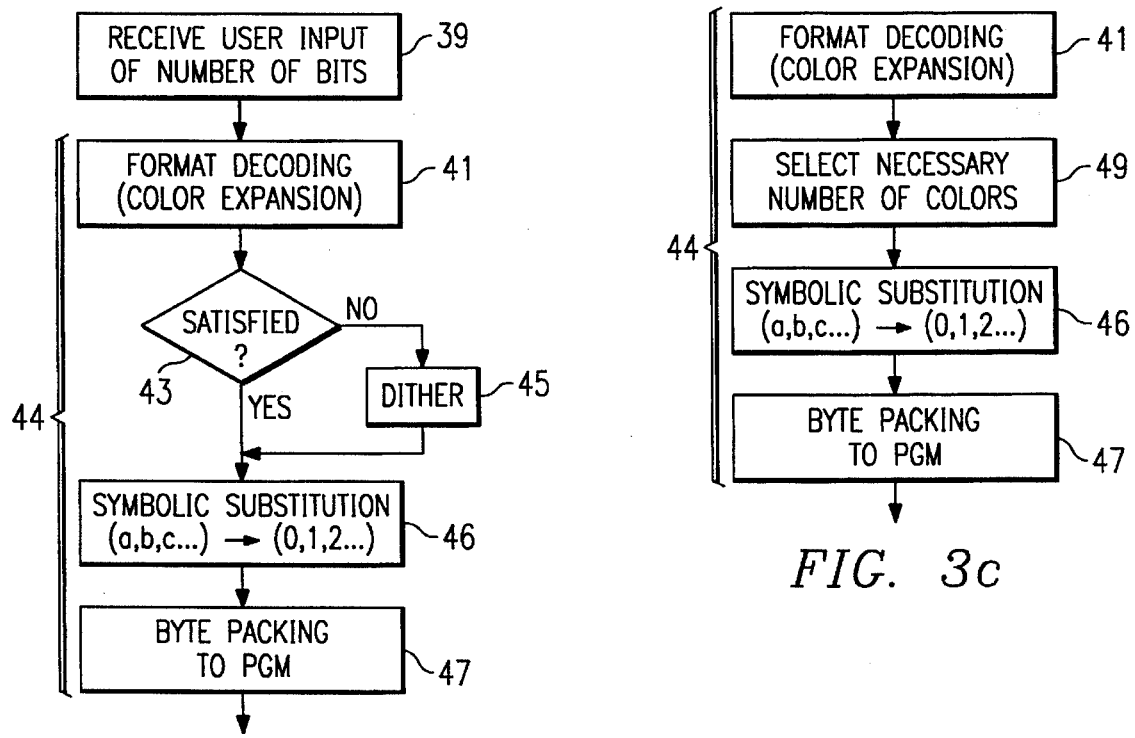
FIG. 3b
FIG. 3c (a)
```
X X X X X X X X
X X X X X X X X
X X X X X X X X
X X X X X X X X
X X X X X X X X
X X X X X X X X
X X X X X X X X
X X X X X X X X
```

METHOD AND APPARATUS FOR COMPRESSION AND DECOMPRESSION OF DOCUMENTS AND THE LIKE USING SPLINES AND SPLINE-WAVELETS

This invention is in the field of data compression, and more specifically is in the field of data compression of documents and similar images that may be represented as digital data.

BACKGROUND OF THE INVENTION

The increase in computational speed achieved by modern computer technology has enabled the widespread use of electronic techniques for the communication and storage of documents of many types. For purposes of this application, the term "documents" will refer to two-dimensional representations or renderings of a nature that are conventionally made on a paper medium or on a graphics display by writing, printing, typing, drawing, operation of a computer-aided draw, paint or design program, or other similar conventional techniques, and those renderings that are commonly stored on paper, microfilm, microfiche, or electronically. Examples of such documents include, without limitation thereto, text documents, bank checks and other banking transaction records, vital records, maps, charts, printed works (including combinations of text and graphics), seismic plots, medical records, bank and insurance records, directories, and the like. As is well known to the public, examples of conventional electronic communication and storage of documents includes modern digital facsimile ("fax") equipment, CD-ROM storage and distribution of encyclopedias and other series of books, electronically or magnetically stored representations of transactions such as checks and other banking transactions and statements, and the like.

Electronic communication and storage is made quite difficult for those documents in which a significant portion of the information contained in many documents is in the form of graphic information which cannot readily be coded into computer-readable form on a character-by-character basis. For example, while the letters in a person's signature may readily be electronically communicated by way of an ASCII coded representation on a character-by-character basis, the retrieval of the ASCII coded representation will not provide any information regarding the appearance of the signature as made by the person. To electronically communicate or store documents with graphic information, the conventional technique is to digitize the document into a bit-map representation, with each memory location in the bit map corresponding to an elemental position of the document, and with the contents of the memory locations corresponding to the color at that location. In the case of a "binary" digital document representations, for example, the digital value "0" may be used to represent the color black and the digital value "1" may be used to represent the color white.

Of course, it is highly desirable that the digitizing of documents be performed with as high a resolution as possible, which requires the use of a significant amount of memory for each document page. For example, current high resolution digitization devotes on the order of greater than one million bits to store a binary bit map representation of a single monochromatic (black and white) document page divided into 1024-by-1024 picture elements, or "pixels". On a 300 dpi laser printer, this 1k-by-1k picture will be printed on a paper area of approximately three inches by three inches. Therefore, even finer resolution may be required for larger high quality pictures to be printed, and also for certain types of documents, such as fingerprint files utilized by law enforcement agencies.

These high resolution digitally stored representations of documents obviously not only occupy a great deal of computer memory and hard disk storage space, but also require significant time for their transmission over conventional communication lines. As such, conventional data compression techniques are highly useful in the electronic communication and storage of documents. Conventional data compression techniques are generally referred to as of either "lossless" or "lossy", depending upon whether data is discarded in the compression process. For most digitized documents with graphics information, lossy data compression techniques may be used, so long as the receiver is still able to distinguish the graphic image with acceptable clarity.

A survey of conventional lossy data compression techniques may be found at Simon, "How Lossy Data Compression Shrinks Image Files", *PC Magazine* (Jul. 1993), pp. 371 et seq. A popular one of these conventional lossy data compression techniques is referred to as the JPEG (Joint Photographic Experts Group) method. A description of this technique may be found in Barnsley and Hurd, *Fractal Image Compression* (AK Peters, Ltd., 1993), pp. 219–228. The JPEG compression method initially divides the image into blocks of pixels, and a Discrete Cosine Transform (DCT) is performed on each pixel block, producing a representation of the block as coefficients corresponding to frequencies and amplitudes, rather than corresponding directly to color information. These coefficients are then quantized, or rounded off, and a difference algorithm is performed over all quantized blocks in the image, in a selected scan order. This difference algorithm subtracts a DC term corresponding to the mean pixel value of a block, from the DC term of the preceding block. The difference coefficients are then scanned in a different order, such as a zig-zag order, and the non-zero coefficients (i.e., blocks in which a difference from the preceding block occurred) are coded to indicate the number of preceding zero coefficients (i.e., the number of pixel blocks in which no change occurred) and also the value of the non-zero difference. Lossless compression is then often applied to the coded result to further compress the data. Decompression is performed by reversing the compression process, producing the displayable image.

Another conventional method of lossy video image compression, referred to as Recursive Vector Quantization (RVQ), quantizes the pixel blocks directly, without a DCT or other transform, according to a set of selected reference tiles. See Simon, July 1993, op. cit.. The reference tiles are selected according to an iterative technique, based upon the accuracy of the results relative to the original image. As noted in the Simon article, compression according to the. RVQ method is computationally intense and complex, but decompression can be done quite rapidly.

Another type of conventional lossy video image compression techniques is referred to as fractal compression. As is well known in the art, a fractal is a mathematical image object that is self-similar, in that the image can be represented in terms of other pieces of the image. In fractal image compression, the input image is similarly divided into pixel groups, or tiles. Each tile is then approximated by a transformation (contractive, rotational, or both) of one or more other reference regions of the image. The compressed image thus consists of a full representation of the reference region, plus the transformation operators for each of the tiles. Each tile of the image is decompressed by performing a transformation of the reference region using the stored transformation operator for that tile. Detailed descriptions of conventional fractal image compression techniques and systems for performing the same may be found in Barnsley & Hurd, *Fractal Image Compression* (AK Peters, Ltd., 1993), in U.S. Pat. No. 4,941,193, and in U.S. Pat. No. 5,065,447.

Wavelet-based techniques are also known to be used for the data compression of digitally stored documents. An summary of this technique, as applied to the compression of digitized fingerprint files used in law enforcement, is described in Bradley and Brislawn, "The Wavelet/Scalar Quantization compression Standard for Digital Fingerprint Images", Tec Rep LA-UR-94-827, *Proc. IEEE ISCAS*-94 (IEEE, 1994). This approach utilizes the well-known Daubechies wavelet, applied to the document data by way of a table look-up technique. The Daubechies wavelet function used .in this case is not bounded, however, and as such boundary effects may be present in the reconstruction; indeed, the approach described in the Bradley and Brislawn paper attempts to reduce boundary effects by reflecting the wavelet filters at the image boundaries. Furthermore, this prior approach is generalized to 8-bit images (i.e., for compression of full grey scale images). Use of this approach for documents, particularly for binary documents, will thus be especially cumbersome considering the size of the array to be considered in the image compression process, and the eventual compression ratio will be somewhat limited.

By way of further background, the technique of byte packing as a lossless compression technique is well known in the field of computer data storage. According to this well-known technique, digital values that may be expressed by fewer bits are packed with other similar values into a single byte. For example, if eight bit words are used to express a stream of data having only two values, e.g., $255_2$ and $0_2$, byte packing will allow the data stream to be expressed with a single bit per value. Each byte (eight bits) will thus be able to express the same information as eight bytes of raw data.

By way of further background, our copending application Ser. No. 08/181,663, filed Jan. 14, 1994, entitled "Method and Apparatus for Video Image Compression and Decompression Using Boundary-Spline-Wavelets", assigned to Houston Advanced Research Center and incorporated herein by this reference, describes a wavelet analysis-based approach to video compression, particularly in the field of motion pictures. This application Ser. No. 08/181,663 also provides a discussion of the background theory of wavelet analysis, and its application to image compression.

It is an object of the present invention to provide a method and apparatus for compressing digitized representation of documents to a high degree, in such a manner that the resolution and fidelity of the received document upon decompression is maintained.

It is a further object of the present invention to provide such a method and apparatus in which the decompressed document may be magnified to an arbitrary extent.

It is a further object of the present invention to provide such a method and apparatus in which boundary effects are effectively eliminated in the compressed document, thus improving the quality of the compressed document and also enabling zoom-in and zoom-out techniques to be applied to the reconstructed document.

It is a further object of the present invention to provide such a method and apparatus in which the compression may be performed by integer operations, increasing the speed of the compression and enabling relatively low cost computing equipment (or hardware) to perform the compression quickly.

It is a further object of the present invention to provide such a method and apparatus that is suitable for storage and communication of compressed digitized documents.

It is another object of the present invention to provide such a method and apparatus in which the compression technique is selectable.

Other objects and advantages of the present invention will be apparent to those of ordinary skill in the art having reference to the following specification together with its drawings.

SUMMARY OF THE INVENTION

The present invention may be implemented into a system and method for communicating, or storing and retrieving, a compressed digital representation of a document. The input document is first digitized, and the system will perform a graphics format packing procedure according to either an automatic or manual mode of operation. For the automatic mode, the system will determine the maximum bit representation of the document and will send the information to a byte packing operation; for the manual mode, a dithering technique will be used to dither the document to a bit map with the exact bit representation required by the user. Byte packing compression is then performed on a row-by-row basis, in effect converting the digital representation into a Portable Grey Level (PGM) format. The PGM format document is then decomposed according to a wavelet analysis technique, followed by lossless compression if desired. The compressed decomposed document may then be stored or communicated over conventional communication networks. Decompression and reconstruction of the document is performed by reversal of the compression and decompression processes, at the receiving end, for display of the document.

The present invention is based on finite elements, or splines. Hence, although the operations are in digital formats, the results are in an analog format, such that information can be extracted from anywhere in the result to improve the display resolution with real-time efficiency. In addition, the use of boundary wavelets according to the present invention eliminate boundary effects. Each of these two attributes separate the present invention from conventional compression technology.

Furthermore, according to the present invention, binary operations may be used to advantage at any stage of the process. This is made possible from the use of integer coefficients in the decomposition and reconstruction filters. According to one of the alternative embodiments, the use of dual bases is also accomplished by integer sequences filters, and allows the user to choose a shorter, and computationally more efficient, filter at either or both of the compression or decompression ends. A second alternative embodiment, namely interpolatory wavelets, provides highest efficiency compression and decompression, while a third alternative embodiment, namely wavelet packets, provides the highest quality compression and decompression by way of full-tree decomposition and reconstruction.

BRIEF DESCRIPTION OF THE DRAWINGS

FIG. 3a is an electrical diagram, in block form, of the format converter of the system of FIG. 1, and FIGS. 3b and 3c are flow diagrams illustrating the automatic and manual operation modes, respectively, of the format converter of FIG. 3a, according to alternative embodiments thereof.

FIGS. 13a through 13e illustrate the operation of the process of FIGS. 12a and 12b on an array of coefficients.

DETAILED DESCRIPTION OF THE PREFERRED EMBODIMENT

1. Document communication and storage system with compression and decompression

Figure 1:
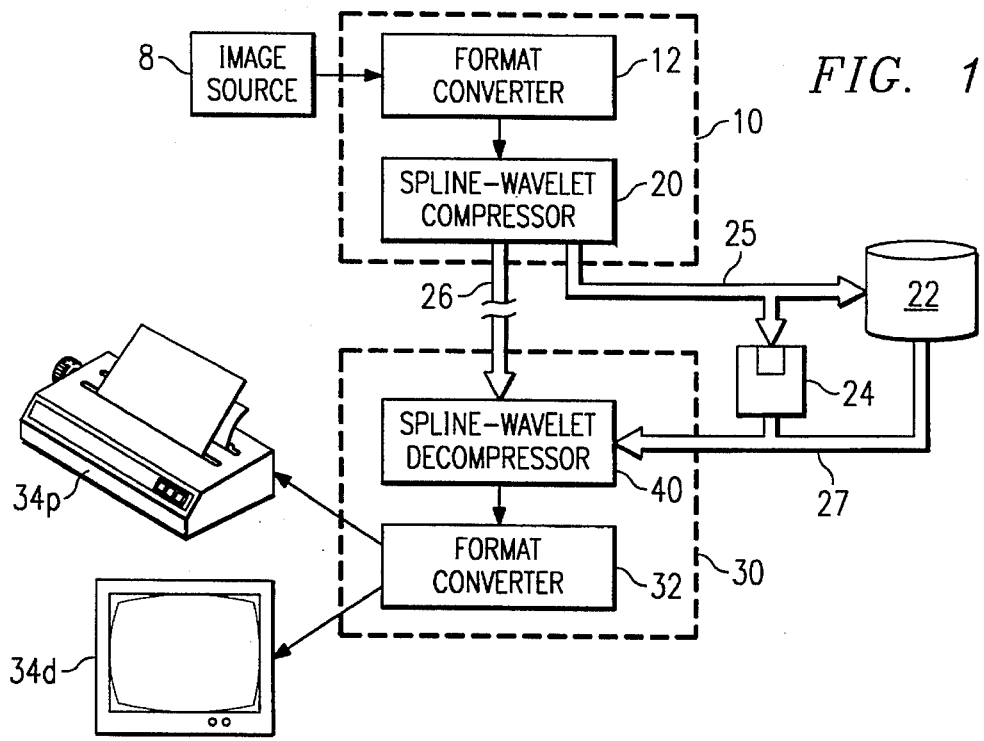
FIG. 1 is an electrical diagram, in block form, of a communications and storage system according to the preferred embodiment of the invention.

Referring now to FIG. 1, a system for communicating or storing documents according to the preferred embodiment of the invention will now be generally described. The exemplary system shown in FIG. 1 includes compression system 10 and decompression system 30 in communication with one another, such as via digital communication network 26. As such, this embodiment of the invention will be described with respect to these discrete compression and decompression locations; it is to be understood, of course, that the same physical computer or location may contain, or serve as, both compression system 10 and decompression system 30, particularly in the application of an archival system using the compression techniques to be described herein.

In the embodiment of the invention illustrated in FIG. 1, compression system 10 receives digital information representative of a document from image source 8. As noted hereinabove, the term "document" as used in this application refers to a two-dimensional representation or rendering of a nature that is conventionally made on a paper medium or on a graphics display by writing, printing, typing, drawing, operation of a computer-aided draw, paint or design program, or other similar conventional techniques, and those renderings that are commonly stored on paper, microfilm, microfiche, or electronically. As noted above, examples of such documents include text documents, bank checks and other banking transaction records, vital and legal records, maps, charts, printed works (including combinations of text and graphics), seismic plots, medical records, bank and insurance records, directories, identification images (pictures, signatures, etc.) and the like. As is well known to the public, examples of conventional electronic communication and storage of documents includes modern digital facsimile ("fax") equipment, CD-ROM storage and distribution of encyclopedias and other series of books, electronically or magnetically stored representations of transactions such as checks and other banking transactions and statements, and the like. As such, image source 8 may be implemented as a document scanner or a facsimile machine, in the case where the document is a paper or other hard copy representation. Alternatively, if the document is already in electronic form, image source 8 may be implemented as a computer system that receives the document from another electronic (or graphics) format or from another computer system over a communications network, that retrieves the document from its own disk or tape storage, that receives the document directly via a fax modem, or that is used to generate the document itself. Of course, it should be apparent to those of ordinary skill in the art that other conventional image sources may alternatively serve as image source 8 in the system of FIG. 1.

The output of image source 8 is preferably a digital data stream representative of the appearance of the document, such as a bit map representation. Compression system 10 includes format converter 12 and spline-wavelet compressor 20. Format converter 12 receives the output of image source 8 (in the general case) and converts the digital representation received from image source 8 into a full ASCII binary bitmap representation suitable for compression by spline-wavelet compressor 20. According to the preferred embodiment of the invention, as will be described in detail hereinbelow, format converter 12 converts the input document into a binary ASCII form expressed in Portable Grey Level (PGM) format. Spline-wavelet compressor 20 performs a lossy compression of the input document, and formats the compressed document into the appropriate output format, in the manner described hereinbelow.

The compressed representation of the input document may be communicated by spline-wavelet compressor 20 in compression system 10 over communications network 26 to a receiving computer or similar hardware receiving device including decompression system 30. Communication network 26 may be a conventional analog transmission or electronic digital communications network, or both an analog and digital network when including the appropriate clusters, analog-to-digital and digital-to-analog converters, and other necessary apparatus. Network 26 may be realized according to any conventional technology, including telephone line (including T1, T2, and T3 communication), hard-wired cable, fiber optic cable, broadcast or satellite transmission, and the like. Alternatively or in addition, the output of compressor system 10 may alternatively be presented to bus 25 for storage at main disk 22 (e.g., for archival storage), or to floppy disk 24 for off-line storage or for transmittal to another computer; of course, storage on other media such as tape and the like is also contemplated.

Decompression system 30 according to the system of FIG. 1 is operable to receive the compressed document data directly from compression system 10 over communications network 26, or via computer bus 27 from disk storage 22 or floppy disk 24. It will be apparent to those of ordinary skill in the art that the actual communication of the compressed representation of the document may, of course, be performed by way of a single transmission between compression system 10 and decompression system 30, or alternatively by way of a broadcast transmission by compression system 10 to multiple decompression systems 30.

Many other types of transmissions are, of course, also contemplated. For example, compression system 10 may store the compressed document onto archival disk storage 22, for example at a central server unit or location, such as a bank, library, central company office, or document service. In this case, many documents will be compressed and stored for later communication. Decompression system 30 may then call this central location to access one or more documents, in which case the central location will retrieve the appropriate compressed documents from its main disk 22 and communicate the same to decompression system 30 over communications network 26. Further in the alternative, a remote computer may request certain documents, in compressed form, from a central storage location; after receipt of the compressed documents via communications network 26 or by transport of the compressed documents on portable floppy disk 24, the remote requesting computer may not immediately forward the compressed documents to decompression system 30, but instead store the documents, in compressed form, in its main disk 22. Decompression system 30 will then receive the compressed documents via its computer bus 27 for decompression as desired.

It is therefore contemplated that the system of FIG. 1 may be implemented or operated in these and other similar ways within the scope of the present invention, in the fields of data and record communication, record archival and retrieval, catalog services, and the like. In addition, it is contemplated that the system of FIG. 1 will also be useful in providing services such as on-demand video images in the nature of "picture book" services, the transmission of still images such as useful with video telephonic equipment, identification systems in which pictures and signature images are communicated, and the like.

In any case, decompression system 30 includes spline-wavelet decompressor 40 and format converter 32. Spline-wavelet decompressor 40 receives the compressed document data, and performs substantially the reverse of the process performed by spline-wavelet compressor 20 in compressor 10. The output of spline-wavelet decompressor 40, according to this preferred embodiment of the invention, will be a PGM format representation of the compressed document. As will be described hereinbelow, since the compression technique according to the present invention is of the lossy type, the output of decompressor 40 in decompression system 30 may not be identical to the input to compressor 20 in compression system 10. The output of spline-wavelet decompressor 40 is presented to format converter 32, which reformats the decompressed document into the suitable form for display on video display 34*d*, for printing by printer 34*p*, or for output by way of another conventional output device.

2. The compression system

Figure 2:
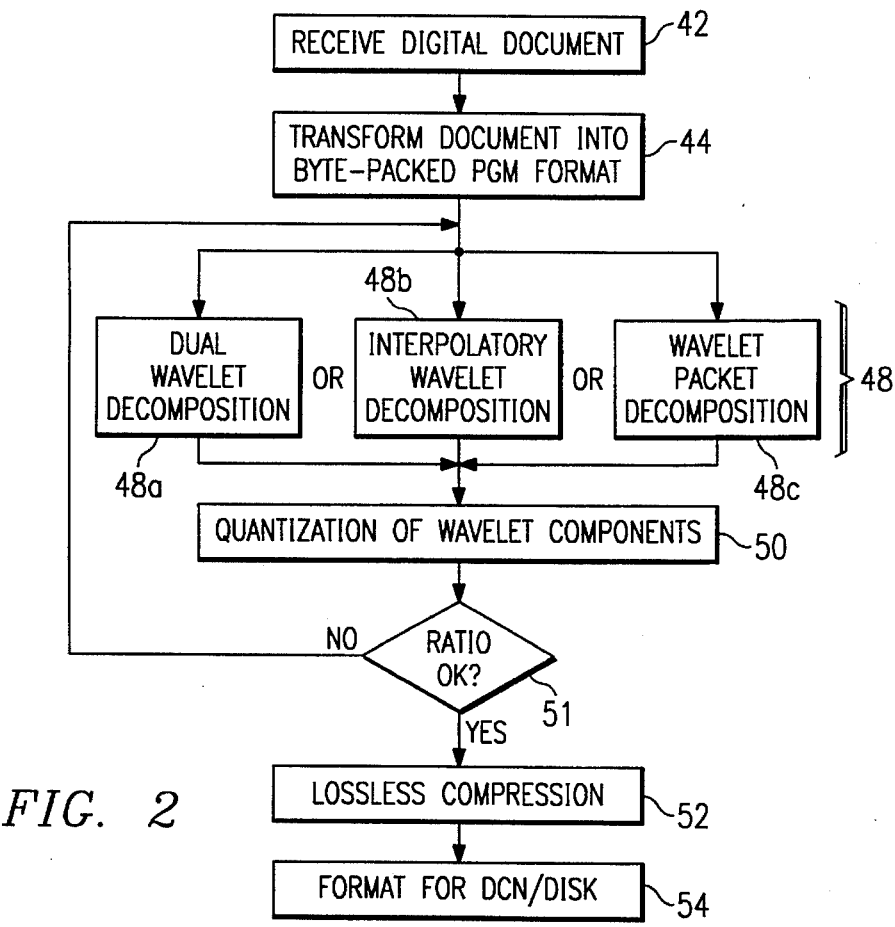
FIG. 2 is a flow diagram illustrating the operation of the system of FIG. 1 in compressing document data according to the preferred embodiment of the invention.

The construction and operation of compression system 10 according to the preferred embodiment of the invention will now be generally described. Compression system 10 may be a standalone system, for example as a special archiving machine dedicated for document scanning and storing, or can be arranged so as to be an add-on card for a conventional high performance personal computer or workstation; of course, compression system 10 may also be implemented as a function of a larger computer, such as a mainframe computer or supercomputer. As illustrated in FIG. 2, the compression process begins with process 42, in which format converter 12 receives a digital bit stream representative of the input document from image source 8. The format of the digital bit stream representative of the document, as produced by image source 8 and presented to format converter 12, may be any one of the known formats such as PCX, IMG, GIF, TIF, RLE, NTSC, PAL, and the like. Compression system 10 according to this embodiment of the invention is able to compress input documents of various types, not only monochromatic (two-color) documents, but also documents that are in full color or in a grey-scale form. Format converter 12, as noted above, receives this bit stream from image source 8 and converts it to a binary PGM format, as will now be described in detail.

a. Format conversion

Upon receipt of the digital document in process 42, format converter 12 performs process 44 of FIG. 2, in which the digitally-represented received document is transformed into a byte-packed PGM format for compression by spline-wavelet compressor 20.

Referring now to FIG. 3*a*, the construction of format converter 12 will now be described in detail. As shown in FIG. 3*a*, format converter 12 according to this embodiment of the invention includes format decoder and color expansion device 14, which has an input for receiving the input data stream from image source 8. Format converter and color expansion device 14 is preferably implemented in the conventional manner for performing the decoding and expansion operations described hereinbelow. For example, circuitry for performing such format decoding is well known in the art, such as described in Rimmer, *Supercharged Bitmapped Graphics* (Windcrest/McGraw Hill 1992); conventional circuitry for performing such color expansion is also readily available, and includes such devices as color palette tables in RAM, ROM or in other electronic storage devices.

The output of format converter and color expansion device 14 is forwarded to bit determination device 15, and also to symbolic substitution circuitry 16, to which the output of bit determination device 15 is also presented. Symbolic substitution circuitry 16 presents its output to byte packer 18, which completes the format conversion as necessary prior to the compression operation according to this embodiment of the invention, for presentation to spline-wavelet compressor 20. Each of bit determination device 15, symbolic substitution circuitry 16, and byte packer 18 may be constructed according to conventional circuitry for performing these operations, or alternatively may be performed by a single high performance graphics or general purpose processor, as desired.

Referring now to FIGS. 3b and 3c, the operation of format converter 12 in performing transformation process 44 will now be described in detail. FIGS. 3b and 3c represent manual and automatic modes of transformation process 44, respectively.

Referring first to FIG. 3b, relative to the manual mode of transformation process 44, transformation process 44 begins with process 39, in which format converter 12 receives a user input regarding the number of bits by which each pixel of the document or image is to be represented. In process 41, format decoder and color expansion device 14 decodes the data from the format presented by image source 8, such format being PCX, IMG, TIF, GIF, RLE, YUV, etc., into a color matrix, or color palette table, representation of the image signal. It is preferred that format decoder and color expansion device 14 also be able to detect the type of document to which the input bit stream corresponds, to provide flexibility in the types of documents presented to compression system 10. In the case of color input documents, format decoder and color expansion device 14 may thus also, in process 41, perform a color expansion operation so that the output from device 14 is in an expanded RGB format, with each pixel represented by red, green and blue color component bytes.

Format decoder and color expansion device 14 preferably also includes sufficient logic to perform decision 43 (of FIG. 3b), in which the determination is made as to whether the input document is a "satisfied" document, that is whether the number of bits representing each pixel in the input document is less than or equal to the number of bits specified in process 39. For example, in the case of color documents, the output of format decoder and color expansion device 21, after the color expansion operation, may correspond to digital values in an RGB format, where each color component is represented by a multiple-bit value indicative of the intensity of that color. Similarly, each pixel in a representation of a grey-scale document will have a single color multiple-bit component corresponding to the intensity of the brightness (in a black and white system) for that pixel, while a representation of a two-color (e.g., black and white), or binary, document requires only a single bit per pixel. If decision 43 determines that the output of format decoder and color expansion device 14 satisfied the user specification, control passes to process 47, which is described hereinbelow.

However, if decision 43 determines that the input document does not satisfy the user specification (i.e., the number of bits per pixel in the input document exceeds the number of bits specified by the user in process 39), the output of format decoder and color expansion device 14 is forwarded to bit determination device 15, to perform the desired dithering process necessary to convert the digital representation of the document to the exact bit representation. As is well-known in the art, for example, the process of dithering corresponds to displaying a grey color in a monochrome representation where the shade of grey depends upon the relative density of black and white pixels for the corresponding portion of the image. The Rimmer reference cited hereinabove also provides a description of conventional dithering techniques. It is contemplated that conventional circuitry may be used for bit determination device 15, including conventional graphics processing circuitry.

According to the preferred embodiment of the invention, bit determination device 15 is controllable so as to operate according to one of several dithering modes. For example, in the case where bit determination device 15 is implemented as a programmable graphics processor, it is contemplated that bit determination device 15 may include program code corresponding to each of several dithering routines, selectable by way of a pointer or the like. For example, Table 1 hereinbelow illustrates the correspondence between a dithering mode code and the selected dithering method, according to this embodiment of the invention:

TABLE 1

| Dithering Mode Code | Dithering Method |
| --- | --- |
| 1 | Bayer-Dickering Method |
| 2 | Floyd-Steinberg Method |
| 3 | Burke's Method |
| 4 | Stucki Method |
| 0 | Dithering disabled |

As a result of dithering process 45, or alternatively if the output of format decoder and color expansion device 14 already corresponds to a proper color representation (as determined by process 43), the symbolic substitution process 46 and byte packing process 47 described hereinbelow for the binary and non-binary documents, as the case may be, is then performed.

Referring now to FIG. 3c, the automatic mode of format conversion process 44' will now be described in detail. Process 44' begins with color expansion of the document in process 41, as before. The hardware construction of format converter 12 for this embodiment of process 44' will be similar as that shown in FIG. 3a, and as such no additional description of the circuitry will be provided herein. For non-two-color (i.e., color or gray-scale) documents, the output of color expansion process 41 will be an image table with at least one byte of data per pixel. Following color expansion process 41, process 49 is performed in this automatic mode to determine the number of colors necessary to represent the document is selected. Process 49 may be done by way of a color histogram statistic method, in which the number of colors necessary to represent the document is selected by determining the frequency of true colors in the document and by determining how many are reasonably necessary to capture the bulk of the information. Process 49 thus results in each byte (or larger word) for each pixel containing one of a fixed set of values, representative of a reduced number of colors, associated with that pixel. Process 49 may alternatively be performed by way of a selected dithering technique, to represent the image by a reduced number of colors. In either event, the image table after process 49 will be a representation of the image by a reduced number of colors, represented by a reduced set of values (a, b, c, . . . ).

Whether produced by the manual or automatic format conversion processes 44, 44' described hereinabove, the result will be an image table having a digital representation of intensity or color for each pixel. Symbolic substitution process 46 and byte-packing process 47 are then performed on this image table, as shown both in FIGS. 3b and 3c. However, symbolic substitution process 46 and byte-packing process 47 will differ for binary document than for multi-color documents, as will be described hereinbelow.

i. Symbolic substitution and byte-packing for binary documents

In the case of a binary document (i.e., a two-color, black and white, document), the document is represented as an image matrix or table containing two values a, b, corresponding to black and white, respectively. For example, in the case where each pixel in the document is represented by an eight-bit value, the value "0" may represent black and the value "$255_{10}$" may represent white; of course, the dithering process may assign different numerical values to the two colors represented. Symbolic substitution process 46, performed by symbolic substitution circuitry 16 of format converter 12, is operable to detect the two values a,b in the image table, and to substitute the binary values 0,1 therefor, respectively.

For example, in the case of an eight-by-eight image table, the output from bit determination device 15 (or, if appropriate, directly from format decode and color expansion device 14), may appear as follows:

| a | b | a | a | a | b | b | b |
|---|---|---|---|---|---|---|---|
| b | a | a | b | b | a | a | b |
| a | a | a | a | b | a | b | a |
| b | b | a | b | a | b | b | a |
| a | a | a | b | b | a | a | b |
| b | a | b | a | a | a | b | a |
| a | a | b | b | a | b | a | a |
| b | b | a | a | b | a | b | b |

In the case where each pixel is represented by an byte, and where the two color codes a, b correspond to 0, 255, respectively, this image table would appear as follows:

| 0 | 255 | 0 | 0 | 0 | 255 | 255 | 255 |
|---|---|---|---|---|---|---|---|
| 255 | 0 | 0 | 255 | 255 | 0 | 0 | 255 |
| 0 | 0 | 0 | 0 | 255 | 0 | 255 | 0 |
| 255 | 255 | 0 | 255 | 0 | 255 | 255 | 0 |
| 0 | 0 | 0 | 255 | 255 | 0 | 0 | 255 |
| 255 | 0 | 255 | 0 | 0 | 0 | 255 | 0 |
| 0 | 0 | 255 | 255 | 0 | 255 | 0 | 0 |
| 255 | 255 | 0 | 0 | 255 | 0 | 255 | 255 |

After symbolic substitution process 27, this image table would appear as follows:

| 0 | 1 | 0 | 0 | 0 | 1 | 1 | 1 |
|---|---|---|---|---|---|---|---|
| 1 | 0 | 0 | 1 | 1 | 0 | 0 | 1 |
| 0 | 0 | 0 | 0 | 1 | 0 | 1 | 0 |
| 1 | 1 | 0 | 1 | 0 | 1 | 1 | 0 |
| 0 | 0 | 0 | 1 | 1 | 0 | 0 | 1 |
| 1 | 0 | 1 | 0 | 0 | 0 | 1 | 0 |
| 0 | 0 | 1 | 1 | 0 | 1 | 0 | 0 |
| 1 | 1 | 0 | 0 | 1 | 0 | 1 | 1 |

Of course, if the two color codes a, b from bit determination device 15, or from format converter and color expansion device 14, were already 0, 1, respectively, symbolic substitution process 46 would be unnecessary.

For this example of a binary document, once the image table for the document is converted to binary values, byte packing circuitry 18 performs byte packing process 47 to place the document into a PGM format. Byte packing process 47 converts each eight binary bits in the image table, representative of eight adjacent pixels in the document, into an eight-bit word (byte) for subsequent numerical processing. Process 47 thus assigns binary powers to each of the pixel locations in an eight-pixel group; for example, the left-most pixel may be assigned the power $2^7$ and the right-most pixel in the group may be assigned the power $2^0$, with the pixels in between corresponding to the intermediate powers in order. The resultant byte-packed representation of the eight-bit pixel groups then corresponds to the sum of the values in each pixel location (1 or 0) times the assigned power of two for that location. The exemplary eight-by-eight image table noted above would appear, after byte-packing in the horizontal direction, as follows (all numbers decimal):

| 71 |
|---|
| 153 |
| 10 |
| 214 |
| 25 |
| 162 |
| 52 |
| 203 |

Of course, horizontally adjacent eight-pixel groups in a larger document would have their own byte-packed values. If the horizontal size of the document is not a multiple of eight, the remainder bits are "zero-packed". For example, if the horizontal size of the input document is 70 pixels, two zeroes may be added at the end of the pixel string prior to the byte-packing process; since the actual size of the document is known, such zero-packing will not result in any error or confusion. Byte-packing process 47 thus reduces the storage capacity necessary for representation of a two-color document significantly; for example, where the two-color image table represents each pixel with a byte, byte packing process compresses the image table by a factor of eight. The result of byte packing process 47 thus resembles an eight-bit PGM format, which is particularly convenient for processing by microprocessors or computers using ASCII coding and programming environments, as the fundamental storage unit is the byte in these environments.

ii. Symbolic Substitution and byte-packing for non-binary documents

While the foregoing description of byte-packing according to the present invention was directed to binary (i.e., two-color) documents, it is of course well known that a wide range of documents are not of two-color type, and thus cannot be represented in binary form without the loss of information. For example, conversion of color and gray-scale documents into binary form will necessarily cause the loss of the color and gray-scale information, respectively. In addition, even if the original input document is a two-color document, practical limitations in the scanning or digitization hardware used to convert the document into machine-readable form may result in a digital representation that may not be two-color in the strictest sense, in which case restriction of the output into binary form will also cause the loss of information. These effect limit not only documents that are fully in graphics form, but also the graphic portion of documents containing both text and graphics.

It is therefore useful to digitally represent these documents with more than a single bit, for example with two, three, four or more bits, depending upon the range of "color" information to be considered in the process. As is fundamental in the art, to digitally represent n colors in a document, $2^n$ bits of information are required for each pixel; for example, an image having up to sixteen colors requires four bits per pixel in its digital representation, and an image allowing up to eight colors requires three bits per pixel. However, as in the case hereinabove for the two-color document, an entire byte is generally used for the representation of each pixel, even though only eight colors are necessary. Symbolic substitution and byte packing according to this embodiment of the invention will be able to save significant memory space, thus providing a significant degree of lossless compression.

For example, a document may be represented by eight colors per pixel as a result of decision 43 or process 45 in the manual format conversion mode, or of process 49 in the automatic format conversion mode, whether corresponding exactly to the input document, generated by color histogram statistics or generated by dithering. In this example, the eight colors are represented by an eight bit value (i.e., ranging from 0 to $255_{10}$), and consist of the set (0, 24, 53, 75, 103, 148, 196, 255); in hexadecimal notation, this set would be (00, 18, 35, 4B, 67, 94, C4, FF). An example of an image table for an eight color document of a size eight pixels by eight pixels is as follows:

| 53  | 196 | 148 | 103 | 24  | 24  | 75  | 53  |
|-----|-----|-----|-----|-----|-----|-----|-----|
| 255 | 196 | 196 | 103 | 53  | 24  | 255 | 103 |
| 148 | 196 | 75  | 53  | 24  | 24  | 0   | 0   |
| 75  | 53  | 53  | 255 | 103 | 148 | 0   | 24  |
| 75  | 53  | 255 | 24  | 0   | 148 | 148 | 103 |
| 196 | 148 | 24  | 24  | 0   | 196 | 53  | 53  |
| 24  | 255 | 53  | 196 | 75  | 148 | 103 | 0   |
| 24  | 255 | 196 | 196 | 255 | 75  | 53  | 75  |

Process 46 is then performed in which a symbolic substitution is performed such that each of the reduced number of colors is represented by the smallest (in number of bits) word size. For example, if the result of process 49 is a set of eight color values over the range from 0 to $255_{10}$, the symbolic substitution of process 46 represents these eight values by the eight binary values 0 through $111_2$, stored in each byte (or larger word) associated with each pixel. For the exemplary image table shown above, the symbolic substitution of process 46 would perform the following substitution:

| 8-bit Value (hexadecimal) | Substituted Value |
|---------------------------|-------------------|
| 00                        | 00                |
| 18                        | 01                |
| 35                        | 02                |
| 4B                        | 03                |
| 67                        | 04                |
| 94                        | 05                |
| C4                        | 06                |
| FF                        | 07                |

The resultant exemplary image table, after the symbolic substitution of process 46, would appear, in hexadecimal form, as follows:

| 02 | 06 | 05 | 04 | 01 | 01 | 03 | 02 |
|----|----|----|----|----|----|----|----|
| 07 | 06 | 06 | 04 | 02 | 01 | 07 | 04 |
| 05 | 06 | 03 | 02 | 01 | 01 | 00 | 00 |
| 03 | 02 | 02 | 07 | 04 | 05 | 00 | 01 |
| 03 | 02 | 07 | 01 | 00 | 05 | 05 | 04 |
| 06 | 05 | 01 | 01 | 00 | 06 | 02 | 02 |
| 01 | 07 | 02 | 06 | 03 | 05 | 04 | 00 |
| 01 | 07 | 06 | 06 | 07 | 03 | 02 | 03 |

As indicated by the above table, after the symbolic substitution of process 46, each pixel is still represented as a full byte.

It has been found, according to this embodiment of the invention, that byte packing can be done in such a manner as to ignore pixel boundaries, such that the color information for a pixel may be partially contained in one of the packed bytes and partially contained in the next packed byte in sequence. After the symbolic substitution of process 46, byte packing process 47 according to this embodiment of the invention is then performed to reduce the number of bits required to store the image table to the minimum required.

For the example described hereinabove, it is seen that a full byte is used to represent eight possible values, which at most require three bits; the preceding table thus includes five unnecessary bits for each pixel. Process 47 thus may be considered to include the operation of discarding the excess bits, such that only three bits per pixel (in this example) are used. The exemplary image table may thus be expressed, in binary form, as follows:

| 010 | 110 | 101 | 100 | 001 | 001 | 011 | 010 |
|-----|-----|-----|-----|-----|-----|-----|-----|
| 111 | 110 | 110 | 100 | 010 | 001 | 111 | 100 |
| 101 | 110 | 011 | 010 | 001 | 001 | 000 | 000 |
| 011 | 010 | 010 | 111 | 100 | 101 | 000 | 001 |
| 011 | 010 | 111 | 001 | 000 | 101 | 101 | 100 |
| 110 | 101 | 001 | 001 | 000 | 110 | 010 | 010 |
| 001 | 111 | 010 | 110 | 011 | 101 | 100 | 000 |
| 001 | 111 | 110 | 110 | 111 | 011 | 010 | 011 |

According to this embodiment of the invention, this image table may be packed into eight-bit bytes by regrouping the bits in this table into groups of eight, rather than into groups of three as used to represent the eight colors of the image. This regrouping of the digital information without regard to pixel boundaries is made possible by the subsequent spline-wavelet operations, in which the image data is transformed; as such, it has been discovered that pixel boundaries need not be maintained in the byte-packing process. Of course, if the number of colors of the document is such that the number of bits per pixel evenly divides into eight (i.e., one, two or four), the pixel boundaries will match up with the byte boundaries.

With reference to the eight-color example above, byte packing by process 47 will produce an image table in which the first byte in each row will contain the first two pixels plus the two most significant bits of the third pixel; the second byte will contain the least significant bit of the third pixel, the fourth and fifth pixels, and the most significant bit of the sixth pixel; and the third byte will contain the two least significant bits of the sixth pixel, and the seventh and eighth pixels. In general, additional zero bits may be added in order to arrive at full bytes, depending upon the number of pixels in the image. The exemplary image table noted above will appear as follows upon completion of byte packing operation 46':

| 01011010 | 11000010 | 01011010 |
|----------|----------|----------|
| 11111011 | 01000100 | 01111100 |
| 10111001 | 10100010 | 01000000 |
| 01101001 | 01111001 | 01000001 |
| 01101011 | 10010001 | 01101100 |
| 11010100 | 10010001 | 10010010 |
| 00111101 | 01100111 | 01100000 |
| 00111111 | 01101110 | 11010011 |

Represented in hexadecimal notation, the image table would be represented as:

| 5A | C2 | 5A |
|----|----|----|
| FB | 44 | 7C |
| B9 | A2 | 40 |
| 69 | 79 | 41 |
| 6B | 91 | 6C |
| D4 | 91 | 92 |
| 3D | 67 | 60 |
| 3F | 6E | D3 |

In this example, therefore, process 44' has compressed the sixty-four original bytes into twenty-four bytes, providing a compression ratio of 2.667 prior to decomposition. The compression ratio obtained by process 44' according to this embodiment of the invention will, of course, increase to the extent that fewer colors are necessary for the representation of the image; of course, the resultant image will be nearer the input document as more colors are allowed.

Upon completion of byte-packing process 47 (or 47', as the case may be), transformation process 44 (or 44') of FIG. 2 is thus completed, with the results forwarded by format converter 12 to spline-wavelet compressor 20 in PGM format which, as will be seen, is quite convenient for the compression operations to be described below. In addition, as is evident from the foregoing description, format converter 12 according to this embodiment of the invention is operable to convert a wide range of input document formats, including full color or gray scale representations, into a PGM format, with a significant amount of compression already achieved. For example, a 1024-by-1024 (pixels) image table reduces to a 128-by-1024 table for compression by spline-wavelet compressor 20.

b. Spline-wavelet compression

Referring back to FIG. 2, following completion of transformation process 44, spline-wavelet compressor 20 performs process 48, in which the byte-packed PGM format representation of the input document is decomposed; decomposition of the image information is an integral part of the compression of the document for transmission or storage. According to the present invention, the decomposition of process 48 may be performed according to one of three processes 48a, 48b, 48c (collectively referred to as process 48) utilizing spline-wavelet decomposition, each of which will be described in detail hereinbelow. As will become apparent, these alternative spline-wavelet decomposition processes 48 allow selection of the appropriate compression technique depending upon the performance of the compression and decompression systems, the desired compression ratio, the desired compression or decompression speed, and other parameters. According to the preferred embodiment of the invention, compression system 20 is multiply programmed so that the user may select the specific decomposition one of processes 48a, 48b, 48c.

In the general sense, decomposition process 48 is followed by quantization of the wavelet components of the decomposed image signal, in process 50; this quantization enables compression of the storage requirements for the input document, by eliminating from the information those components of the decomposed image that are unimportant to the image (as determined by the decomposition process). Decision 51 is then performed by compression system 20 to determine if the compression ratio after quantization process 50 is acceptable; if not, decomposition process 48, for additional levels, and quantization process 50 are again performed to further compress the image information. Upon the desired compression ratio being reached (as determined by decision 53), lossless compression may be performed by compression system 20 in process 52 according to conventional techniques, following which compression system 20, in process 54, formats the compressed image information into the format appropriate for communication over digital network 26 or for archival storage by way of disk storage 22, 24.

i. Construction of spline-wavelet compressor

Figure 4:
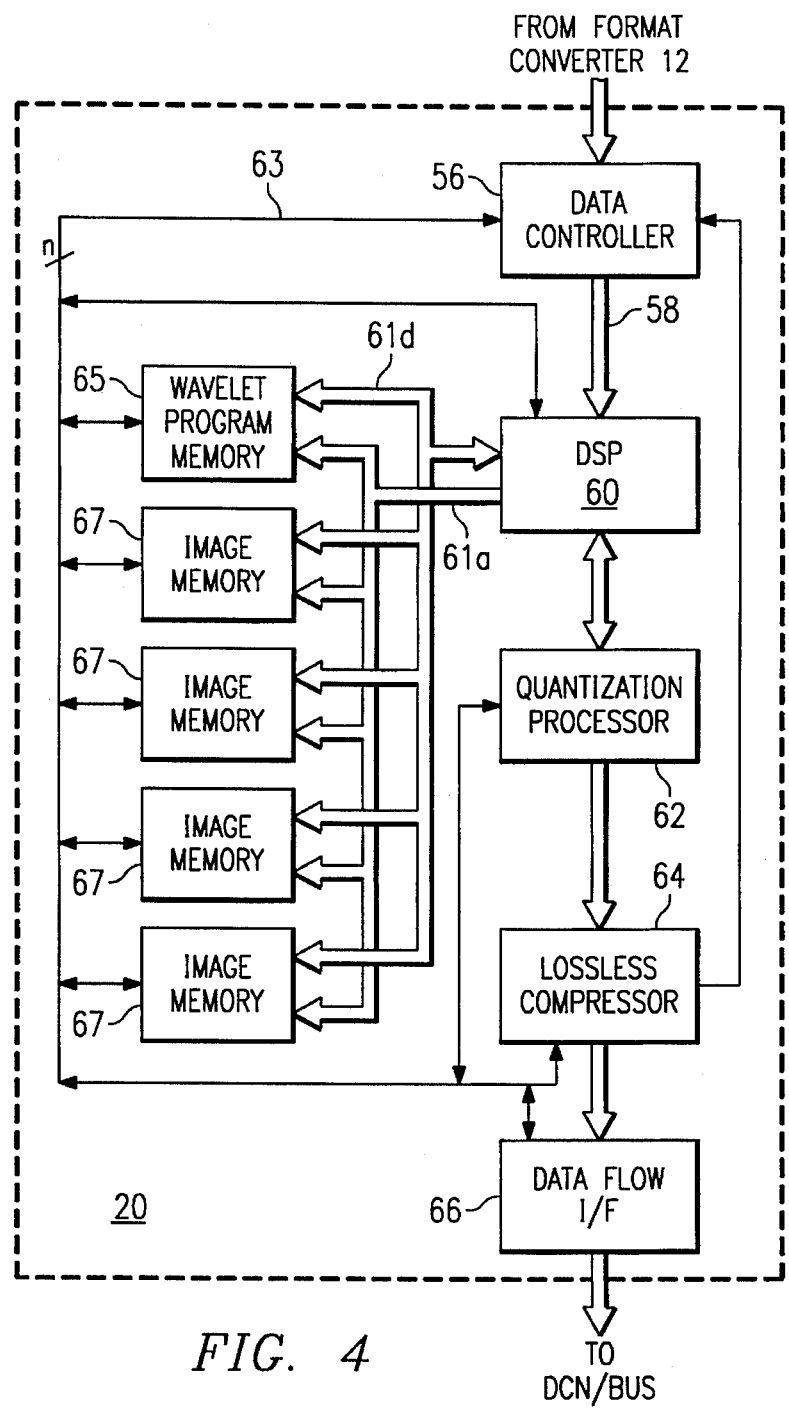
FIG. 4 is an electrical diagram, in block form, of the spline-wavelet compressor of the system of FIG. 1, according to the preferred embodiment of the invention.

Referring now to FIG. 4, the construction of spline-wavelet compressor 20 according to the preferred embodiment of the invention will now be described in detail. Spline-wavelet compressor 20 includes data controller 56, which receives the PGM formatted image information from format converter 12 and which also, according to this example, controls the operation of the other components within spline-wavelet compressor 20. In this example, data controller 56 presents and receives signals on control bus 63 to control the timing, feedback and transmission of information through and from spline-wavelet compressor 20, including the case where data received from format converter 12 is transmitted directly through spline-wavelet compressor 20 without compression. Data controller 56 is also preferably able to detect the presence of input data presented by format converter 12, and to detect the format or type of data so presented. In addition, data controller 56 also preferably receives control signals, for example from the computer into which compression system 10 is installed as an add-on function; these control signals may indicate the type of compression desired, the type of quantization to be performed, and the selection of other options available in the compression process, as will be described in detail hereinbelow. It is therefore contemplated that data controller 56 may be implemented as a relatively simple logic circuit, for example as implemented into a gate-array or other semi-custom logic circuit, for performing these functions.

In this embodiment of the invention, data controller 56 forwards the input data that it receives from format converter 12 to digital signal processor (DSP) 60 by way of data bus 58. DSP 60, as will be described in further detail hereinbelow, is the main processing unit for performing spline-wavelet decomposition process 48 (FIG. 2). Examples of a readily available digital signal processor suitable for use as DSP 60 according to this embodiment of the invention are the TMS320C25 and TMS320C30 digital signal processors manufactured and sold by Texas Instruments Incorporated; of course, other digital signal processors and microprocessors may alternatively be used to perform the spline-wavelet decomposition operations described hereinbelow. DSP 60 is coupled to data bus 61d and address bus 61a (collectively referred to as memory bus 61) for communication with program memory 65 and image memory 67. According to this embodiment of the invention, DSP 60 is programmed (by way of code stored within DSP 60 and also in program memory 65) to perform decomposition of the data in PGM format presented to it by data controller 56 on bus 58 according to pre-calculated decomposition coefficients stored in program memory 65. The image data is stored in image memory 67 before, during and after the decomposition; in this example, image memory 67 is arranged in four banks, totaling two megabytes in capacity. DSP 60 is also connected to control bus 63, so that it may be controlled by data controller 56 and so that it can effect the necessary control of other components in spline-wavelet compressor 20, including memory 65, 67, during the performance of decomposition process 48, described in further detail hereinbelow.

As noted above, according to this embodiment of the invention, spline-wavelet decomposition process 48 may be performed by DSP 60 according to one of several optional decomposition or compression modes, controlled by data controller 56. These modes may be selected by a code communicated by data controller 56 to DSP 60 over control bus 63, an example of which is as follows:

| | |
|---|---|
| 0 | No compression |
| 1 | Dual base wavelet decomposition |
| 2 | Interpolatory wavelet decomposition |
| 3 | Wavelet packet decomposition |
| 4–7 | Reserved |

Each of the three decomposition techniques, and the resulting compression of the input document, will be described in detail hereinbelow.

DSP 60 is also bidirectionally coupled to quantization processor 62, to which DSP 60 forwards the results of the decomposition process. Quantization processor 62 quantizes the decomposed information (process 50 of FIG. 2) and forwards the same to lossless compressor 64 or back to DSP 60, depending upon the results of decision 51 in determining whether the desired compression ratio has been reached. The details of quantization process 50 will be described in further detail hereinbelow. According to this embodiment of the invention, quantization processor 62 is preferably implemented as a programmable microprocessor or custom logic circuit for performing the functions described hereinbelow; such implementation is believed to be readily apparent to one of ordinary skill in the art having reference to this description.

Quantization process 50 may be performed by quantization processor 62 according to one of various selectable conventional quantization modes, under the control of data controller 56 via control bus 63. These modes may be communicated to a three-bit quantization mode register within quantization processor 62, which controls the type of quantization to be performed. An example of the quantization codes and their corresponding quantization modes are as follows:

| | |
|---|---|
| 0 | No quantization |
| 1 | thresholding |
| 2 | scalar quantization |
| 3 | JPEG quantization (i.e., using tables) |
| 4 | Federal Bureau of Investigation quantization standard for fingerprints |
| 5–7 | reserved for other quantization modes (e.g., vector quantization) |

Upon completion of quantization process 50, and decision 51 indicating that the desired compression ratio has been reached, quantization processor 62 presents its results to lossless compressor 64 for lossless compression process 62.

Lossless compressor 64 may be implemented by way of a conventional digital signal processor such as the TMS320C40 or TMS320C30 available from Texas Instruments Incorporated, the i860 processor available from Intel Corporation, or general purpose microprocessors such as the 80386 and 80486 available from Intel Corporation or the 68030 and 68040 available from Motorola, programmed in such a manner as to perform lossless compression process 52 upon the data from quantization processor 62. Lossless compression process 62 may be performed by lossless compressor 64 according to the desired conventional technique, such as Huffman encoding, adaptive Huffman encoding, arithmetic encoding, LSQ coding, and the like. Alternatively, lossless compressor 64 may be implemented as a custom logic circuit for providing this function.

The output of lossless compressor 64 is preferably compressed data in a bitstream format, and is presented to data flow interface 66. Data flow interface 66 provides an interface between spline-wavelet compressor 20 and network 26 or bus 25, and as such must arrange the bitstream output from lossless compressor 64 and arrange the same into a suitable format for transmission. Data flow interface 66 also provides a feedback signal to data controller 56 upon transmission of a frame of compressed data, based upon which data controller 56 may commence the processing of the next image to be compressed.

ii. Spline-wavelet decomposition

As noted above, according to this embodiment of the invention, spline-wavelet compressor 20 is operable to perform decomposition process 48 according to any one of three types of variations on a general spline-wavelet decomposition algorithms, namely dual-base wavelets, interpolatory wavelets, and wavelet packets. As each of the variations have different advantages relative to the others, the selection of a variation will depend upon the particular compression parameters for the input document to be compressed, and also will depend upon the decompression application (i.e., communication, archive retrieval, etc.). In summary, it is contemplated that dual-base wavelet decomposition will provide reasonable quality at reasonable computational speed, and as such will be useful as a default decomposition mode. It is contemplated that interpolatory wavelet decomposition will provide higher computational speed at a cost of reduced image reproduction quality, while wavelet packet decomposition will provide high quality and high compression ratio at a cost of slower execution speed.

Two of these three approaches, specifically the dual-base wavelets and interpolatory wavelets, utilize half-tree decomposition and reconstruction, while the wavelet packet approach utilizes full-tree decomposition. Since a great deal of commonality exists between the two half-tree approaches, a generalized description of such half-tree decomposition using spline-wavelets techniques, encompassing both the dual-base wavelet and interpolatory wavelet approaches, will first be discussed.

(a) Half-tree spline-wavelet decomposition

In general, given an input signal function $f(x)$, a scaling (spline) function $\phi(x)$, and a wavelet function $\psi(x)$, one may project the input signal function $f(x)$ as a sequence of scaling function approximation coefficients $\{c_n^0\}$ associated with the spline function $\phi(x)$. These scaling function coefficients $\{c_n^0\}$ may be convolved with a sequence of scaling function decomposition coefficients $\{a_n\}$ to provide a low pass filter result, decomposing the projected scaling function coefficients $\{c_n^0\}$ into a blur, or low-frequency, component $\{c_n^{-1}\}$. Conversely, convolution of the approximation coefficient sequence $\{c_n^0\}$ with a sequence of wavelet function decomposition coefficients $\{b_n\}$ provides a band pass filter result, decomposing the projected scaling function approximation coefficients $\{c_n^0\}$ into a wavelet (or high frequency) component $\{d_n^{-1}\}$. This filtering and decomposition can then be repeated to the degree desired, such that the input signal function $f(x)$ is governed by approximation coefficient sequences $\{c_n^{-j}\}$, $\{d_n^{-j}\}$, where j is the level of decomposition.

Figure 5A:
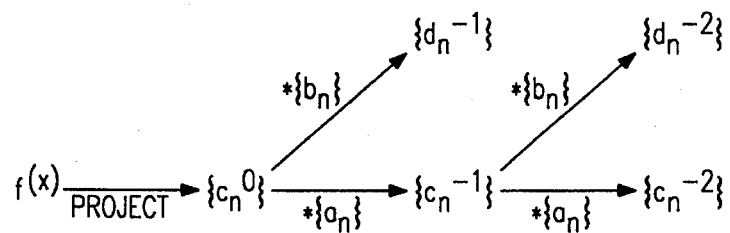
FIGS. 5a and 5b are tree diagrams illustrating the decomposition and reconstruction of a signal function according to spline-wavelet techniques.

FIG. 5a illustrates a tree for the projection and decomposition of input signal $f(x)$ to two levels (i.e., j=2). As illustrated in FIG. 5a, the input signal function $f(x)$ is first projected into spline coefficients $\{c_n^0\}$. Convolution of spline approximation coefficient sequence $\{c_n^0\}$ with decomposition sequences $\{a_n\}$, $\{b_n\}$ produces low-pass component approximation coefficient sequence $\{c_n^{-1}, \{b_n\}$ and band-pass component approximation coefficient sequence $\{d_n^{-1}\}$. Decomposition of low-pass spline approximation coefficient sequence $\{c_n^{-1}\}$ with decomposition sequences $\{a_n\}$, $\{b_n\}$ produces second-level low-pass and band-pass approximation coefficient sequences $\{c_n^{-2}\}$, $\{d_n^{-2}\}$, respectively.

Figure 5B:
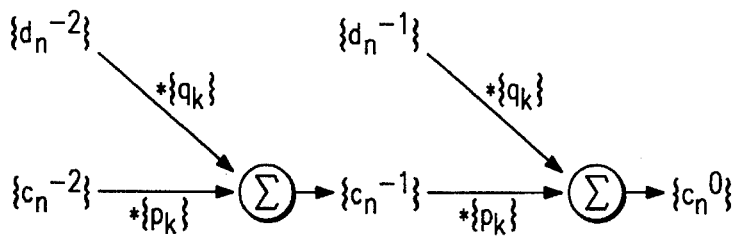

For the two level case of FIG. 5a, the input signal function f(x) can be represented by the approximation coefficient sequences $\{c_n^{-2}\}$, $\{d_n^{-1}\}$, and $\{d_n^{-2}\}$, assuming that one may reconstruct sequence $\{c_n^{-1}\}$ from sequences $\{c_n^{-2}\}$ and $\{d_n^{-2}\}$. Level-by-level reconstruction is illustrated in FIG. 5b for this two-level case, beginning with the reconstruction of low pass component sequence $\{c_n^{-1}\}$ from sequences $\{c_n^{-2}\}$, $\{d_n^{-2}\}$ by convolution of the approximation coefficient sequences with reconstruction sequences $\{p_k\}$, $\{q_k\}$, respectively, and summing of the results. The next level involves the reconstruction of $\{c_n^0\}$, by convolution of approximation sequence components $\{c_n^{-1}\}$, $\{d_n^{-1}\}$ again with reconstruction sequences $\{p_k\}$, $\{q_k\}$, respectively, followed by summing of the results to arrive at approximation coefficient sequence $\{c_n^0\}$.

The efficiency and performance of any procedure for performing this decomposition and reconstruction, both for the methods according to the present invention and, in general, for all wavelet-based algorithms, depends upon the length and data type (i.e., integer, floating point, rational, irrational) of the decomposition sequences $\{a_n\}$, $\{b_n\}$ and the reconstruction sequences $\{p_k\}$, $\{q_k\}$. The values contained within these sequences depend primarily on the wavelet selected for use in the decomposition. In many cases, particularly those in the prior art, the sequences $\{a_n\}$, $\{b_n\}$, $\{p_k\}$, $\{q_k\}$ are of infinite length and thus require truncation, and result in inefficient and inaccurate computation when attempted in conventional data processing equipment.

According to the preferred embodiment of the invention, the wavelet function selected for use in the decomposition is the compactly supported linear boundary spline wavelet or "boundary spline-wavelet" described in Chui and Quak, "Wavelets on a Bounded Interval", *Numerical Methods of Approximation Theory*, Volume 9 (Dec. 1992), pp. 53–75, incorporated herein by this reference. An advantageous feature of this wavelet is that its scaling function is a linear B-spline $\phi_2(x)$ having the following explicit formula:

$$\phi_2(x) = \begin{cases} x & x \text{ in } [0,1) \\ 2-x & x \text{ in } [1,2) \\ 0 & \text{otherwise} \end{cases} \quad (1)$$

Figure 6:
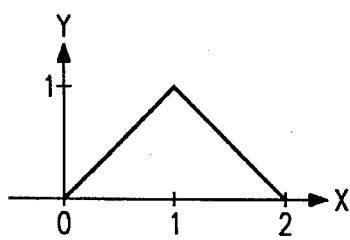
FIG. 6 is a graphical illustrations of the cardinal B-spline scaling function utilized according to the preferred embodiment of the invention.

FIG. 6 graphically illustrates scaling function $\phi_2(x)$. This function has an extremely simple representation, and requires small support, such that any implementations including the evaluation of the wavelet, decomposition, and reconstruction, may be done effectively. Furthermore, it has been found that the linear B-spline satisfies the two-scale relation:

$$\phi_2(x) = \sum_{k=0}^{2} p_n \phi_2(2x - k) \quad (2)$$

where $$p_k = 2^{-m+1} \binom{m}{k} \quad (3)$$

For the case where m=2, and k={0, 1, 2}, $p_k$=½{1, 2, 1}.

For one-dimensional space, the linear spline wavelet function $\psi_2(x)$ may be explicitly expressed as:

$$\psi_2(x) = \sum_{k=0}^{4} q_k \phi_2(2x - k) \quad (4)$$

where:

$$q_k = (-1)^k 2^{-1} \sum_{l=0}^{2} \binom{2}{1} \phi_4(k+1-l), k=0,1,\ldots,4 \quad (5)$$

The expression for the linear spline wavelet $\psi_2(x)$ is in terms of the scaling function $\phi_2(x)$, which allows for relatively easy evaluation. These two scale relations of the linear B-spline and wavelets also provide a basis for general multiresolution analysis, which is utilized according to the preferred embodiment of the invention.

As is known in the art, any cardinal B-spline generates a multi-resolution analysis (MRA). Specifically, the collection of integer translates of a cardinal B-spline scaling function $\phi$ constitutes an approximation space $V_0$, using, for each integer j, the notation:

$$V_j = \left\{ \begin{array}{c} \sum_k \alpha_k \phi(2^j x - k) \\ \hline \sum_k |\alpha_k|^2 < \infty \end{array} \right\} \quad (6)$$

and the notation $\phi(x) = N_m(x)$, for the mth B-spline (usually with m=2). For the scaling function $\phi$ to generate a multi-resolution analysis, the approximation spaces are related as follows:

$$\ldots V_{-2} \subset V_{-1} \subset V_0 \subset V_1 \subset V_2 \ldots$$

For each j, since $V_j \subset V_{j+1}$, there is a unique subspace $W_j$ in $V_{j+1}$ which is the orthogonal complement of $V_j$. This subspace $W_j$ is called the wavelet subspace of $V_{j+1}$, represented by the notation:

$$V_{j+1} = V_j \oplus W_j \quad (7)$$

The approximation space $V_0$ is generated by the integer translates of scaling function $\phi$; more generally, the $j^{th}$ approximation space $V_j$ is generated by $k/2^j$. Similarly, the wavelet subspace $W_j$ is generated by $k/2^j$ translates of a spline-wavelet $\psi_m(x)$, namely:

$$W_j = \frac{\sum_k B_k \psi_m(2^j x - k)}{\sum_k |B_k|^2 < \infty} \quad (8)$$

Based upon the foregoing, according to the preferred embodiment of the invention, decomposition process 48 will now be generally described relative to FIG. 6; note that certain options in the particular spline and wavelet functions will be described in further detail hereinbelow. Process 48 begins with the projection of the input signal function f(x) into spline space, in process 68. In this example, it is preferred from the standpoint of computational simplicity to use the linear B-spline-wavelets, although higher order spline-wavelets may alternatively be used; it should be noted, however, that odd ordered spline-wavelets (i.e., linear, cubic, etc.) are preferably used according to the present invention.

According to the foregoing notation, the projection, or mapping, of the one-dimensional input function f(x) into spline space corresponds to the operation $f(x) \in V_m$. In the one-dimensional linear case, the input signal function f(x) maps to the function $f_0(x)$ in spline space $V_0$, which may be represented as follows:

$$f_0(x) = \sum_k c_k^0 \phi(x-k) \qquad (9)$$

where k corresponds to the number of input signal samples over a selected interval. In the linear spline space $V_0$, the signal function $f_0(x)$ may be represented by the spline coefficients $\{c_k^0\}$. In the case of the linear B-spline, it is apparent that $$f_0(k) = c_k^0 \qquad (10)$$

giving rise to the properties that (i) the approximation coefficient sequence $\{c_k^0\}$ is exactly the original sequence of input signal samples, and (ii) the function $f_0(x)$ is exactly represented as the joining line segments between the input signal sample points.

Of course, the documents upon which the present invention is intended to operate are two-dimensional in nature; for example, the input signal function may be represented as $f_0(x,y)$. Process 68 of FIG. 7 thus operates to project the input signal function into bilinear spline space. In this regard, consider a rectangle [a, b] by [c, d] to be partitioned into $2^{I+J}$ subrectangles of equal size, each subrectangle being represented as $[x_i, x_{i+1}]$ by $[y_j, Y_{j+1}]$, where:

$$x_i = \frac{b-a}{2^I} i + a, i = 0, 1, \ldots, 2^I \qquad (11)$$

$$y_j = \frac{d-c}{2^J} j + c, j = 0, 1, \ldots, 2^J \qquad (12)$$

As a result, the rectangle is represented by $(2^I+1)(2^J+1)$ equally spaced grid points $(x_i, y_j)$ for i from 0 to $2^I$, and for j from 0 to $2^J$ over the rectangle [a, b] by [c, d].

In process 68, a sampled input signal sequence $f(x_i, y_j)$ over the range of i from 0 to $2^I$, and j from 0 to $2^J$, is received in PGM format from format converter 12 by DSP 60 in spline-wavelet compressor 20. In the general case, process 68 projects the sampled inputs signal sequence $f(x_i, y_j)$ by application of a bilinear spline function into a sequence $(S_{I,J}f)(x,y)$ as follows:

$$(S_{I,J}f)(x,y) = \qquad (13)$$

$$\sum_{i=0}^{2^I} \sum_{j=0}^{2^J} z_{i,j} \Phi\left(2^I \frac{x-a}{b-a} - i\right) \Phi\left(2^J \frac{y-c}{d-c} - j\right)$$

We will represent the matrix of $z_{i,j}$ as the sequence of input approximation coefficients $\{c^0\}$. Process 68 concludes by storing the sequence $\{c^0\}$ in image memory 67.

It has been found that the sequence $(S_{I,J}f)(x,y)$ has important properties that are useful in the compression of documents according to the preferred embodiment of the invention, and particularly in the compression of two-color, or binary, documents. Firstly, the sequence $(S_{I,J}f)(x,y)$ is a bilinear spline function that is continuous over the rectangle [a, b] by [c, d], and its restrictions on the subdivided sub-rectangles $[x_i, x_{i+1}]$ by $[y_j, y_{j+1}]$ for integers i from 0 to $2^I$, and integers j from 0 to $2^J$ are all bilinear polynomials. Secondly, the sequence $(S_{I,J}f)(x,y)$ agrees exactly with the sampled input signal sequence $f(x_i, y_j)$ at the grid points. Thirdly, the sequence $(S_{I,J}f)(x,y)$ has the second order of approximation, in that:

$$|(S_{I,J}f)(x,y) - f(x,y)| \le (\text{constant}) 2^{-2(I+J)} \qquad (14)$$

for all points (x,y) within the rectangle [a, b] by [c, d], and for all smooth functions f(x,y), with the constant being independent of the number of grid points and grid lines.

Following projection process 68, spline-wavelet decomposition may now be done, in the general sense, by decomposition of the input approximation coefficient sequence $\{c^0\}$ into low-pass and band-pass components. The ability to perform such decomposition is due to the multi-resolution analysis properties discussed above.

For purposes of explanation, in a one-dimensional case, let one-dimensional functions $f_j(x)$ and $g_j(x)$ be represented as follows:

$$f_j(x) = \sum_k c_k^j \phi(2^j x - k) \qquad (14)$$

$$g_j(x) = \sum_k d_k^j \psi(2^j x - k) \qquad (15)$$

From multi-resolution analysis, an approximated signal $f_m(x)$ can be decomposed into the sequence:

$$f_m(x) = g_{m-1}(x) + g_{m-2}(x) + \ldots + g_{m-m'}(x) + f_{m-m'}(x) \qquad (16)$$

where m'<m, and where $g_j(x) \in W_m$ and $f_j(x) \in V_j$.

Recalling from multi-resolution analysis that spline space $V_{j+1} = V_j \oplus W_j$, that $V_j \subset V_{j+1}$ and that $W_j \subset V_{j+1}$, in terms of the functions f(x) and g(x), decomposition may be considered as:

$$f_{j+1}(x) = f_j(x) + g_j(x) \qquad (17)$$

In this embodiment of the invention, the function $g_j(x)$ provides the higher-frequency details of the image (i.e., edges and corners) at the $j^{th}$ level of decomposition, while the function $f_j(x)$ provides a low-frequency approximation of the image. While one-dimensional functions f(x) and g(x) are used hereinabove for explanation, it is of course to be understood that two-dimensional decomposition functions f(x,y) and g(x,y), as useful in the decomposition of a two-dimensional functions representative of a document, may be obtained in a similar way (i.e., via the tensor product).

One can thus determine a relationship between a higher-level approximation coefficient sequence $\{c^{j+1}\}$ and its lower-level component approximation coefficient sequences $\{c^j\}, \{d^j\}$ as follows:

$$c_k^j = \sum_l a_{2k-l} c_l^{j+1} \qquad (18)$$

$$d_k^j = \sum_l b_{2k-l} c_l^{j+1} \qquad (19)$$

indicating that spline-wavelet decomposition according to the present embodiment of the invention may be performed by convolution of the approximation coefficient sequences with decomposition sequences $\{a_n\}, \{b_n\}$.

Figure 7:
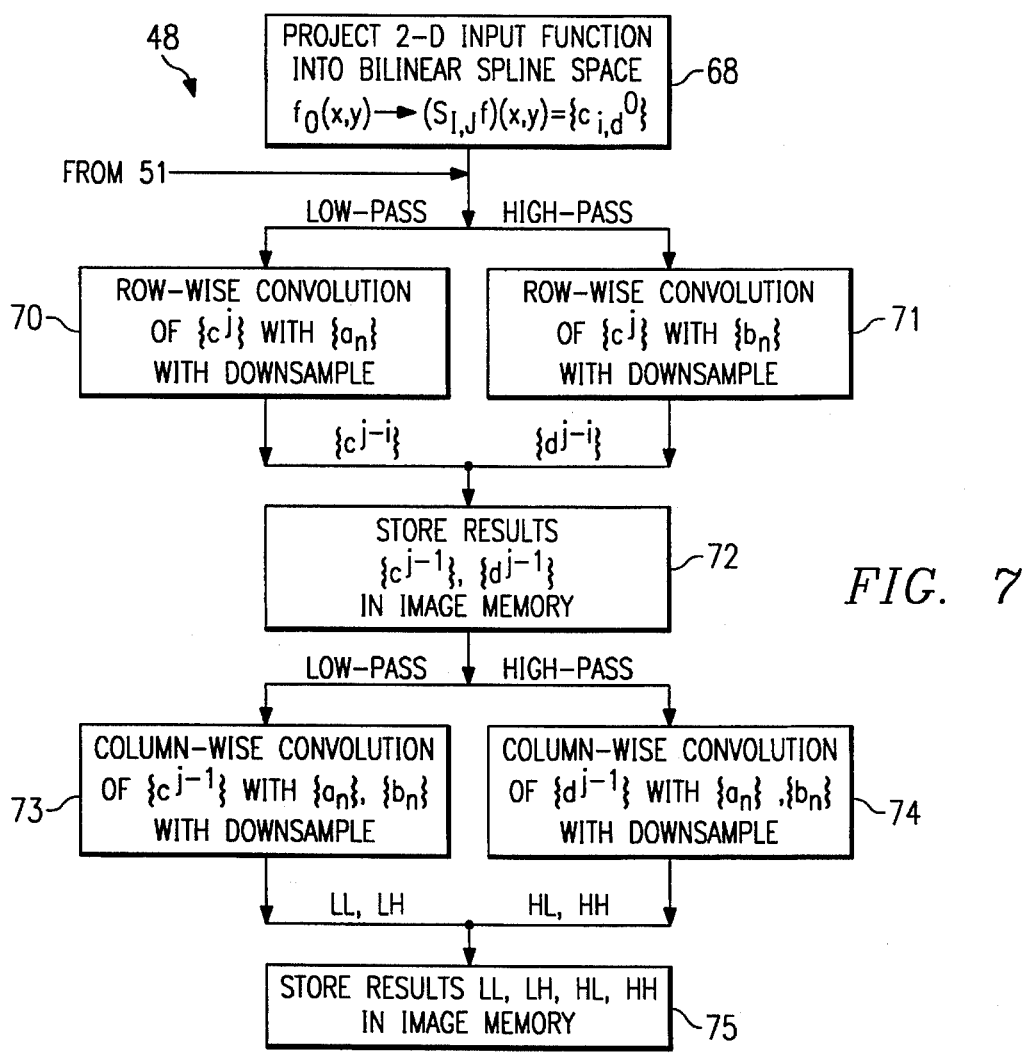
FIG. 7 is a flow diagram illustrating the general procedure for spline-wavelet decomposition of a document according to the preferred embodiment of the invention.

Accordingly, referring now to the illustration of the generalized method of FIG. 7 for the decomposition of a document, subprocesses 70 and 71 of decomposition 48 are performed upon the input signal coefficient sequence $\{c^0\}$; FIG. 7 shows subprocesses 70, 71 operating upon a generalized sequence $\{c^j\}$, considering that the input to processes 70 and 71 will be a previously decomposed component sequence in the case where decision 51 (FIG. 2) requires additional decomposition to obtain the desired compression ratio. According to this embodiment of the invention, processes 70, 71 analyze the input sequence in row-wise fashion first. Subprocess 70 performs the convolution of the sequence $\{c^j\}$ with a coefficient sequence $\{a_n\}$ that corresponds with the selected linear B-spline function, as noted above relative to FIG. 5a. This convolution of process 70 is followed by a downsampling operation in which every other discrete result of the convolution operation is discarded, for example each odd-numbered sample; as will be evident from the detailed description hereinbelow, this downsampling may be an inherent result of the convolution operation. The result of process 72 is sequence $\{c^{j-1}\}$, which is then stored back into image memory 67.

Similarly, to derive the row-wise high-pass component of the input signal, input signal coefficient sequence $\{c^0\}$, or generally the sequence $\{c^j\}$ (whether initiated by projection process 68 or repetitively from a prior decomposition) is convolved with coefficient sequence $\{b_n\}$ that corresponds with the selected wavelet function in process 71. This convolution of process 71 is followed by, or incorporates, a downsampling operation in which every other discrete result of the convolution operation is discarded, for example each odd-numbered sample. The result of process 73 is the sequence $\{d^{j-1}\}$, which is then stored back into image memory 67 along with the low-pass sequence $\{c^{j-1}\}$ in process 72.

Subprocesses 73, 74 are then performed, in which the decomposition of the results $\{c^{j-1}\}$, $\{d^{j-1}\}$ are similarly decomposed, but in a column-wise fashion. As such, subprocess 73 convolves the blur image, i.e. $\{c^{j-1}\}$, with both spline function coefficient sequence $\{a_n\}$ and wavelet function coefficient sequence $\{b_n\}$, followed by or incorporating therein a downsampling by a factor of two. The result of subprocess 73 is the blur portion of the two-dimensional image (referred to as the LL component) corresponding to the column-wise low-pass filtered component of row-wise low-pass filtered result $\{c^{j-1}\}$, and a higher-frequency component (referred to as the LH component) corresponding to the column-wise low-pass filtered component of the row-wise high-pass filtered result $\{d_{j-1}\}$. Similarly, subprocess 74 convolves and downsamples the wavelet component $\{d^{j-1}\}$ with both spline and wavelet function coefficient sequences $\{a_n\}$, $\{b_n\}$, respectively. The result of subprocess 74 is the high-frequency component of the two-dimensional image referred to as the HL component, which corresponds to the column-wise high-pass filtered component of the row-wise low-pass filtered result $\{c^{j-1}\}$, and the highest frequency component referred to as the HH component, which corresponds to the column-wise high-pass filtered component of the row-wise high-pass result $\{d_j^{-1}\}$. The component results LL, LH, HL, HH are stored back into image memory 67 in process 75, for quantization by process 50 of the flow of FIG. 2.

(i) Dual Base Wavelet Decomposition

According to a first embodiment of the invention, decomposition process 48a takes advantage of the duality principle for certain wavelets, as described in Chui, et al., "Fast integral wavelet transform on a dense set of time-scale domain", *CAT Report* 310 (Center for Approximation Theory, Texas A&M University, September 1993). Through use of the duality principle, it has been discovered that each element of both decomposition coefficient sequences $\{a_n\}$, $\{b_n\}$, and of both reconstruction coefficient sequences $\{p_n\}$, $\{q_n\}$ may be expressed as a rational number. Integer scaling of these sequences thus allows for all of the matrix operations of process 48a to be integer operations, and can thus be performed very quickly and efficiently by integer-based DSP 60, such as the TMS 320C25 or the like, in spline-wavelet compressor 20. It is therefore preferred, according to the present invention, that the default condition of spline-wavelet compressor be set to perform decomposition according to process 48a, using the dual wavelet approach.

For purposes of explanation, and as noted in the above-referenced Chui et al. paper, a "dual" function $\tilde{\phi}_m(x)$ of the ruth order B-spline function $\phi_m(x)$ exists, such that:

$$\tilde{\phi}_m(x) \quad clos_{L^2} \, span\{\phi_m(x-k) | k \, Z\} \tag{20}$$

and such that:

$$\int \phi_m(x-k)\tilde{\phi}_m(x-l)dx = \delta_{k,l} = \begin{cases} 1 & k=l \\ 0 & k \neq l \end{cases} \tag{21}$$

It is preferred that the order m be even-numbered; the most useful case is the linear case (m=2), in which:

$$\tilde{\phi}_2(x) = \frac{1}{6} \{\tilde{\phi}_m(x+1) + 4\tilde{\phi}_2(x) + \tilde{\phi}_2(x-1)\} \tag{22}$$

Because of this relationship, one may perform wavelet decomposition in dual space, using linear dual spline function $\tilde{\phi}_2(x)$ together with linear dual wavelet function $\tilde{\psi}_2(x)$ (i.e., the dual of linear wavelet function $\psi_2(x)$).

Linear wavelet function $\psi_2(x)$, in this example, is preferably the following function:

$$\psi_2(x) := \sum_n q_n N_2(2x-n) \tag{23}$$

where, for m generally:

$$q_n = \frac{(-1)^n}{2^{m-1}} \sum_{l=0}^{m} \binom{m}{l} N_{2m}(n+1-l), m=0,1,\ldots,3m-2 \tag{24}$$

For a discussion of these functions in the general case (for order m), attention is directed to Chui, *An Introduction to Wavelets* (Academic Press, 1992), incorporated herein by this reference; particular attention is directed to pages 182–186 in this regard. By way of the duality principle noted above, the dual of linear wavelet function $\psi_2(x)$ may therefore be expressed as follows:

$$\tilde{\psi}_2(x) = -\frac{1}{2} \sum_{k=-\infty}^{\infty} c_k^4 \psi_2(x+3-k) \tag{25}$$

Id., at 185.

By way of further explanation, use of the dual base wavelet decomposition technique will first be described relative to a one-dimensional sampled input signal $f(k/2^J)$, where $2^J$ is the number of sample points in the input sequence and where k is the sample point index in the sequence. Projection of the sampled input signal onto spline space results in the function $f_J(x)$ as follows:

$$f_J(x) = \sum_k f\left(\frac{k}{2^J}\right) \phi_2(2^J x + 1 - k) \tag{26}$$

The function $f_J(x)$ thus provides a continuous representation of the sampled input signal $f(k/2^J)$. As noted above relative to process 68 of FIG. 7, since the approximation coefficient sequence $\{c_k^0\}$ is exactly the original sequence of input signal samples, projection of the function $f_J(x)$ into spline space as a set of approximation coefficients requires no computation in this case and results in the original sampled input signal sequence $f(k/2^J)$.

Next, using the duality principle according to this embodiment of the invention, the continuous function $f_J(x)$, as represented by the approximation coefficient sequence represented directly by the sampled input signal sequence $f(k/2^J)$, is changed into a dual approximation coefficient sequence by way of a coefficient sequence $c_k^J$ determined by equation (22) above as follows:

$$c_k^J = \frac{1}{6} \left\{ f\left(\frac{k}{2^J}\right) + 4f\left(\frac{k+1}{2^J}\right) + f\left(\frac{k+2}{2^J}\right) \right\} \tag{27}$$

Referring back to the decomposition tree of FIG. 5a, the following dual space decomposition formulae may be readily derived:

$$c_k^j = \sum_{l=2k-m}^{2k} a_{2k-l} c_l^{j+1} \tag{28}$$

$$d_k^j = \sum_{l=2k-3m+2}^{2k} b_{2k-l} c_l^{j+1} \tag{29}$$

using the finite decomposition sequences $a_k$, $b_k$, as follows:

$$a_k = 2^{-m} \binom{m}{k} \quad k=0,1,\ldots,m \tag{30}$$

$$b_k = \frac{(-1)^k}{2^m} \sum_{l=0}^{m} \binom{m}{l} \phi_{2m}(k+1-l) \quad k=0,\ldots,3m-2 \tag{31}$$

In the linear (m=2) case, the sequences $a_k$, $b_k$ equal:

$$\{a_0,a_1,a_2\} = \frac{1}{4}\{1,2,1\}, \quad a_k = 0 \text{ for all other } k \tag{32}$$

$$\{b_0,b_1,b_2,b_3,b_4\} = \frac{1}{24}\{1,-6,10,-6,1\}, \quad b_k = 0 \text{ for all other } k \tag{33}$$

Further, the reconstruction sequences $\{p_k\}$, $\{q_k\}$ equal the decomposition sequences $\{a_k, b_k\}$. In addition, reference to the summation limits in equations (28), (29) will show that the convolution operation will also result in downsampling of the results, by a factor of two. As will be indicated hereinbelow, the results of this convolution operation will provide both low-pass and high-pass component results that can be stored in the same memory space as that which originally contained the input sequence.

As is evident from the foregoing, the decomposition sequences $\{a_k, b_k\}$ will be quite advantageous from the standpoint of implementation into modern data processing equipment, since each sequence is a finite sequence of rational numbers. The decomposition routine is thus very similar to a digital FIR (finite impulse response) filter. As such, dual base wavelet decomposition process 48a is very efficient when performed by spline-wavelet compressor 20 on two-dimensional input data representative of a document, as will now be described relative to FIGS. 8 and 9.

Figure 8:
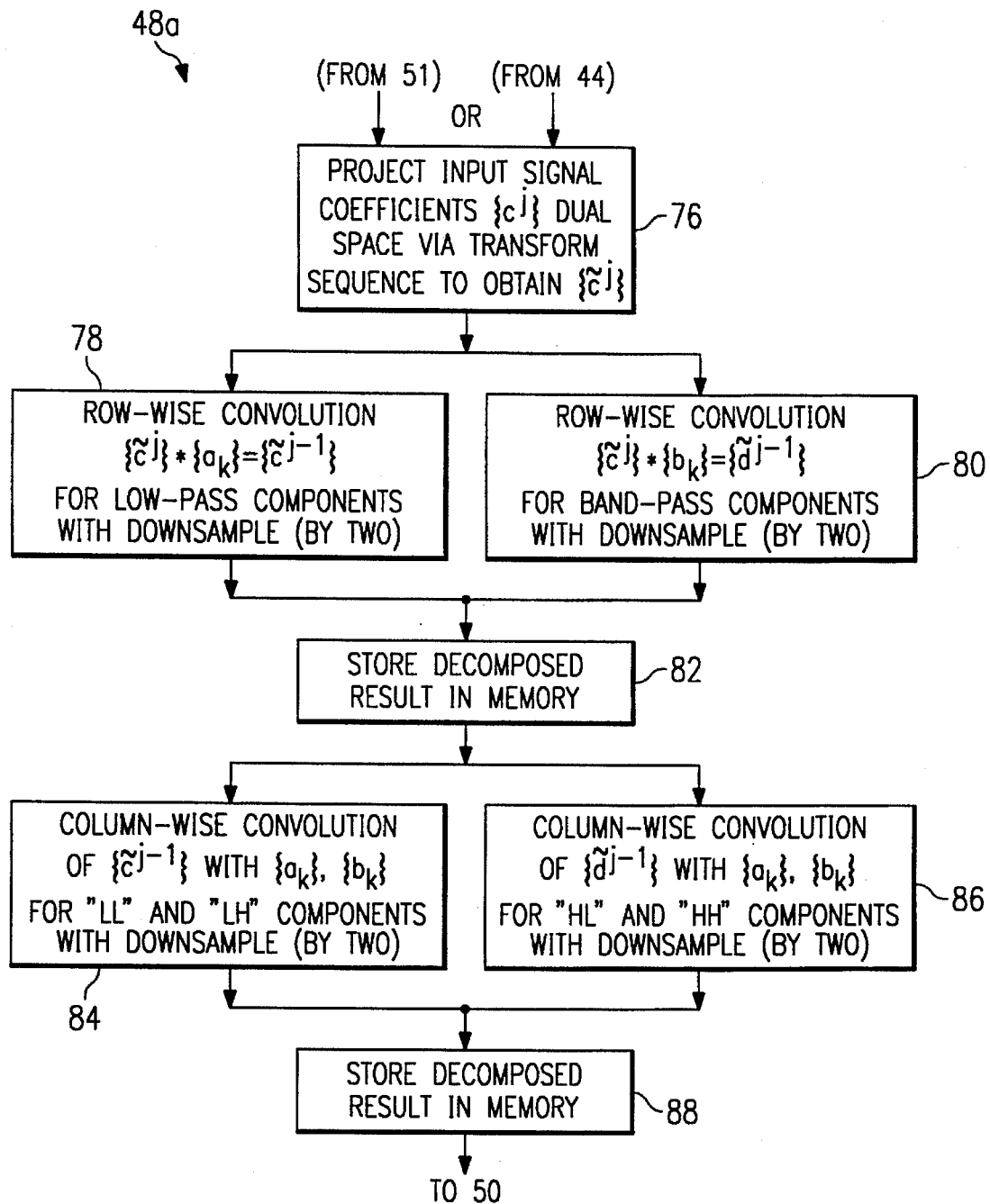
FIG. 8 is a flow diagram illustrating the procedure for spline-wavelet decomposition of a document according to a first alternative implementation of the invention, specifically the dual-base technique.

Decompression process 48a of FIG. 8 begins with process 76, in which the two-dimensional input signal coefficient sequence $\{c^j\}$ is projected into dual spline space. In this example, the j term in the nomenclature $\{c^j\}$ indicates the order of decomposition, such that the coefficient sequence $\{c^0\}$ refers to the original input signal coefficient sequence. In the two-dimensional case, input signal coefficient sequence $\{c^0\}$ refers to the sequence $(S_{I,J}f)(x,y)$. Process 76 generates the dual representation $\{\tilde{c}^j\}$ as a series of coefficients according to the following sequence, analogously to equation (22) above, as follows:

$$\tilde{c}_{i,j} = (c_{i-1,j-1} + c_{i-1,j+1} + c_{i+1,j-1} + c_{i+1,j+1}) + 16c_{i,j} + 4(c_{i-1,j} + c_{i,j-1} + c_{i,j+1} + c_{i+1,j}) \tag{34}$$

where $$c_{-1,j} = c_{2l+1,j} = c_{i,-1} = c_{i,2l+1} = 0 \text{ for all } i,j$$

As a result, one may express the relationship between the spline space coefficient sequence $\{c^j\}$ and its dual coefficient sequence $\{\tilde{c}^j\}$ as follows:

$$(S_{I,J}f)(x,y) = \{c^j\} = \tag{35}$$

$$\frac{1}{36} \sum_{i=0}^{2^I} \sum_{j=0}^{2^J} \tilde{c}_{i,j} \phi_2\left(2^I \frac{x-a}{b-1} - i\right) \tilde{\phi}_2\left(2^J \frac{y-c}{d-c} - j\right)$$

Upon completion of process 76, the dual coefficient sequence $\{\tilde{c}^j\}$ is stored back into image memory 67.

Process 78 and 80 are then performed by way of which the row-wise decomposition processes are performed by DSP 60 using integer operations, as enabled by the dual base wavelet technique according to this embodiment of the invention. As noted above, the input sequence $\{c^j\}$ consisted of a two-dimensional array of values in PGM format; as such, the dual sequence $\{\tilde{c}^j\}$ similarly consists of such an array. Process 78 performs convolution of each row of the dual array sequence $\{\tilde{c}^j\}$ with a sequence $\{a_k\}$ derived as noted above, in the manner of a low-pass filter. In this example, where order m=2 (i.e., linear spline-wavelet analysis), the convolution of process 78 consists of the point-wise multiplication of each row in dual sequence $\{\tilde{c}^j\}$ with a sequence $\{a_k\}$ derived according to equation (28) noted above:

$$\tilde{c}_k^{j-1} = \sum_{l=2k-m}^{2k} a_{2k-l} \tilde{c}_l^j \tag{28}$$

where k is the position of each entry within the row of dual array sequence $\{\tilde{c}^j\}$. As noted in equation (32) for the linear case, the sequence $\{a_k\}$ is defined as:

$$\{a_0,a_1,a_2\} = \frac{1}{4}\{1,2,1\}, a_k = 0 \text{ for all other } k \tag{32}$$

The ¼ term may be applied to the resultant data later, allowing the convolution of process 78 to be performed solely with integer values. As noted above, the convolution of process 78 results in a convolution result $\{\tilde{c}^{j-1}\}$ that is inherently downsampled by a factor of two. For example, only the even-numbered values of the convolution results may be retained (given the summation limits noted above), with the odd-numbered values discarded. As will be evident hereinbelow, this downsampling allows for the same image memory space to be used to maintain the decomposed image.

Similarly, process 80 performs convolution of the dual space array sequence $\{\tilde{c}^j\}$ with a sequence $\{b_k\}$ derived as noted above, in the manner of a high-pass filter. As in the case of process 78, where the order m=2 (i.e., linear spline-wavelet analysis), the convolution of process 80 consists of the point-wise multiplication of each row in dual sequence $\{\tilde{c}^j\}$ with a sequence $\{b_k\}$ according to equation (29) noted above:

$$\tilde{d}_k^{j-1} = \sum_{l=2k-3m+2}^{2k} b_{2k-l} \tilde{c}_l^j \tag{29}$$

As noted in equation (33) above, for the linear case, the sequence $\{b_k\}$ may be calculated as follows:

$$\{b_0,b_1,b_2,b_3,b_4\} = \frac{1}{24}\{1,-6,10,-6,1\}, b_k = 0 \text{ for all other } k \tag{33}$$

Again, the ¹⁄₂₄ division may be performed at a later time, to allow the convolution of process 80 to be performed using only integer values. As noted above, the row-wise convolution of process 80 provides results $\{\tilde{d}^{j-1}\}$ that are downsampled by a factor of two, e.g. by retaining only the even-numbered entries.

Figure 9:
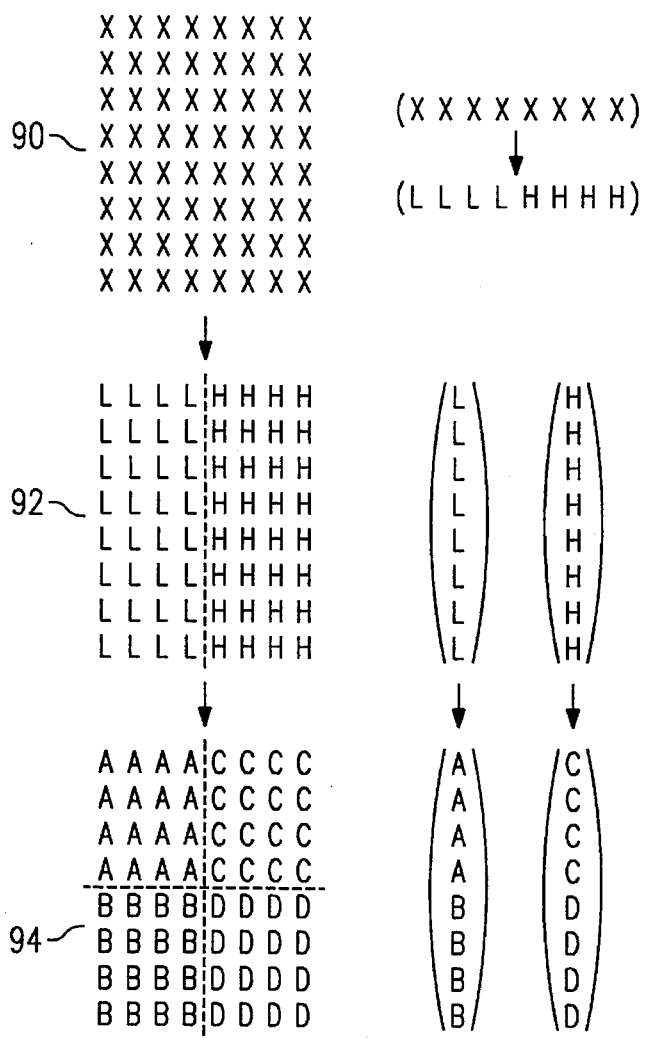
FIG. 9 is an illustration of the operation of the process of FIG. 8.

Upon completion of the row-wise decomposition and downsampling of processes 78, 80, the downsampled decomposed sequences $\{\tilde{c}^{j-1}\}$, $\{\tilde{d}^{j-1}\}$ are stored in image memory 67, in a form in which the left-hand side of the image corresponds to the low frequency results $\{\tilde{c}^{j-1}\}$, and in which the right-hand side corresponds to the high frequency results $\{\tilde{d}j-1\}$. Attention is directed to FIG. 9 for a visual representation of the operations of processes 78, 80. Array 90 indicates the contents of input dual array sequence $\{\tilde{c}^j\}$, prior to row-wise decomposition. The inherent downsampling in the results of each of processes 78, 80 provides a combined downsampled sequences $\{\tilde{c}^{j-1}\}$, $\{\tilde{d}j-1\}$ that is stored by process 82 in image memory 67 in the same memory space as the original array, as shown by array 92 of FIG. 9.

The results $\{\tilde{c}^{j-1}\}$, $\{\tilde{d}^{j-1}\}$ of the row-wise decomposition are then subjected to column-wise decomposition, for both low-pass and high-pass cases, in processes 84, 86 respectively. Process 84 retrieves each column of the stored results for sequence $\{\tilde{c}j^1\}$ (from array 92), and performs a decomposition into another pair of low and high frequency sequences in the same manner as process 78 discussed above, except that the index know refers to positions within the particular column under analysis. The results of this decomposition of process 84 are inherently downsampled by a factor of two (e.g., by keeping only even-numbered values), as discussed above.

Similarly, process 86 performs low-pass and high-pass decomposition of the results $\{\tilde{d}^{j-1}\}$ on a column-by-column basis. The decomposition of process 86 is a convolution in similar fashion as discussed hereinabove, except that the index know refers to position within the column under analysis. The results of column-wise high-pass decomposition process 85 are also inherently downsampled by a factor of two, as noted above.

The results of processes 84, 86 then correspond to four components of the input dual sequence $\{\tilde{c}^j\}$, and are stored back into image memory 67 in process 88. These components are referred to as the LL, LH, HL, HH components. By way of explanation, the LL component consists of those sequence entries resulting from column-wise low-pass process 84 upon the row-wise low-pass results $\{\tilde{c}^{j-1}\}$ of process 78; the HL component consists of the results of column-wise low-pass process 84 upon the row-wise high-pass results $\{\tilde{d}^{j-1}\}$ of process 80. Similarly, the LH component consists of the results of column-wise high-pass process 86 upon the row-wise low-pass results $\{\tilde{c}^{j-1}\}$ of process 78, while the HH component consists of the results of column-wise high-pass process 86 upon the row-wise high pass results $\{\tilde{d}^{j-1}\}$ of process 80. FIG. 9 illustrates, with array 94, the arrangement of these four components in image memory 67, with A=LL, B=HL, C=LH, and D=HH.

Upon storing of the decomposed components back into image memory 67 in process 88, the input document image is ready for quantizing in process 50, as will be described hereinbelow. It should be apparent to those of ordinary skill in the art, particularly with reference to equations (32), (33), and that this embodiment of the invention provides the significant advantage that spline-wavelet decomposition may be performed using spline and wavelet functions of finite support, and which involve only integer calculations. As such, the decomposition process of this embodiment of the invention may be done at very high speed, similar to a digital FIR filter, or alternatively with relatively primitive processing units, while maintaining high quality of the compressed document.

In addition, it will become apparent, from the description hereinbelow regarding decompression of the document, that reconstruction of the document may be made using the same spline and wavelet sequences $\{a_k\}$, $\{b_k\}$ as used in decomposition of the document. As such, reconstruction may also be performed solely with integer operations, and thus at high speed or with inexpensive processors.

(ii) Interpolatory wavelet decomposition

Referring back to FIG. 2, according to an alternative embodiment of the invention, decomposition process 48 may be performed by way of interpolatory wavelets (shown as process 48b). As noted above, it is contemplated that interpolatory wavelet decomposition will be most useful where the compression and decompression speed is of the highest importance, at a cost of somewhat reduced reproductive quality.

Figure 10A:
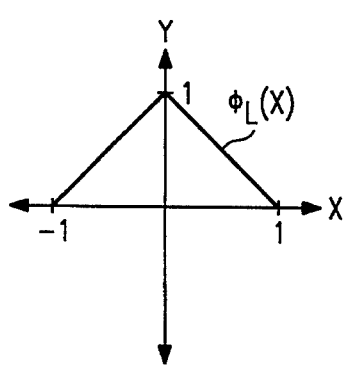
FIGS. 10a and 10b are plots of the scaling function and wavelet function utilized according to a second alternative implementation of the invention, specifically the interpolatory wavelet technique.

According to this embodiment of the invention, the document image is decomposed by way of the centralized B-spline scaling function, together with its corresponding wavelet. FIG. 10a illustrates the centralized linear B-spline function $\phi_L(x)$, which is defined as follows:

$$\phi_L(x) = \begin{cases} 1-|x| & -1 \leq x \leq 1 \\ 0 & \text{otherwise} \end{cases} \quad (36)$$

Figure 10B:
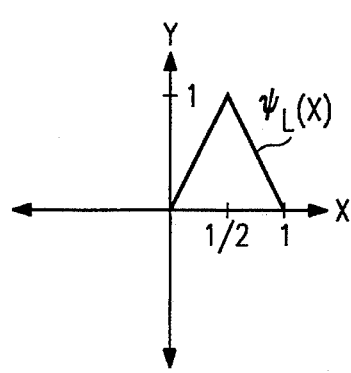

This expression is a unit left shift of the cardinal B-spline of equation (1) above. The corresponding wavelet function $\psi_L(x)$ to centralized linear B-spline function $\phi_L(x)$ is as follows:

$$\psi_L(x) = \phi_L(2x-1) \quad (37)$$

and is illustrated in FIG. 10b. The wavelet function $\psi_L(x)$ has an interpolatory property, and as such is commonly referred to as an interpolatory, or interpolating, wavelet. Further information regarding interpolatory wavelets may be found in Chui and Li, "Dyadic Affine Decompositions and Functional Wavelet Transforms", *CAT Report* 295 (Center for Approximation Theory, Texas A&M University, April 1993).

From the linear B-spline, scaling function $\phi_L(x)$ may be expressed as follows:

$$\phi_L(x) = \frac{1}{2}\phi_L(2x+1) + \phi_L(2x) + \frac{1}{2}\phi_L(2x-1) \quad (38)$$

then:

$$\phi_L(2x) = \phi_L(x) - \frac{1}{2}\psi_L(x+1) - \frac{1}{2}\psi_L(x) \quad (39)$$

Using the general wavelet decomposition formula of:

$$\phi(2x-k) = \sum_l a_{k-2l}\phi(x-l) + \sum_l b_{k-2l}\psi(x-l) \quad (40)$$

one may then readily show that, for the centralized linear B-spline scaling function $\phi_L(x)$ and its interpolatory wavelet $\psi_L(x)$:

$$\{a_n\} = \{\ldots, 0, 1, 0, \ldots\}$$

and $$\{b_n\} = \{\ldots, 0, -\tfrac{1}{2}, 1, -\tfrac{1}{2}, 0, \ldots\} \quad (41)$$

both over non-negative integers.

Process 48b of FIG. 2 is thus performed identically as process 48a, described above relative to FIG. 8, except that the decomposition sequences $\{a_n\}$, $\{b_n\}$ of equations (41) are used in processes 78, 80, 84, 86. As such, the interpolatory wavelets of this embodiment of the invention provide the same advantages, in decomposition, as described hereinabove relative to the dual base wavelet technique of process 48a, in that integer operations may be utilized for such decomposition.

However, differently from the dual base technique described hereinabove, the use of interpolatory wavelets require the reconstruction sequences $\{p_k\}$, $\{q_k\}$ to be different from decomposition sequences $\{a_n\}$, $\{b_n\}$. From equation (39) above:

$$\phi_L(x) = \frac{1}{2}\phi_L(2x+1) + \phi_L(2x) + \frac{1}{2}\phi_L(2x-1) \quad (42)$$

As such, the reconstruction sequence $\{p_k\}$ for the interpolatory wavelets (the use of which will be described in detail hereinbelow) will have $p_{-1}=\frac{1}{2}$, $p_0=1$, and $p_1=\frac{1}{2}$, with all other values of p equal to zero. Given the simple expression of equation (37) for $\psi_L(x)$, the reconstruction sequence $\{q_k\}$ will have only a single non-zero element, namely $q_1=1$, with all other values of q equal to zero.

(b) Full-tree spline wavelet decomposition using spline-wavelet packets

According to another alternative embodiment of the invention, specifically the third approach noted above, decomposition process 48 may be performed according to another technique which will be referred to herein as "wavelet packets" or "spline wavelet packets". As will be apparent from the description hereinbelow, this decomposition (or compression) approach utilizes a full-tree decomposition, rather than the half-tree approach discussed above. Full-tree decomposition refers to decomposition in which both the low-pass and the high-pass (or band-pass) components are decomposed when going to the next level of decomposition.

The use of orthogonal wavelet packets in wavelet analysis is known, as indicated by Coifman, Meyer, et al., "Signal Processing and Compression with Wave Packets", (1992). However, these wavelet packets are not spline-based, and are not symmetric, and as such their use in fields such as image compression and decompression would introduce undesirable phase distortion.

According to this alternative embodiment of the invention, process 48c (FIG. 2) performs decomposition of the document image by way of non-orthogonal, symmetric, spline-based wavelet packets. The mathematical theory behind this class of wavelets is presented in Chui and Li, "Nonorthogonal Wavelet Packets", *SIAM J. Math. Anal.*, Vol. 24, No. 3, (SIAM, May 1993), pp. 712–738. According to the present invention, these spline-based wavelet packets are used to further decompose the results of data, corresponding to a document, that are decomposed to a first level by application of a scaling function and the corresponding wavelet function. This further decomposition provides higher compression ratios and higher quality picture reproduction, when compared against the dual-base technique (process 48a of FIG. 2) described hereinabove.

In contrast to the decomposition approach illustrated in FIGS. 5a, 5b, where only a single branch (the $\{c_n^j\}$ branch of FIG. 5a) is applied to subsequent decomposition stages, both of the low-pass and high-pass components are further decomposed according to this wavelet packet technique.

Figure 11A:
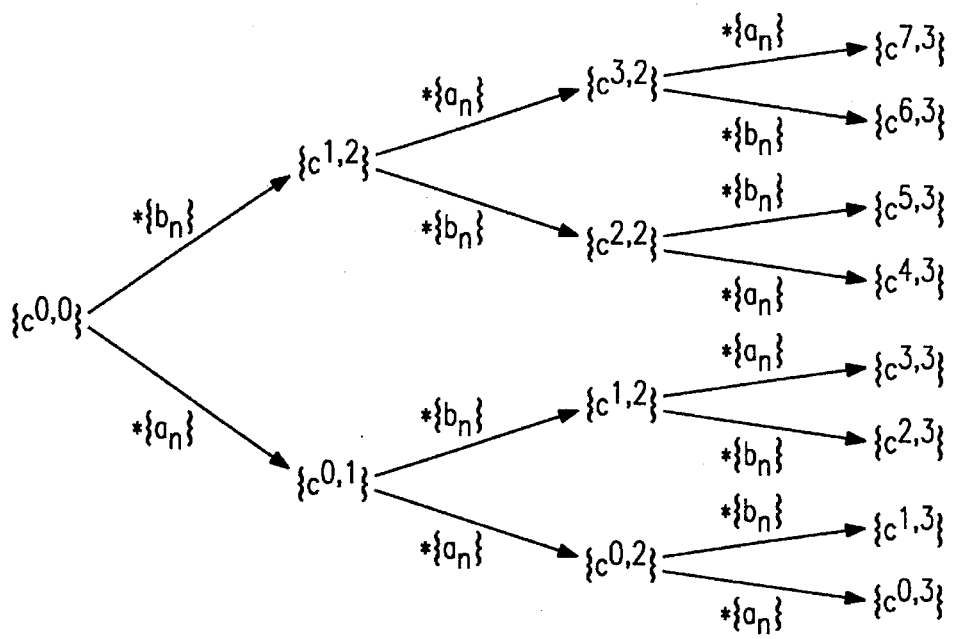
FIGS. 11a and 11b are full-tree representations of the decomposition and reconstruction, respectively, of a signal function according to spline-wavelet techniques, including a third alternative implementation of the invention utilizing wavelet packets.

FIG. 11a illustrates the decomposition "tree" according to this alternative embodiment of the invention. As is evident therefrom, two-dimensional nomenclature is required to indicate the decomposition component of interest, since components of the n+1 level can come from either low-pass or high-pass results from the prior level; the nomenclature used in the tree of FIG. 11a identifies each component sequence $\{c^{m,n}\}$ as the $m^{th}$ lowest frequency component above the spline component in the $n^{th}$ level of decomposition. For example, sequence $\{c^{2,3}\}$ is the sequence of coefficients representative of the second lowest frequency component above spline component $\{c^{0,3}\}$ in the third level of decomposition.

FIG. 11a illustrates that each component sequence $\{c^{m,n}\}$ is decomposed, in the next level of decomposition, into a low-pass and a high-pass component, each of which is itself decomposed in the following level of decomposition. In the tree of FIG. 11a, the input coefficient sequence $\{c^{0,0}\}$ {corresponding to the input signal function f(x)) is convolved with scaling function coefficient sequence $\{a_n\}$ to produce a low-pass component coefficient sequence $\{c^{0,1}\}$, and is also convolved with wavelet function coefficient sequence $\{b_n\}$ to produce a high-pass component coefficient sequence $\{c^{1,1}\}$. For the next level of decomposition, low-pass component coefficient sequence $\{c^{0,1}\}$ is convolved with scaling function coefficient sequence $\{a_n\}$ to produce a second level low-pass component coefficient sequence $\{c^{0,2}\}$, and is also convolved with wavelet function coefficient sequence $\{b_n\}$ to produce a high-pass component coefficient sequence $\{c^{1,2}\}$. To this point, the decomposition is similar to that described hereinabove relative to the dual-base decomposition and interpolatory wavelet decomposition.

In the next level, however, according to the wavelet packet technique according to this embodiment of the invention, the first level high-pass component coefficient sequence $\{c^{1,1}\}$, which is basically a wavelet component, is also convolved with wavelet function coefficient sequence $\{b_n\}$ to produce a low-pass component coefficient sequence $\{c^{2,2}\}$, and is also convolved with scaling function coefficient sequence $\{a_n\}$ to produce a high-pass component coefficient sequence $\{c^{3,2}\}$. One should note that the coefficient sequences applied to a previous high-pass component are reversed from that of the tree of FIG. 4a, such that the high-pass component of a previous high-pass component is obtained by convolution with scaling function coefficient sequence $\{a_n\}$, and so that the low-pass component of a previous high-pass component is obtained by convolution with wavelet function coefficient sequence $\{b_n\}$. Additional levels of decomposition can then continue, for each of the component coefficient sequences $\{c^{m,n}\}$ so generated, until the desired compression ratio is obtained.

The basic spline scaling function and corresponding wavelet function utilized according to this alternative method of the invention is governed by a family of basis functions. This family includes a series of functions $\mu_i$, where $\mu_0$ is a spline scaling function and where each function $\mu_i$ (for i>0) is a wavelet function. In the general case, where $\mu_0(x)$ is equal to the scaling function $\phi(x)$, the first wavelet function $\mu_1$ will equal the corresponding wavelet function $\psi(x)$, and the progression of wavelet functions will be as follows:

$$\mu_{2l}(x) = \sum_k p_k \mu_l(2x - k) \tag{43}$$

and $$\mu_{2l+1}(x) = \sum_k q_k \mu_l(2x - k) \tag{44}$$

As a result, the wavelet packet basis functions μ can be generated iteratively, in the general sense, by using the scaling function $\phi(x)$ and the corresponding wavelet function $\psi(x)$. Accordingly, a component coefficient sequence $\{c_{m,n}\}$ at any level of decomposition, including the original input coefficient sequence $\{c^{0,0}\}$ can be obtained by the linear combination of wavelet packets.

By way of explanation, decomposition according to this alternative technique will now be described in the case of a one-dimensional function f(x). First, as in the prior cases, the input function f(x) is projected into the scaling function, or spline, space as follows:

$$f(x) = \sum_j c_j^{0,0} \mu_0(2x-j) = \sum_j c_j^{0,0} \phi(2x-j) \tag{45}$$

The wavelet packet decomposition of $\{c^{0,0}\}$ is then governed by the following formulae:

$$c^{k,l} = \sum_k (\tilde{a}_{2k}^l \tilde{b}_k) c^{\lfloor \frac{k}{2} \rfloor, l-1} \tag{46}$$

where:

$$\lambda_k = \begin{cases} 0 & \text{for even } k \\ 1 & \text{for odd } k \end{cases} \quad (47)$$

and where:

$$\{z_n^{\lambda_k}\} = \begin{cases} \{a_n\} & \text{for } \lambda_k = 0 \\ \{b_n\} & \text{for } \lambda_k = 1 \end{cases} \quad (48)$$

The coefficient sequences $\{a_n\}$, $\{b_n\}$ are, again, the spline and wavelet coefficient sequences determined by selection of the scaling function and wavelet function selected for the decomposition. According to this embodiment of the invention, the linear and cubic coefficient sequences $\{a_n\}$, $\{b_n\}$ preferred for use in the wavelet packet decomposition of digital documents are listed in Appendix A hereto. Decomposition is then performed according to the tree diagram of FIG. 11a, to the extent desired.

Figure 11B:
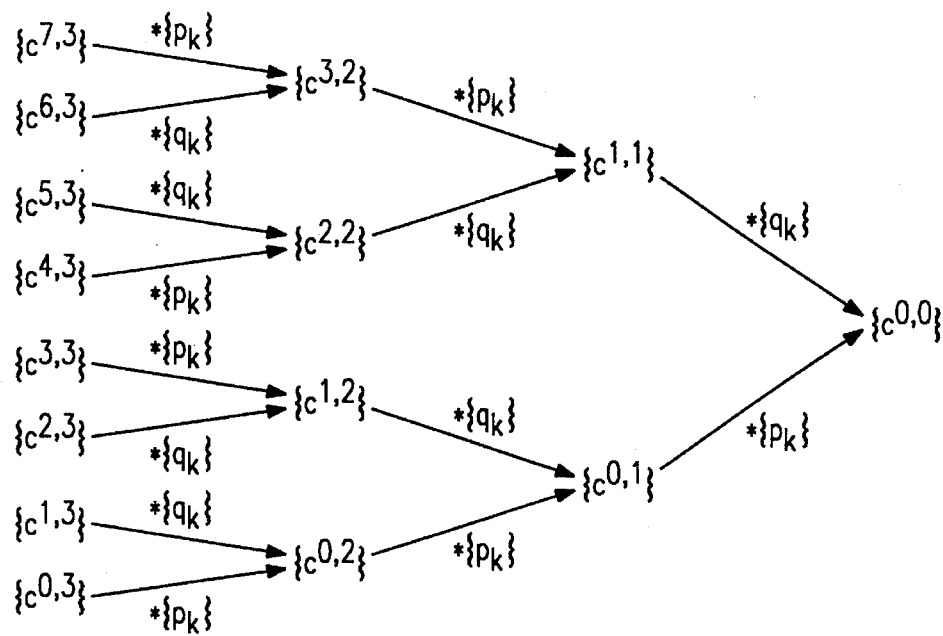

As will be described in further detail hereinbelow, reconstruction of a decomposed representation is performed by convolution of high-pass components with a reconstruction coefficient sequence $\{q_k\}$ and low-pass components with a reconstruction coefficient sequence $\{p_k\}$, in full-tree form, as shown in FIG. 11b. The reconstruction formula utilized in this operation is as follows:

$$c^{k,l-1} = \sum_k \{p_{l-2k}c^{2k,l} + q_{l-2k}c^{2k+1,l}\} \quad (49)$$

Figure 12A:
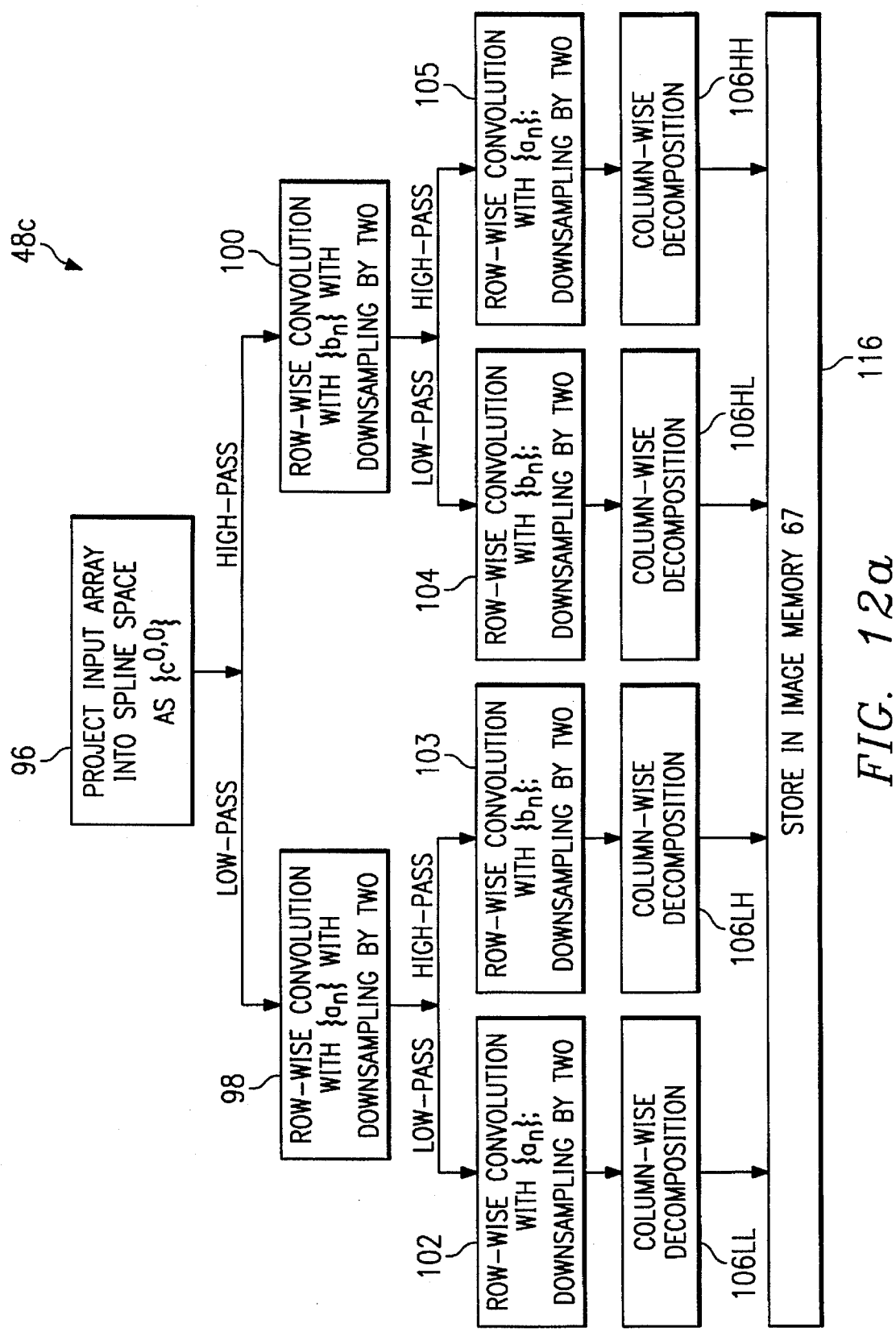
FIGS. 12a and 12b are flow diagrams illustrating the procedure for spline-wavelet decomposition of a document according to the third alternative implementation of the invention, specifically the wavelet packets technique.

Referring now to FIGS. 12a, 12b, 13, and 14, process 48c in which a two-dimensional function f(x,y) representative of a document, expressed as an array of sample values in byte-packed PGM format, is decomposed according to the wavelet packet technique, will now be described in detail. As shown in FIG. 12a, in process 96, DSP 60 projects the input data into spline space (as a coefficient sequence $\{c^{0,0}\}$). As described hereinabove, for a digital array of data as provided by format converter 12, the coefficient sequence corresponds to the values in the digital array f(x,y). The arrangement of input coefficient sequence $\{c_{0,0}\}$ in an array of coefficients $\{X\}$ is shown in FIG. 13a, which is at the beginning of the decomposition tree of FIG. 14.

Decomposition of the input coefficient sequence $\{c_{0,0}\}$ (or array $\{X\}$ then begins with processes 98, 100, in which the sequence $\{c_{0,0}\}$ is convolved, in row-wise fashion, with decomposition coefficient sequences $\{a_n\}$, $\{b_n\}$ to produce the low-pass and high-pass component coefficient arrays $\{X\}$, $\{A\}$, respectively. Decomposition coefficient sequences $\{a_n\}$, $\{b_n\}$ are based upon scaling functions and wavelet functions suitable for use in this wavelet packet approach, such as those shown in Appendix A. Each convolution in the decomposition sequence contains downsampling by a factor of two, as in the cases discussed hereinabove. As such, as shown in FIG. 13b, each row of the image data contains a row-wise low-pass component coefficient array $\{X\}$ and a row-wise high-pass component coefficient array $\{A\}$. For purposes of description of FIGS. 13 and 14, the low-pass component coefficient sequence will retain the designation of the sequence from which it was generated (hence array $\{X\}$ in FIG. 13b is the low-pass component of array $\{X\}$ in preceding FIG. 13a).

The result of process 98, namely the low-pass component of the input image data array is then again decomposed, in row-wise fashion, in processes 102, 103. Process 102 convolves coefficient array $\{X\}$ of FIG. 13b with spline decomposition coefficient sequence $\{a_n\}$, including downsampling, to generate another row-wise low-pass component, shown as coefficient array $\{X\}$ in FIG. 13c. Process 103 convolves coefficient array $\{X\}$ of FIG. 13b with wavelet decomposition coefficient sequence $\{b_n\}$, including downsampling, to generate a row-wise high-pass component, shown as coefficient array $\{B\}$ in FIG. 13c.

The high-pass results from process 100 are similarly decomposed again, in a row-wise direction, in processes 104, 105. Process 104 convolves the high-pass coefficient array $\{A\}$ of FIG. 13b with wavelet decomposition coefficient sequence $\{b_n\}$, including downsampling, to produce a low-pass coefficient array $\{A\}$ of FIG. 13c. Similarly, process 105 convolves high-pass coefficient array $\{A\}$ of FIG. 13b with spline decomposition coefficient sequence $\{a_n\}$, including downsampling, to produce a high-pass coefficient array $\{C\}$ of FIG. 13c. As noted hereinabove, according to this wavelet packet technique, the spline decomposition coefficient sequence $\{a_n\}$ and wavelet decomposition coefficient sequence $\{b_n\}$ are reversed, in this second decomposition pass when applied to the high-pass results of the first decomposition pass.

Figure 12B:
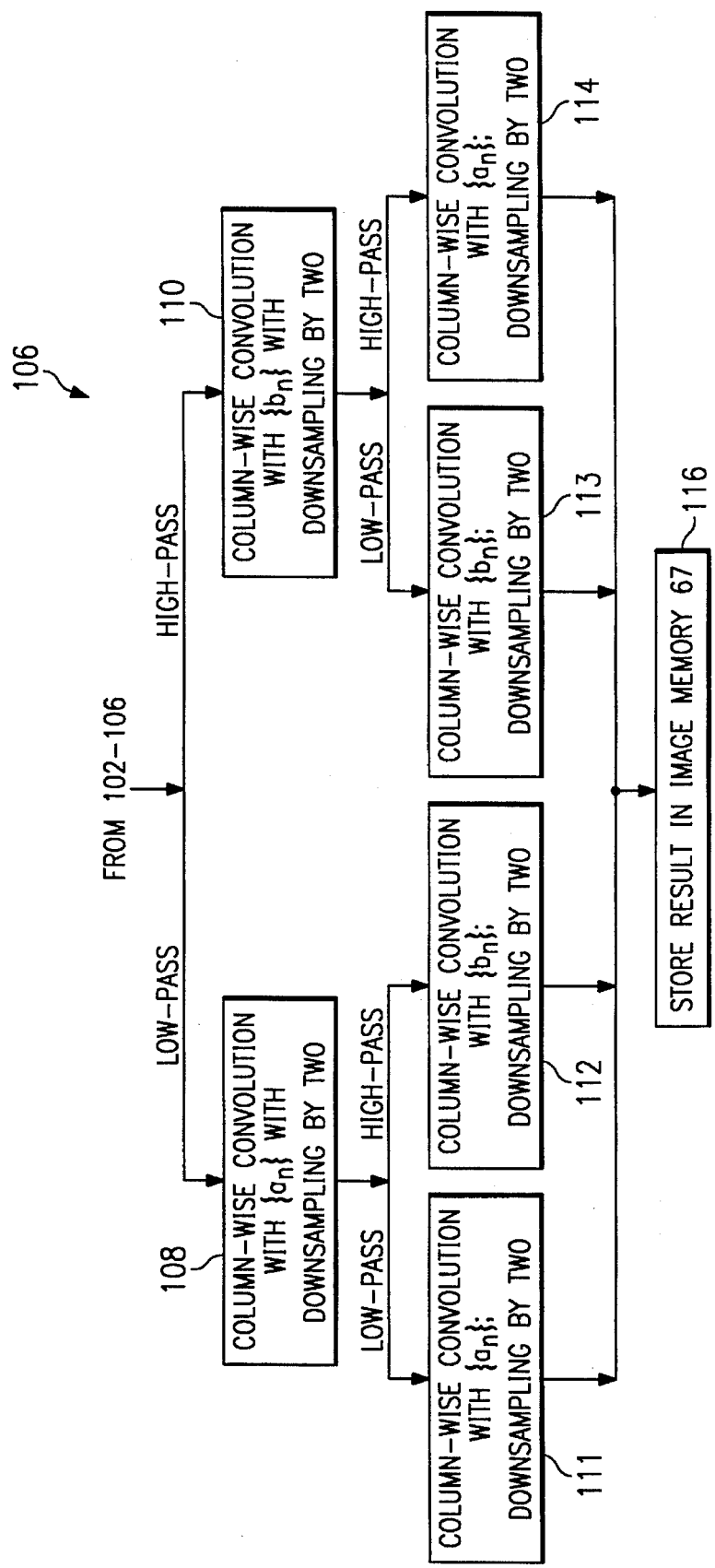

The results of processes 102, 103, 104, 105 (together corresponding to the arrangement illustrated in FIG. 13c) are then each applied to column-wise decomposition processes 106LL, 106LH, 106HL, 106HH, respectively. FIG. 12b generically illustrates the subprocess steps performed in each of column-wise decomposition processes 106LL, 106LH, 106HL, 106HH.

Referring to FIG. 12b, subprocess 108 performs the low-pass decomposition of its corresponding components (see FIG. 13c) in a column-by-column manner, by convolving the coefficient arrays with spline decomposition coefficient sequence $\{a_n\}$ in the manner discussed above, which includes downsampling by a factor of two. As a result, each of the coefficient arrays $\{X\}$, $\{B\}$, $\{A\}$, $\{C\}$ of FIG. 13c provide low-pass coefficient arrays $\{X\}$, $\{B\}$, $\{A\}$, $\{C\}$, respectively, as shown in FIG. 13d. Subprocess 110 similarly convolves its corresponding coefficient array of FIG. 13c with wavelet decomposition coefficient sequence $\{b_n\}$ and downsamples the result by a factor of two. As a result, each of the coefficient arrays $\{X\}$, $\{B\}$, $\{A\}$, $\{C\}$ of FIG. 13c thus also provide high-pass coefficient arrays $\{D\}$, $\{E\}$, $\{F\}$, $\{G\}$, respectively, as shown in FIG. 13d.

The results of this first column-by-column decomposition step are then repeated for a second pass, as before. The low-pass results of subprocess 108 are convolved in a corresponding subprocess 111, in column-wise fashion, with spline coefficient sequence $\{a_n\}$, including downsampling; the cumulative effect of subprocess 111 for all of the results of processes 102, 103, 104, 105 is to produce low-pass coefficient arrays $\{X\}$, $\{B\}$, $\{A\}$, $\{C\}$ of FIG. 13d. Subprocess 112 convolves its corresponding high-pass coefficient array $\{X\}$, $\{B\}$, $\{A\}$, $\{C\}$ of FIG. 13d, in column-wise fashion, with wavelet coefficient sequence $\{b_n\}$, with the results downsampled, to cumulatively produce high-pass coefficient arrays $\{H\}$, $\{J\}$, $\{L\}$, $\{N\}$, respectively. Similarly, each of the high-pass coefficient arrays $\{D\}$, $\{E\}$, $\{F\}$, $\{G\}$ of FIG. 13d from subprocess 110 are convolved, in a corresponding subprocess 113, in column-wise fashion, with wavelet decomposition coefficient sequence $\{b_n\}$ (downsampled) to cumulatively produce low-pass component coefficient arrays $\{D\}$, $\{E\}$, $\{F\}$, $\{G\}$ shown in FIG. 13e. Each of high-pass coefficient arrays $\{D\}$, $\{E\}$, $\{F\}$, $\{G\}$ of FIG. 13d are also convolved in a corresponding subprocess 114, in column-wise fashion, with spline decomposition coefficient sequence $\{a_n\}$, including downsampling, to cumulatively produce high-pass component coefficient arrays $\{I\}$, $\{k\}$, $\{M\}$, $\{O\}$ of FIG. 13e.

Figure 14:
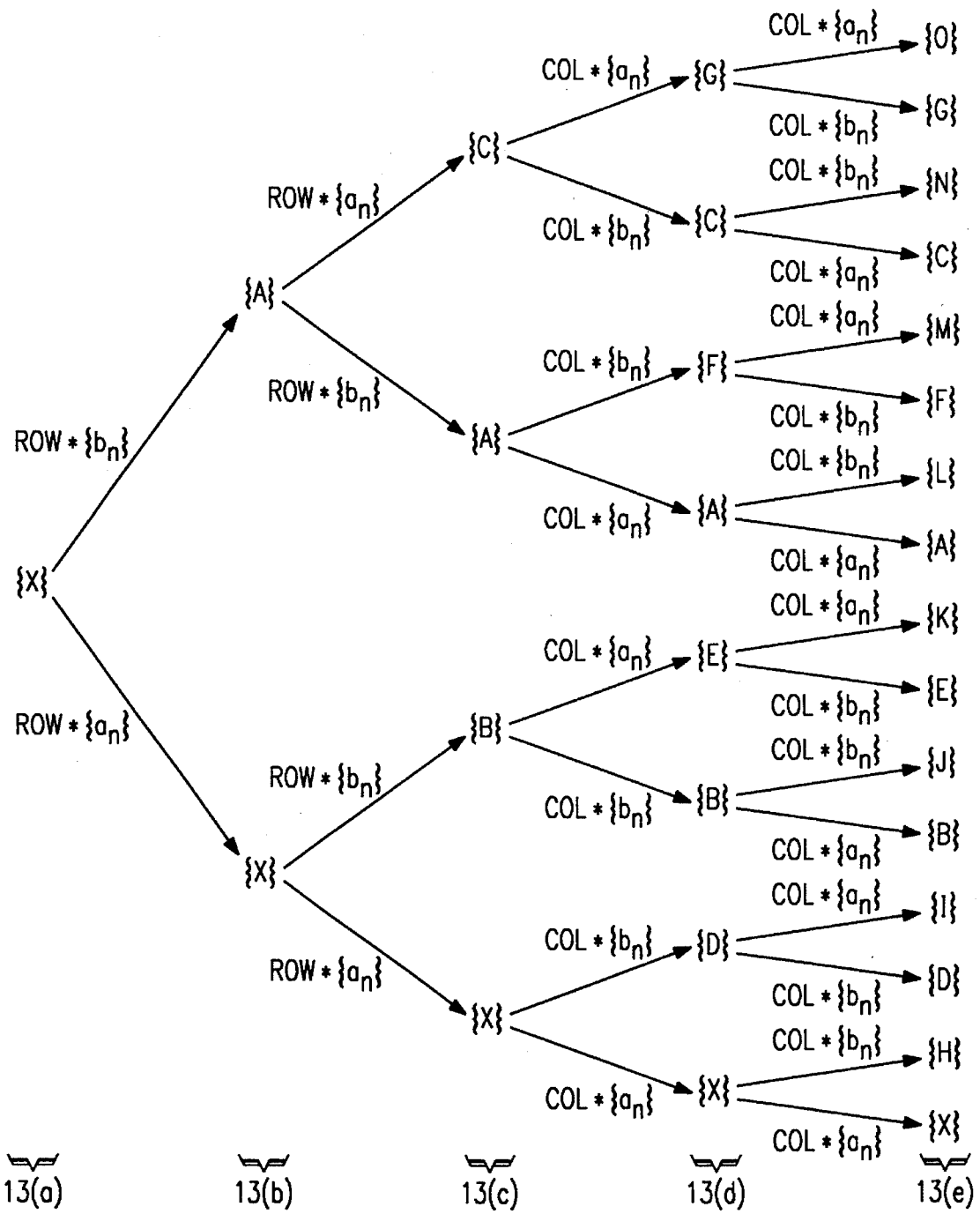
FIG. 14 illustrates the operation of the process of FIGS. 12a and 12b in a tree diagram form.

The results of subprocesses 111, 112, 113, 114 in each of processes 106LL, 106LH, 106HL, 106HH are then stored by process 116 in image memory 67, in the form illustrated in FIG. 13d. Accordingly, the full-tree decomposition of FIG. 14 is complete at this time, with the "blur" image of the input image sequence represented by the lowest-pass component of the row-wise and column-wise decomposition, represented by coefficient array {X} of FIGS. 13e and 14. All of the other coefficient arrays {A} through {O} of FIG. 13e represent wavelet packet components from this decomposition.

According to this alternative embodiment of the invention, the decomposition tree of FIG. 13e, and in general the decomposition tree of FIG. 11a, may be "pruned", or stopped, at any particular component. Referring to FIG. 11a, it may be possible to stop the decomposition process for an intermediate decomposition component, for example at sequence $\{c^{2,2}\}$; in this example, the remainder of the coefficient sequences in the decomposition would be obtained by convolution in the third level, except that neither of sequences $\{c^{5,3}\}$ and $\{c^{4,3}\}$ would be generated. This allows for a reduction in the amount of data to be stored, and processed in subsequent levels, particularly if no additional compression thereof is available. For example, a particular sequence result of a decomposition may have all values equal to one another; further decomposition would not provide any additional compression, particularly over that which a lossless compression would provide. Pruning of the decomposition tree at such a result would thus be advisable.

Figure 15:
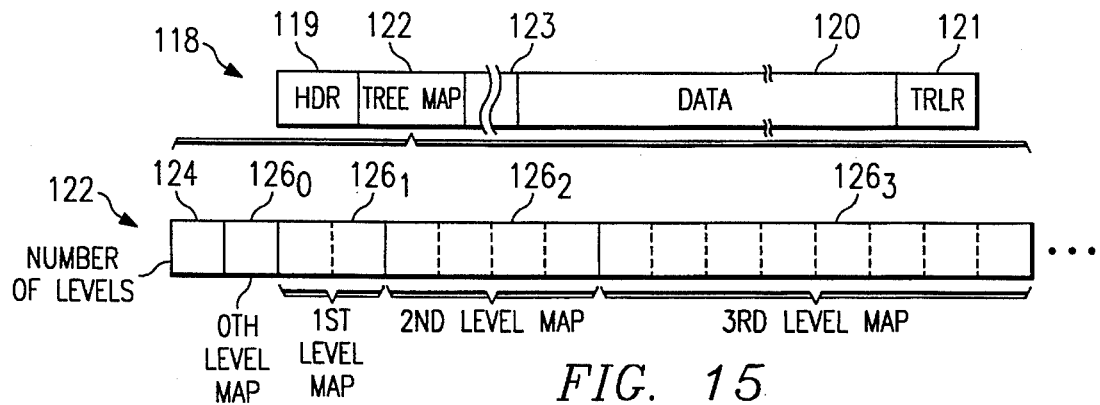
FIG. 15 illustrates the organization of a data frame containing wavelet packet decomposition results and an associated header containing a decomposition tree map.

When pruning of the full decomposition tree according to the wavelet packet technique is used, however, the arrangement of data in the resulting array must also be indicated within the data stream sent to downstream processing units (i.e., decompression system 30), in order to communicate which components of the full tree decomposition have been retained. Referring now to FIG. 15, an example of the data frame useful in communicating the results of wavelet packet decomposition will now be described. The data frame shown in FIG. 15 corresponds to the format as stored in image memory 67 upon completion of the decomposition process (prior to the quantization, lossless compression, and other processes described hereinbelow), and may also correspond to the compressed image data as communicated over network 26 or as stored on disk 22, 24 (after quantization, lossless compression, and the other processes described hereinbelow).

As shown in FIG. 15, data frame 118 consists primarily of a data portion 120, which contains the coefficient sequence results of the decomposition process described above. Header 119 indicates the beginning of data frame 118, and contains conventional information regarding the length and identity of data frame 118, as does header portion 123; trailer 121 follows the data portion 120 to indicate the end of data frame 118, and may also contain identity information. Part of the overall header of data frame 118 (i.e., the information preceding the actual data portion 120) according to this embodiment of the invention is tree map 122, which contains information concerning the components contained within data portion 120, especially considering the availability of "pruning" of the decomposition tree allowed according to the full-tree wavelet packet decomposition method described hereinabove.

Tree map 122 includes a first word 124 that indicates the number of decomposition levels performed. In this embodiment of the invention, map words 126 are provided for each decomposition level to indicate which components are present at each level of decomposition; as such, word 124 is necessary to indicate the number of map words 126 to follow. Each map word 126 contains a number of characters (which may be single or plural bits) equal to the number of possible components for that level; in other words, the $m^{th}$ level of decomposition has $2^m$ possible decomposition components. As such, map word $126_0$ has one character as it corresponds to the zeroeth level of decomposition; it may therefore be possible, given the construction of header 119, 123, to eliminate map word $126_0$ since it merely indicates the presence or absence of any data in data portion 120. First level map word $126_1$ contains two characters, considering that the first level decomposition results in one low-pass component and one high-pass component. Second level map word $126_2$ contains four ($2^2$) characters, third level map word $126_3$ contains eight ($2^3$) characters, and so on, for the number of decomposition levels performed.

Figure 16:
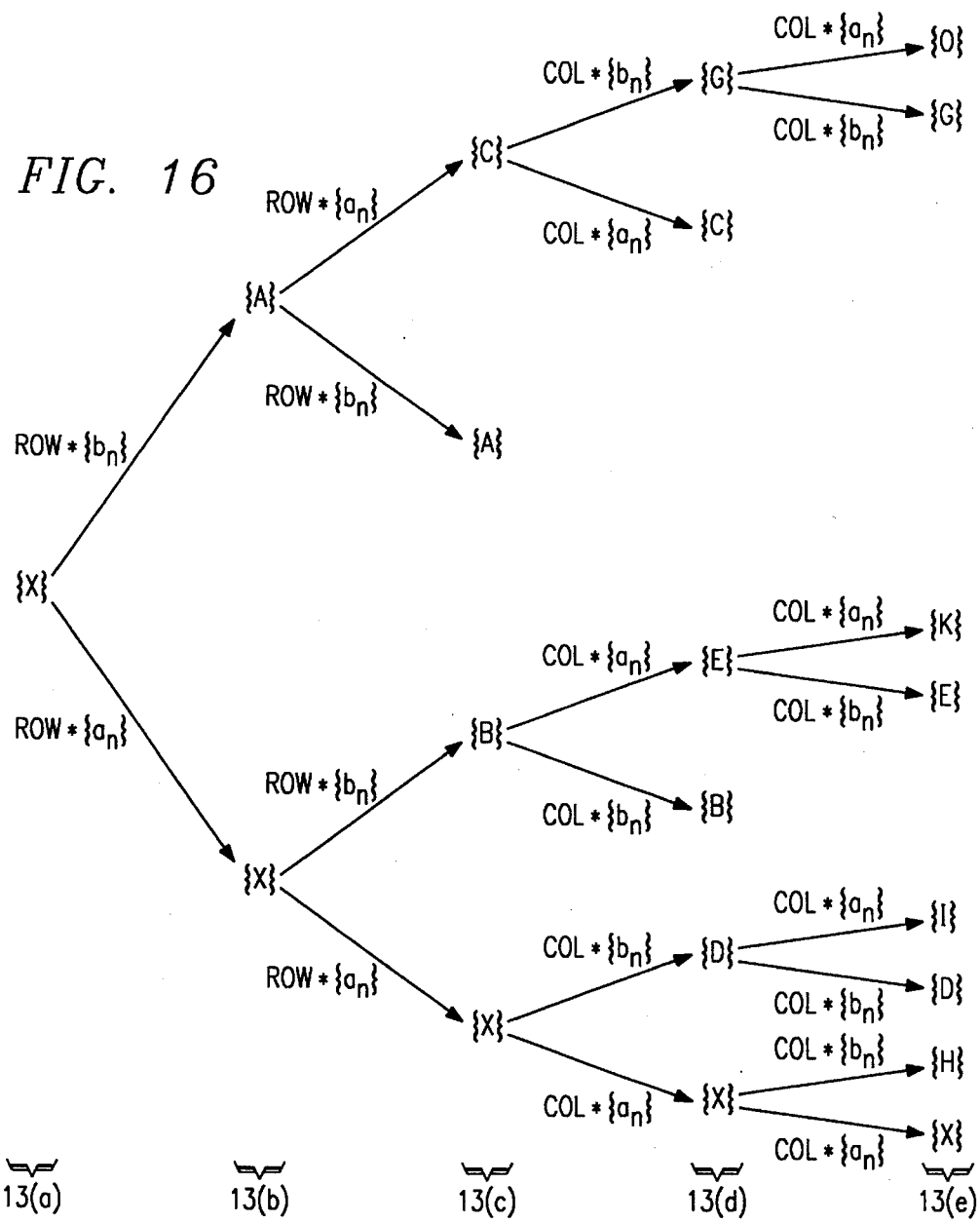
FIG. 16 illustrates a decomposition tree map according to the wavelet packet technique, illustrating the effects of pruning at certain component sequences.

FIG. 16 illustrates the decomposition tree of FIG. 14, pruned so that the sequence {A} of FIG. 13c was not further decomposed, and that sequences {B} and {C} of FIG. 13d were not further decomposed. If, for example, each character in each of map words 126 contains a "1" to indicate the presence of a component and contains a "0" to indicate the absence of a component because of pruning, the following table indicates the contents of map words 126 (left-most bit containing the character for the lowest frequency component):

| | | |
|---|---|---|
| zeroeth level: | $126_0 =$ | 1 |
| first level: | $126_1 =$ | 11 |
| second level: | $126_2 =$ | 1111 |
| third level: | $126_3 =$ | 1111 0011 |
| fourth level: | $126_4 =$ | 1111 0011 0000 0011 |

As a result of this construction of data frame 118, a map of the component sequences obtained by the full-tree decomposition 48c may be communicated along with the sequences. Of course, other techniques for communicating this information may alternatively be used.

As in the case of the previous examples of this embodiment of the invention, the operations required of DSP 60 in performing the wavelet packet decomposition of process 48c are integer operations, given the integer nature of the decomposition coefficient sequences $\{a_n\}$, $\{b_n\}$ of Appendix A hereto. As such, the complex operations of process 48c may still be performed relatively quickly, and by processors of moderate capability; of course, the wavelet packet decomposition (and reconstruction, as will be described hereinbelow) requires additional computing resources compared to the dual base technique and the interpolatory wavelet techniques described hereinabove.

The wavelet packet technique provides a high degree of compression (by a factor of 16, for example) in each pass, as compared to the dual base technique and the interpolatory wavelet techniques. In addition, because of the full tree decomposition, the quality of the reproduction from the compressed data will be somewhat higher than the other techniques. As such, the wavelet packet technique described herein will be attractive for certain high quality applications, and as such is a useful option within compressor system 20 according to this embodiment of the invention.

iii. Completion of the compression operation

Regardless of the particular decomposition option selected as process 48 of FIG. 2, the results of the decomposition operation, as stored in image memory 67, are then ready for the remainder of the compression process, as will now be described relative to FIG. 2.

Referring back to FIG. 2, process 50 is next performed by quantization processor 62 upon the results of the decomposition stored in image memory 67. Specifically, the wavelet, or high-frequency, components of the spline-wavelet decomposition process 48 (i.e., the LH, HL and HH components of the dual-base wavelet decomposition and the interpolatory wavelet decomposition, and the wavelet packet components of the wavelet packet decomposition) are subjected to thresholding and quantization in process 50. It is preferred that quantization is not performed upon the "blur" components (i.e., LL, or {X}), as this component contains most of the significant information of the message, and as such any quantization and thresholding would cause loss of quality without a significant increase in the compression ratio.

However, quantization of the high-frequency wavelet components of the decomposition may readily be performed, since most real-world images in PGM format will consist primarily of low-frequency intensities, such that the higher-frequency wavelet components will tend to have a large number of small, or zero, coefficient values. According to the preferred embodiment of the invention, therefore, this large population of small values in the higher-frequency components after decomposition may are discarded as a result of the quantization of process 50. The memory requirements for storage of the coefficients that undergo the thresholding and quantization are thus much reduced, even before the application of lossless compression techniques as will be noted below.

As noted above, quantization processor 62 is a logic circuit for filtering the data corresponding to decomposed images in order to achieve the desired compression ratio, based upon one of a number of available quantization modes. The simplest technique for performing quantization is referred to as "thresholding", where any coefficient having an absolute value less than a certain threshold value is set to zero, and where all remaining coefficient values are rounded to the nearest integer value. The other quantization modes indicated above may instead be performed in process 50 by quantization processor 62, according to the known conventional techniques noted above.

Upon completion of the quantization of process 50, decision 51 is performed to determine if the desired compression ratio has yet been achieved. Upon the completion of a single decomposition process 48, the blur component of the image may be adequate to accurately convey the input image. This single decomposition of the image will provide up to a 4:1 compression ratio (for the dual-base and interpolatory wavelet case) or 16:1 ratio (for the wavelet packet case), depending upon the memory requirements for the quantized high frequency results. This maximum ratio is obtained if all higher frequency components are discarded in the quantization process 50, leaving only the blur component. Decision 51 thus determines if the compression ratio achieved so far is adequate for the desired transmission or storage and, if not, passes control back to the decomposition process 48 so that the blur component from the prior decomposition may again be decomposed according to the selected optional technique.

According to this embodiment of the invention, the determination of whether the desired compression ratio has been obtained may be done relative to a predetermined compression ratio. In such a case, data controller 56 will maintain a count of the number of passes through decomposition process 48, and will perform decision 51 by comparing the resulting compression ratio against a previously stored value.

Alternatively, the compression ratio decision 51 may be determined in a dynamic manner according to the accuracy with which the blur component is representative of the input frame image. Conceptually, such a determination will be a measure of the difference between the blur component and the input image block relative to a predetermined accuracy limit, such that if the blur decomposition is within a preselected $\epsilon$ limit, an additional pass through the decomposition process 48 may be performed. It is contemplated that this determination can be made automatically by data controller 56 in decompressor 20 so that the process performed in each of channel compression subsystems may remain consistent, for example by calculating a numerical value based upon the sum of the coefficients in the high-frequency components of the decomposed image, which will indicate the difference between the input image to the blur image result of the decomposition process 48.

Whether statically or dynamically determined, upon decision 51 returning the result that the desired compression ratio has been obtained, according to the preferred embodiment of the invention, lossless compression is then performed upon the results of the decomposed and quantized images for the frame, in process 52 of FIG. 2. Referring back to FIG. 4, the lossless compression of process 52 is preferably performed by lossless compressor 64 according to a conventional lossless technique such as Huffman encoding. The lossless compression of process 52 is especially beneficial in compressing the quantized higher frequency components from the decomposition, considering that non-zero or varying values in these components will be quite sparse for most video image frames.

After the lossless compression of process 52, the compressed image data is then formatted for transmission or storage, as the case may be. It is preferred that the coding of the compressed image data be performed within compressor 20, preferably by data flow interface 66 shown in FIG. 4, prior to its application to digital communications network 26 or bus 25. Besides the actual decomposition sequences, as compressed, the transmitted compressed document image data must include information regarding the type of compression performed; such information must identify the type of lossless compression (if any), the spline-wavelet decomposition process, and the type of byte-packing and number of color bits, used in the compression process. It is contemplated that such coding, including the insertion of this necessary data control information and document identity information as a header or trailer. Examples of such information include x-dimension image size, y-dimension image size, the number of bits used in byte packing, the wavelet decomposition method used (i.e., dual base wavelet, interpolatory wavelet, wavelet packet), the number of levels of decomposition, the quantization method used, and the lossless compression method used. This and equivalent information and arrangements will be within the knowledge of one of ordinary skill in the art having reference to this specification.

3. The decompression system

The construction and operation of decompression system 30 according to the preferred embodiment of the invention will now be generally described. As in the case of compression system 10, decompression system 30 may be a stand-alone system, but is preferably arranged so as to be an add-on card for a conventional high performance personal computer or workstation or as a function of a larger computer, such as a mainframe computer or supercomputer. It is also contemplated, as will be apparent from the following description, that it will be possible to implement decompression system 30 with the same hardware as compression system 10, considering that decompression system 30 is performing substantially the inverse operations of those described hereinabove, and as such uses quite similar circuitry to accomplish the same.

However, it is also contemplated that many applications will utilize a central compression system 10, with many remote decompression systems 30 able to receive or retrieve compressed image data therefrom. In such an arrangement, there is no need for the remote stations to have compression capability, as they will be "read-only" systems. Accordingly, the construction and operation of decompression system 10, and specifically spline-wavelet decompressor 40, as a decompress-only subsystem will now be provided.

As discussed above and as shown in FIG. 1, decompression system 30 includes spline-wavelet decompressor 40 and format converter 32. Spline-wavelet decompressor 40 receives the compressed image data from DCN 26, or from disk storage 22, 24 via bus 27, and reconstructs the document image from the decomposition sequences in the manner to be described hereinbelow. Format converter 32 operates to reformat the decompressed document into the suitable form for display on video display 34d, printing by printer 34p, or output by way of another conventional output device.

Figure 17:
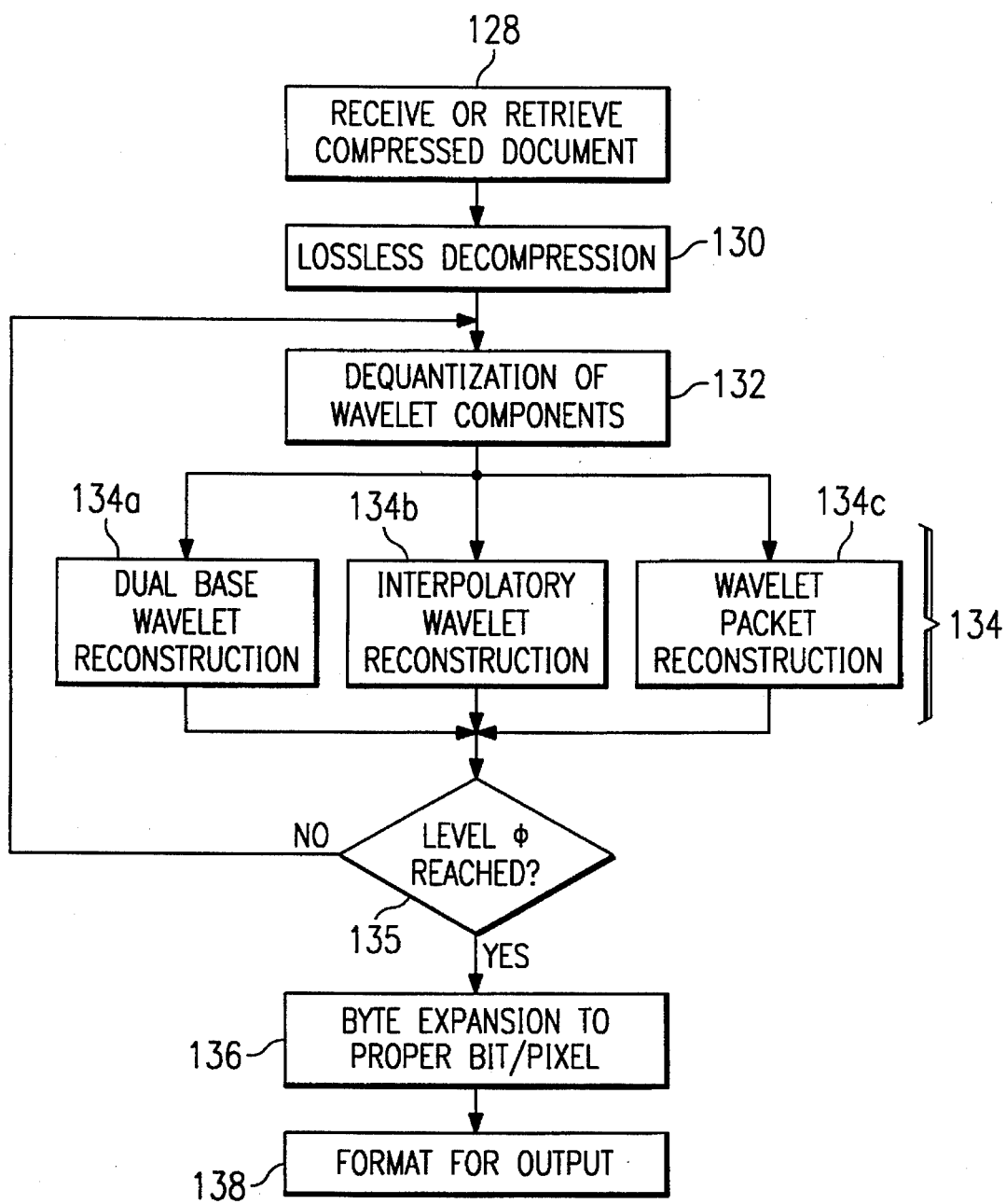
FIG. 17 is a flow diagram illustrating the general procedure for spline-wavelet decomposition of a document according to the preferred embodiment of the invention.
Figure 18:
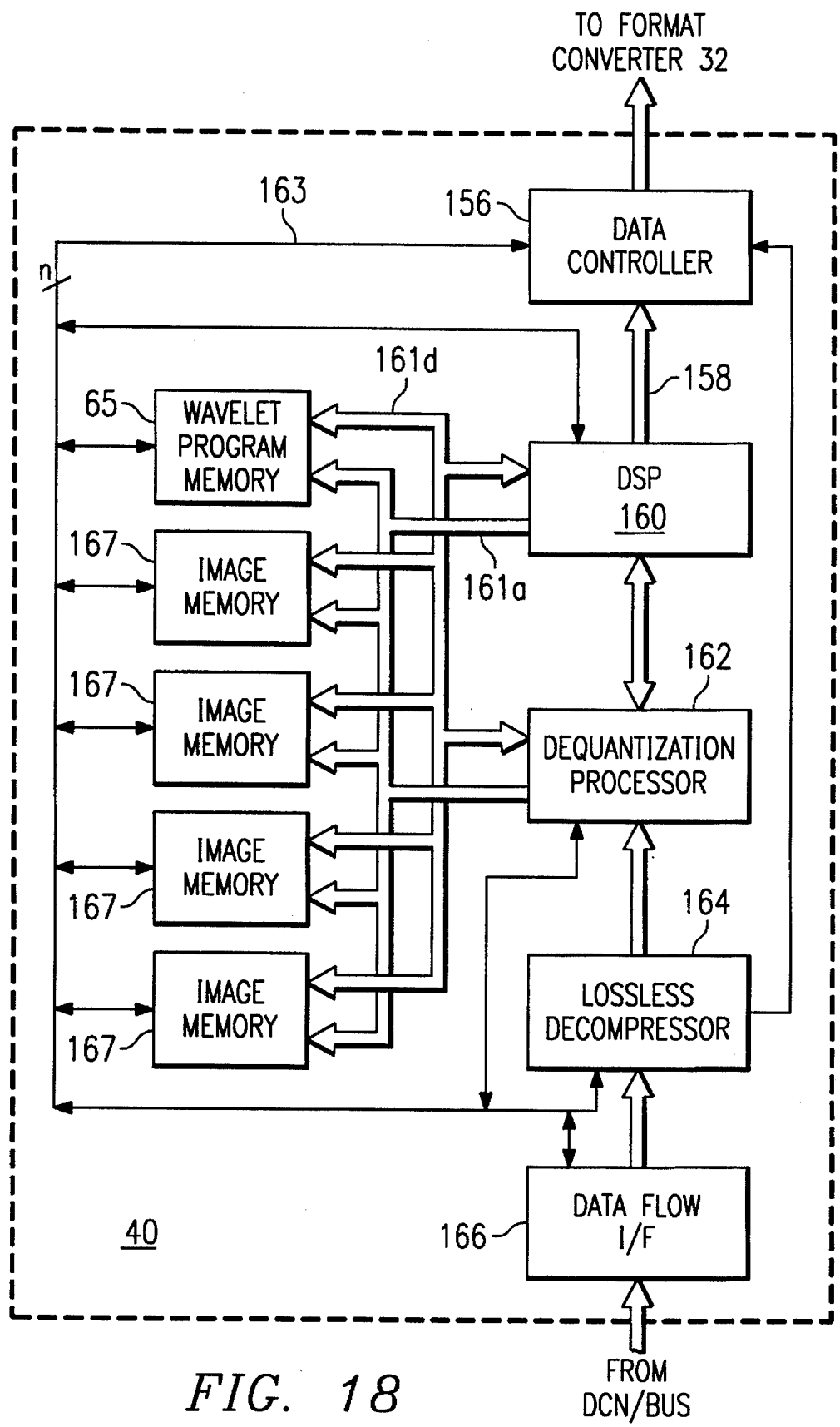
FIG. 18 is an electrical diagram, in block form, of the spline-wavelet decompressor of the system of FIG. 1, according to the preferred embodiment of the invention.

Referring now to FIGS. 17 and 18, the construction and operation of spline-wavelet decompressor 40 to reconstruct, or decompress, the received or retrieved document image data according to the preferred embodiment of the invention will now be described in detail. Spline-wavelet decompressor 40 includes data controller 156 which controls the operation of the other components within spline-wavelet decompressor 40. In this example, data controller 156 presents and receives signals on control bus 163 to control the timing, feedback and transmission of information through and from spline-wavelet decompressor 40. It is therefore contemplated that data controller 156 may be implemented as a relatively simple logic circuit, for example as implemented into a gate-array or other semi-custom logic circuit, for performing these functions.

Spline-wavelet compressor 40 also includes data flow interface 166, which receives a compressed document image data from DCN 26 or bus 27 in process 128 (FIG. 17). Interface 166 provides an interface between spline-wavelet decompressor 40 and network 26 or bus 27, and as such is able to strip header and trailer information from the received data stream which, as noted above, may include information necessary for decompressor 40 to comprehend the compression techniques used in the compression of the received data. Interface 166 communicates this identity and control information contained therein to other components in decompressor 40, by way of various control lines, some of which are shown in FIG. 18.

After proper receipt and reformatting of the received document data by interface 166, lossless decompression process 130 is next performed by lossless decompressor 164. Lossless decompressor 164 may be implemented by way of a conventional digital signal processor such as the TMS320C40 or TMS320C30 available from Texas Instruments Incorporated, the i860 processor available from Intel Corporation, or general purpose microprocessors such as the 80386 and 80486 available from Intel Corporation or the 68030 and 68040 available from Motorola, programmed in such a manner as to perform lossless decompression process 130 upon the data received from interface 166; alternatively, lossless compressor 64 may be implemented as a custom logic circuit for providing this function. Lossless decompression process 130 will be performed by lossless decompressor 164 according to the technique used in the compression of the data (as communicated thereto by interface 166 from the header data). As noted above, these lossless decompression techniques include Huffman encoding, adaptive Huffman encoding, arithmetic encoding, LSQ coding, and the like. The output of lossless compressor 64 is forwarded to dequantization processor 162, for dequantization in process 132.

According to this embodiment of the invention, dequantization processor 62 is preferably implemented as a programmable microprocessor or custom logic circuit for performing the functions described hereinbelow; such implementation is believed to be readily apparent to one of ordinary skill in the art having reference to this description. As shown in FIG. 18, dequantization processor 162 is connected to image memory banks 167 by way of data bus 161d and address bus 161a, so that dequantization processor 162 can store the results of dequantization process 132 therein, and retrieve data therefrom in the event that additional reconstruction is performed. In this example, as in the case of compressor 20, image memory 167 is arranged in four banks, totaling two megabytes in capacity. In process 132, dequantization processor 162 dequantizes the information in process 132 and stores the results in image memory 167, awaiting spline-wavelet reconstruction.

Dequantization process 132 is performed by dequantization processor 62 according to the quantization mode selected in the compression process for the particular document, as noted above. The particular quantization mode used in the compression is communicated to dequantization processor 162 by interface 166, based upon information communicated in the document data stream. As noted above, conventional quantization methods that may be used in the compression process (the inverse of which is performed in process 132 of FIG. 17) include no quantization, simple thresholding, scalar quantization, JPEG quantization using tables, the Federal Bureau of Investigation quantization standard for fingerprint compression, and others.

As noted above, upon completion of dequantization process 132 by dequantization processor 162, the results of the dequantization are stored in image memory 167 to await reconstruction by digital signal processor (DSP) 160. DSP 160 is the main processing unit for performing spline-wavelet reconstruction process 148 of FIG. 17. Examples of modern digital signal processors suitable for use as DSP 160 according to this embodiment of the invention are the TMS320C25 and TMS320C30 digital signal processors manufactured and sold by Texas Instruments Incorporated; of course, other digital signal processors and microprocessors may alternatively be used to perform the spline-wavelet decomposition operations described hereinbelow. DSP 160 is coupled to data bus 161d and address bus 161a (collectively referred to as memory bus 161) for communication with program memory 165 and image memory 167. According to this embodiment of the invention, and similarly as in the case of data compression described hereinabove, DSP 160 is programmed by way of code stored within DSP 160 or in program memory 165, to perform decomposition of the compressed document data in image memory 167 according to pre-calculated reconstruction coefficients stored in program memory 165. During and after reconstruction process 134, the document image data is stored in image memory 167. DSP 160 is also connected to control bus 163, so that it may be controlled by data controller 156 and so that it can effect the necessary control of other components in spline-wavelet decompressor 40, including access of memory 165, 167, during the performance of decomposition process 134.

As noted above, according to this embodiment of the invention, spline-wavelet reconstruction process 134 will be performed by DSP 160 according to the decomposition or compression technique (i.e., dual base wavelet decomposition, interpolatory wavelet decomposition, or wavelet packet decomposition) that was used to compress the document image data received by decompressor 40; the decomposition mode so used will be, as noted above, communicated as part of the data stream and identified by data interface 166. The three reconstruction processes 134a, 134b, 134c will be described in detail hereinbelow.

a. Dual base wavelet reconstruction

Reconstruction process 134a reconstructs a document from coefficient sequences generated by dual base wavelet decomposition process 48a described hereinabove. According to this embodiment of the invention, therefore, process 134a consists of substantially the reverse process of process 48a described hereinabove, with high-pass and low-pass coefficient sequences convoluted with reconstruction sequences $\{p_k\}$, $\{q_k\}$, respectively. Because of the use of the dual scaling function $\phi_m(x)$ and dual wavelet function $\psi_m(x)$, the reconstruction sequences $\{p_k\}$, $\{q_k\}$ exactly equal the decomposition sequences $\{a_n\}$, $\{b_n\}$, respectively. As a result, the reconstruction process 134a may also be done purely with integer operations, thus facilitating the decompression process by modern data processing hardware of reasonable performance levels.

As indicated from the description of the decomposition process hereinabove, the compressed document image data provided by dequantization process 132 contains coefficient sequences corresponding to the "LL", "LH", "HL" and "HH" decomposition components, from a particular decomposition level j. If, for example, the decomposition of process 48a for a particular document was done with a single pass (row convolution and column convolution), the coefficient sequences "LL", "LH", "HL" and "HH" stored in image memory 167 would correspond to array 94 of FIG. 9 discussed hereinabove.

Figure 19:
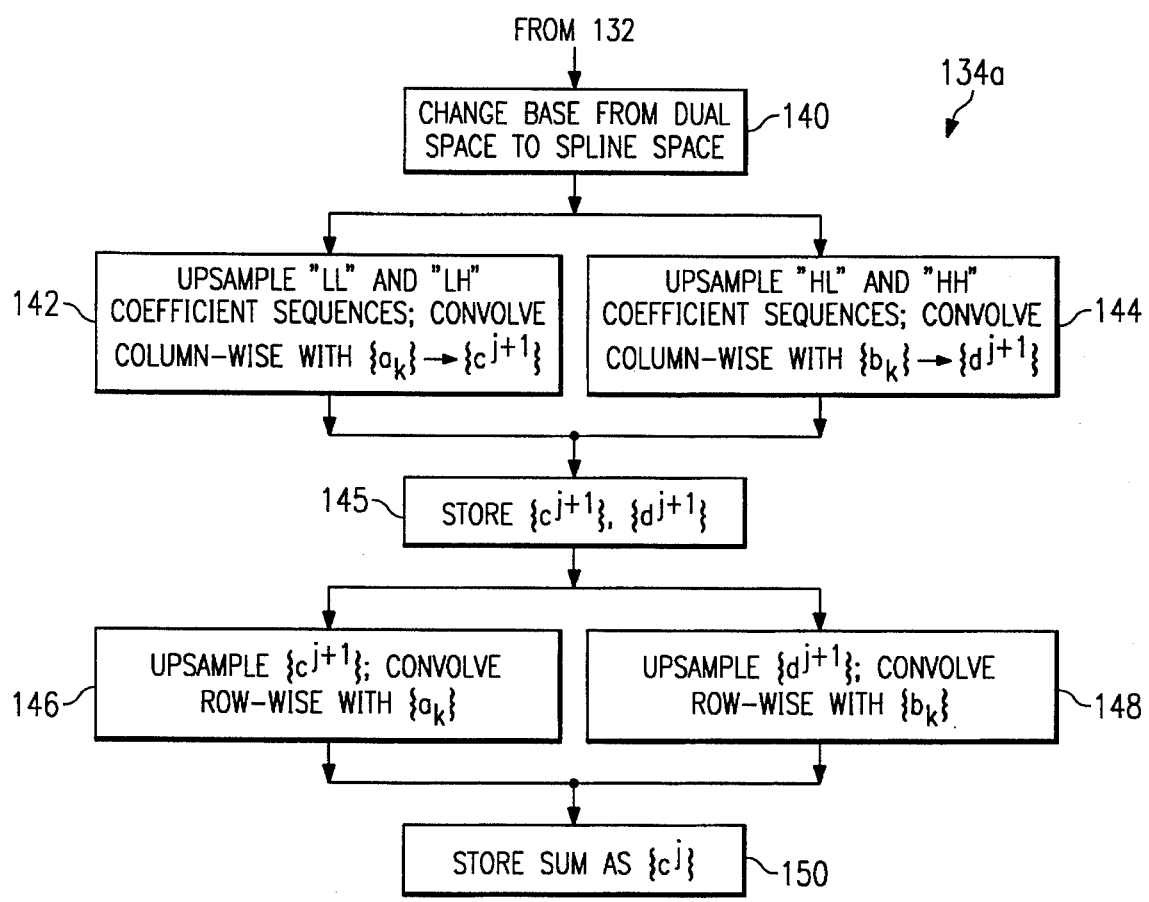
FIG. 19 is a flow diagram illustrating the procedure for spline-wavelet reconstruction of a document according to a first alternative implementation of the invention, specifically the dual-base technique.

Referring now to FIG. 19, reconstruction process 134a will now be described in detail. For the first pass through process 134a, these coefficient sequences will be in dual space, as noted above. Accordingly, process 134a begins with process 140 which, prior to spline-wavelet reconstruction, first transforms the coefficient sequences "LL", "LH", "HL" and "HH" from dual space into spline space. Process 140 is preferably performed by way of the well-known Cholesky computation method, given the duality principle as discussed above relative to equations (20) et seq. Subsequent passes through process 134a (i.e., when the result of decision 135, described hereinbelow, indicates that the document was not fully reconstructed in a prior pass through process 134a) will not perform the transformation of process 140, as the coefficient sequences will already have been transformed into spline space.

Upon completion of (or skipping) process 140, process 134a begins performing the inverse of decomposition process 48a described hereinabove. The reconstruction of process 134a in effect operates according to the reconstruction tree of FIG. 5b, in which the document component coefficient sequences are convolved with reconstruction coefficient sequences $\{p_k\}$, $\{q_k\}$. Specifically, the following reconstruction formula will apply:

$$c_k^{j+1} = \sum_l \{p_{k-2l} c_l^j + q_{k-2l} d_l^j\} \tag{50}$$

As noted above, the convolution processes in decomposition process 48a inherently downsample the results by operation of the summation limits; similarly, the convolution processes in reconstruction process 134a results in an upsampling of the results by operation of equation (50).

Since the last convolutions in process 48a were taken in the columnar direction for the two-dimensional sequences, the first convolution processes 142, 144 in process 134a are also taken in the column-wise direction. Process 142 convolves, in the column-wise direction, the "LL" and "LH" components with reconstruction coefficient sequence $\{p_k\}$, which equals decomposition sequence $\{a_k\}$ used in process 48a hereinabove. As noted in equation (32) for the linear case, this sequence $\{a_k\}$ is defined as:

$$\{a_0, a_1, a_2\} = \frac{1}{4} \{1, 2, 1\}, a_k = 0 \text{ for all other } k \tag{32}$$

The ¼ term may be applied to the resultant data later, allowing the convolution of process 142 to be performed solely with integer values. In addition, the coefficient sequences "LL" and "LH" are inherently upsampled by a factor of two in the convolution of process 142, as noted above. The results of the two convolution operations of process 142 are summed into coefficient sequence $\{c^{j+1}\}$.

Similarly, process 144 is performed by way of which the "HL", "HH" component coefficient sequences are convolved, in column-wise fashion, with the reconstruction coefficient sequence $\{q_k\}$; as noted above, reconstruction coefficient sequence $\{q_k\}$ exactly equals decomposition sequence $\{b_k\}$ used in the decomposition of the input document. For the linear case, the sequence $\{b_k\}$ is specified in equation (33) as follows:

$$\{b_0, b_1, b_2, b_3, b_4\} = \frac{1}{24} \{1, -6, 10, -6, 1\}, b_k = 0 \text{ for all other } k \tag{33}$$

Again, the 1/24 division may be performed at a later time, to allow the convolution of process 144 to be performed using only integer values. This convolution will also effectively upsample the coefficient sequences as noted above, and the sum of the results of the two convolution operations of process 144 may be considered as coefficient sequence $\{d^{j+1}\}$.

The coefficient sequences $\{c^{j+1}\}$, $\{d^{j+1}\}$ produced by the column-wise convolution of processes 142, 144 are then stored in image memory 167, in process 145. Referring back to FIG. 9 for the example of a single pass decomposition and reconstruction, the coefficient sequences $\{c^{j+1}\}$, $\{d^{j+1}\}$ at this stage correspond to array 92.

Processes 146, 148 are then performed, by way of which the column-wise convolution results $\{c^{j+1}\}$, $\{d^{j+}\}$ are convolved in the row-wise direction. Process 146 convolves sequence $\{c^{j+1}\}$ in the row-wise direction with decomposition/reconstruction coefficient sequence $\{a_k\}$, while process 148 convolves sequence $\{d^{j+1}\}$ in the row-wise direction with decomposition/reconstruction coefficient sequence $\{b_k\}$. As in the prior convolution processes, an inherent upsampling occurs in these processes, due to the selected summation levels. The result of the convolution processes 146, 148, when summed, is the coefficient sequence $\{c^j\}$, which is then stored in image memory 167 in process 150. The resultant sequence $\{c^j\}$ at this stage of reconstruction, for the example of a single pass decomposition and reconstruction (i.e., j=0) corresponds to array 90 of FIG. 9. Decision 135 (FIG. 17) is then performed to determine if the value j at this point is equal to zero, in which case the document image has been fully reconstructed consistent with the information of the compression header described hereinabove, and processing will continue in the manner described hereinbelow.

b. Interpolatory wavelet reconstruction

As indicated hereinabove, reconstruction process 134b is used in the decompression of documents that were compressed according to the interpolatory wavelet decomposition process 48b described hereinabove. Also as described hereinabove, interpolatory wavelet decomposition process 48*b* is substantially identical to dual base wavelet decomposition process 48*a*, except that the decomposition sequences $\{a_n\}$, $\{b_n\}$ of equations (41) are used, incorporating the interpolatory spline function and its associated wavelet.

As indicated hereinabove, and in contrast to the dual base wavelet reconstruction process 134*b*, the reconstruction coefficient sequences $\{p_k\}$, $\{q_k\}$ for the interpolatory approach are different from the decomposition sequences $\{a_k\}$, $\{b_k\}$. Based on equation (42) described hereinabove, the reconstruction sequence $\{p_k\}$ for the interpolatory wavelets will have $p_{-1}=\frac{1}{2}$, $p_0=1$, and $p_1=\frac{1}{2}$ with all other values of p equal to zero; and based on equation (37), the reconstruction sequence $\{(q_k)\}$ will have only a single non-zero element, namely $q_1=1$, with all other values of q equal to zero.

Figure 20:
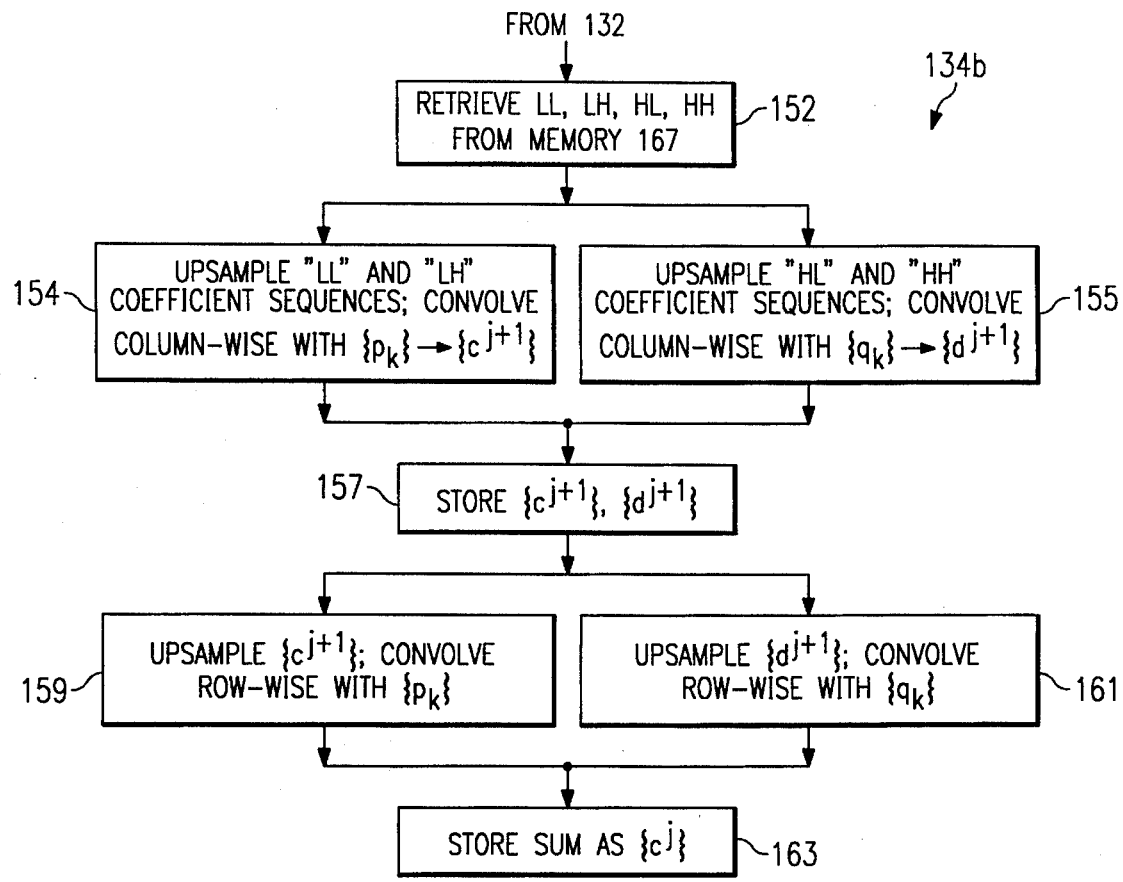
FIG. 20 is a flow diagram illustrating the procedure for spline-wavelet decomposition of a document according to a second alternative implementation of the invention, specifically the interpolatory wavelet technique.

FIG. 20 illustrates the operation of reconstruction process 134*b* according to the interpolatory wavelet technique. Process 152 retrieves coefficient sequences "LL", "LH", "HL" and "HH" from image memory 167; unlike process 134*a*, however, no transformation from dual space into spline space is required in this case, as no transformation into dual space was performed in the decomposition.

The reconstruction of process 134*b* also operates according to the reconstruction tree of FIG. 5*b*, in which the document component coefficient sequences are convolved with the reconstruction coefficient sequences $\{p_k\}$, $\{q_k\}$ defined hereinabove, according to the reconstruction formula of equation (50) hereinabove. In addition, just as the convolutions in decomposition process 48 inherently downsampled the results by operation of the summation limits; similarly, the convolution processes in reconstruction process 134*b* effectively upsample by operation of equation (50).

Similarly as in the case of process 134, process 134*b* first convolves the in the columnar direction for the two-dimensional sequences. Process 154 convolves, in the column-wise direction, the "LL" and "LH" components with reconstruction coefficient sequence $\{p_k\}$ which, in the linear case, equals $p_{-1}=\frac{1}{2}$, $p_0=1$, and $p_1=\frac{1}{2}$, with all other values of p equal to zero The ½ term may be applied to the resultant data later, allowing the convolution of process 154 to be performed solely with integer values. The (upsampled) results of the two convolution operations of process 154 are summed into coefficient sequence $\{c^{j+1}\}$. Similarly, process 155 is performed by way of which the "HL", "HH" component coefficient sequences are convolved, in column-wise fashion, with the reconstruction coefficient sequence $\{q_k\}$ which, in the linear case, equals $q_1=1$, with all other values of q equal to zero. The convolution of process 144 may thus be performed using only integer values. This convolution will also effectively upsample the coefficient sequences as noted above, and the sum of the results of the two convolution operations of process 155 may be considered as coefficient sequence $\{d^{j+1}\}$.

The coefficient sequences $\{c^{j+1}\}$, $\{d^{j+1}\}$ produced by the column-wise convolution of processes 154,155 are then stored in image memory 167, in process 157. Processes 159, 161 are then performed, by way of which the column-wise convolution results $\{c^{j+1}\}$, $\{d^{j+1}\}$ are convolved in the row-wise direction. Process 159 convolves sequence $\{c^{j+1}\}$ in the row-wise direction with reconstruction coefficient sequence $\{p_k\}$, while process 161 convolves sequence $\{d^{j+1}\}$ in the row-wise direction with reconstruction coefficient sequence $\{q_k\}$. As in the prior convolution processes, an inherent upsampling occurs in these processes, due to the selected summation levels. The result of the convolution processes 159, 161 when summed, is the coefficient sequence $\{c_j\}$, which is then stored in image memory 167 in process 163. Decision 135 (FIG. 17) is then performed to determine if the value j at this point is equal to zero, in which case the document image has been fully reconstructed and processing will continue in the manner described hereinbelow.

c. Wavelet packet reconstruction

For documents that were decomposed and compressed by way of the full-tree decomposition using wavelet packets of process 48*c*, reconstruction of the compressed document is performed by way of reconstruction process 134*c* which also operates according to wavelet packets. Wavelet packet reconstruction is governed by equation (49):

$$c^{k,l-1} = \sum_k \{p_{l-2k} c^{2k,l} + q_{l-2k} c^{2k+1,l}\} \quad (49)$$

Figure 21:
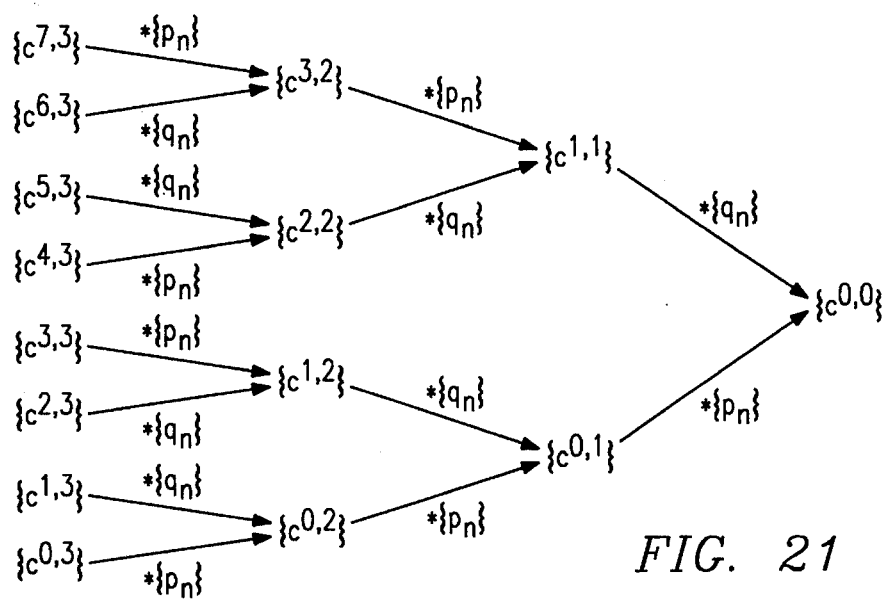
FIG. 21 illustrates the reconstruction tree for spline-wavelet reconstruction of a generalized document according to the wavelet packets process.

The full tree reconstruction process, for two-dimensional data, thus will follow in the manner illustrated in FIG. 21, which is the reverse of the full-tree decomposition of FIG. 11*a*. As before, the reconstruction of components into a high-frequency component reverses the spline and wavelet sequences, so that, in reconstructing a high pass component in the next level, the high-pass component will be convolved with spline function coefficient reconstruction sequence $\{p_k\}$ and the low-pass component will be convolved with wavelet function coefficient reconstruction sequence $\{q_k\}$. Similarly, reconstruction process 134*c* is the reverse of decomposition process 134*c* described hereinabove.

According to this embodiment of the invention, and for the wavelet packet decomposition sequences listed in Appendix A hereto, spline function coefficient reconstruction sequence $\{p_k\}$ and wavelet function coefficient reconstruction sequence $\{q_k\}$ are listed in Appendix B hereto.

Figure 22:
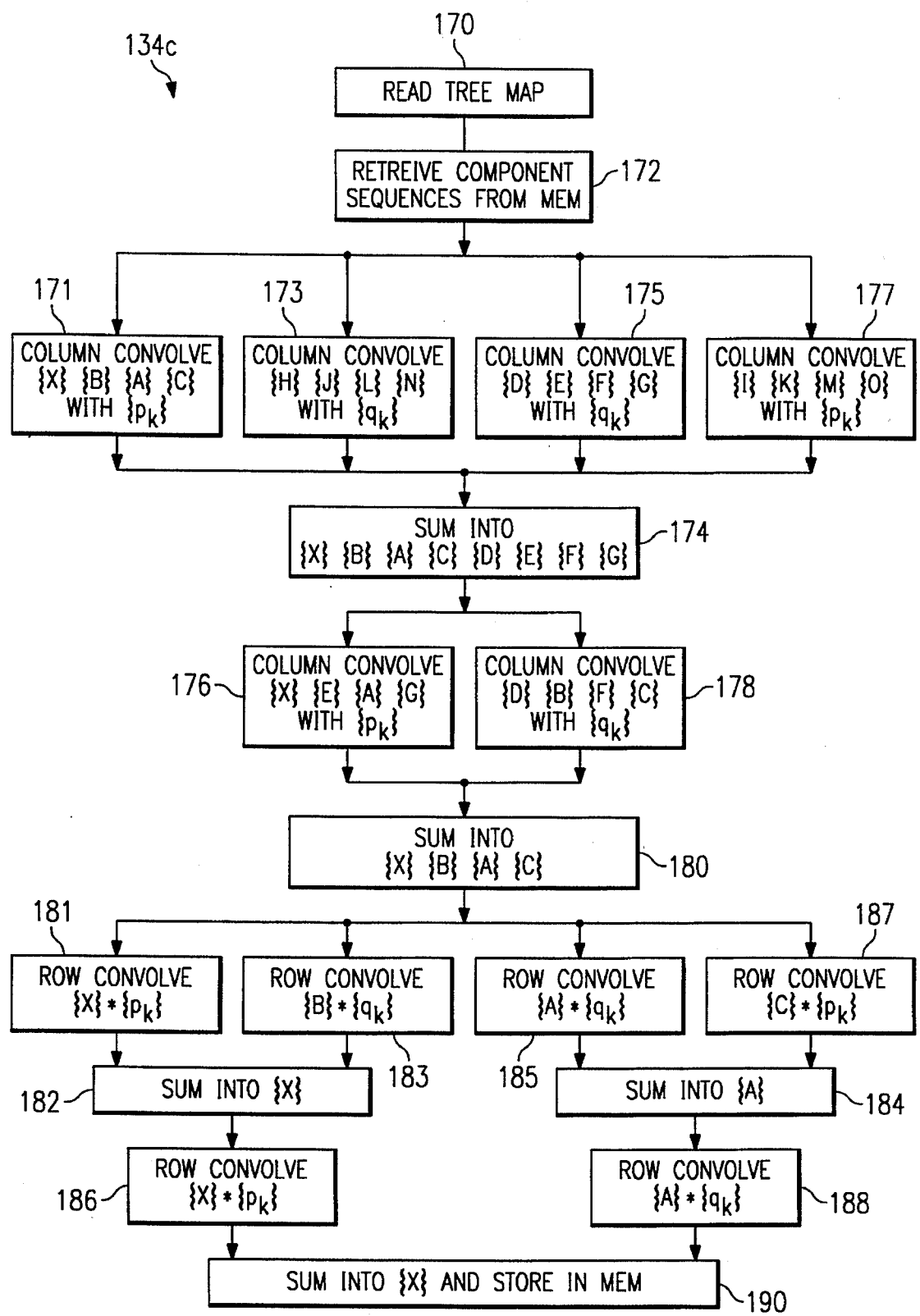
FIG. 22 is a flow diagram illustrating the procedure for spline-wavelet reconstruction of a document according to the wavelet packets technique.
Figure 23:
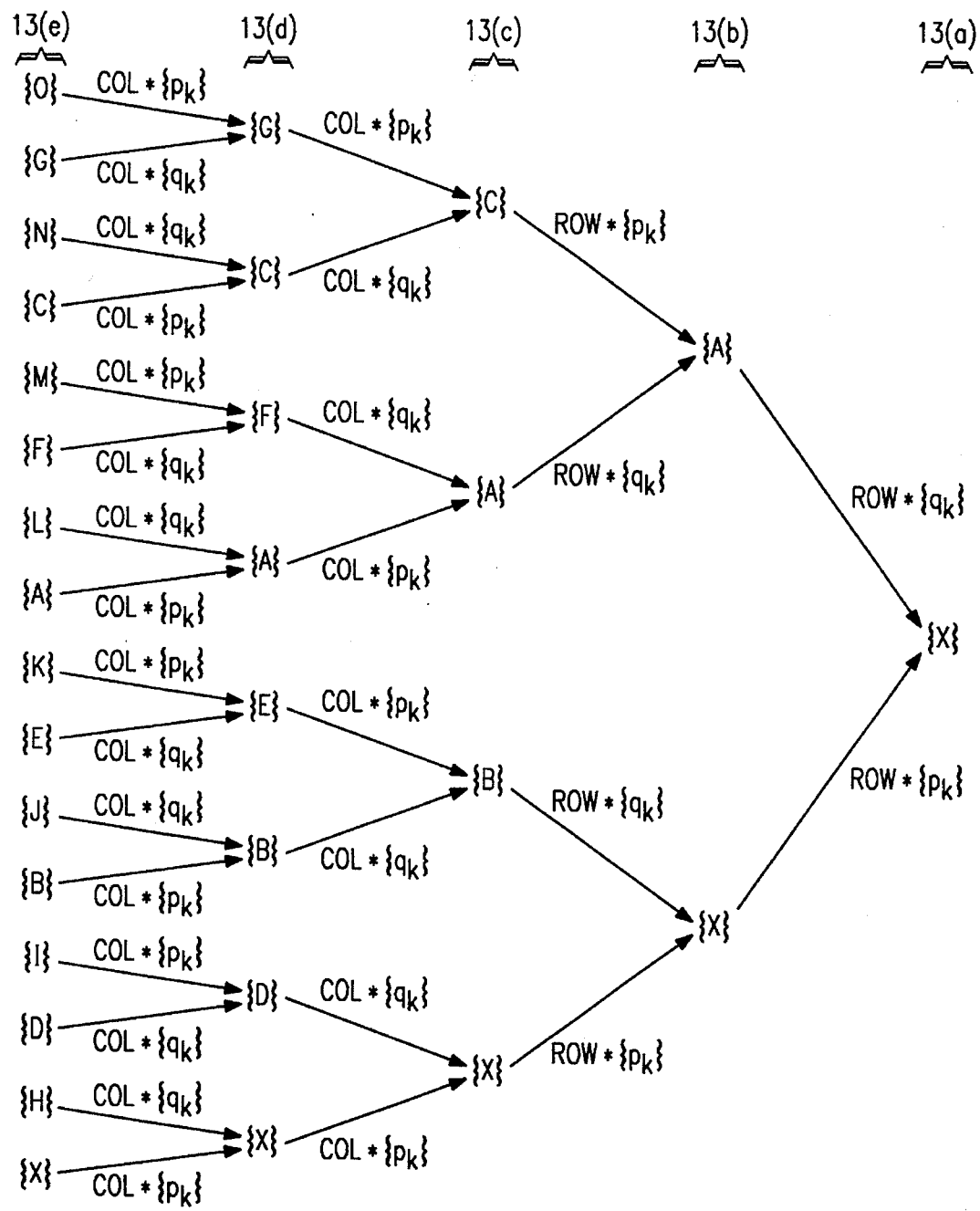
FIG. 23 illustrates the operation of the process of FIG. 22 in a tree diagram form, for an exemplary document.

Referring now to FIGS. 22 and 23, reconstruction process 134*c* according to this embodiment of the invention will now be described in detail; further reference is directed to FIGS. 13*a* through 13*e* for the array arrangement of the various wavelet packet components of the document image. Reconstruction begins with process 170, in which the tree map (FIG. 15) for the particular document is read and interpreted; in this way, decompressor 40 will operate only upon those components of the document image that are present, and can skip those components that are missing from the compressed document. Process 172 is then performed, in which DSP 160 retrieves component sequences from image memory 167 for convolution with reconstruction sequences $\{p_k\}$, $\{q_k\}$.

For purposes of explanation, reconstruction of the sequences of FIGS. 13*a* through 13*e* and 14 will now be described, relative to the flow diagram of FIG. 22 and the reconstruction tree of FIG. 23. This example will be described in the case where all components are present (i.e. no pruning of the decomposition tree was done); of course, if the tree map read in process 170 indicates that certain components were not produced in decomposition process 48*c*, those components will not be contemplated in the reconstruction.

Processes 171, 173, 175, 177 initiate the reconstruction by convolving the components in column-wise fashion. Specifically, process 171 convolves components $\{X\}$ (the blur image), $\{B\}$, $\{A\}$, and $\{C\}$ with spline reconstruction coefficient sequence $\}p_k\}$ in column-wise fashion, and process 173 convolves components $\{H\}$, $\{J\}$, $\{L\}$, $\{N\}$ with wavelet reconstruction coefficient sequence $\{q_k\}$ in column-wise fashion. Process 174 sums, in paired fashion, the results of processes 171, 173 to complete the upper-half (lower frequency) portion of the array in FIG. 13*d*; convolved components {X} and {H} are summed into component {X} of FIG. 13d, convolved components {B} and {J} are summed into component {B} of FIG. 13d, convolved components {A} and {L} are summed into component {A} of FIG. 13d, and convolved components {C} and {N} are summed into component {C} of FIG. 13d.

As described above in decomposition process 48c, higher-frequency components were decomposed by convolution of the spline and wavelet sequences in reverse order. Reconstruction process 134c thus must reconstruct higher-frequency components by convolution of their respective low- and high-frequency components with the reconstruction sequences also in reverse order. Process 175 thus convolves components {D}, {E}, {F}, and {G} with wavelet reconstruction coefficient sequence $\{q_k\}$ in column-wise fashion, and process 177 convolves components {I}, {K}, {M}, {O} with spline reconstruction coefficient sequence $\{p_k\}$ in column-wise fashion. Process 174 sums, in paired fashion, the results of processes 175, 172 to complete the lower-half (higher frequency) portion of the array in FIG. 13d. As such, convolved components {D} and {I} are summed into component {D} of FIG. 13d, convolved components {E} and {K} are summed into component {E} of FIG. 13d, convolved components {F} and {M} are summed into component {F} of FIG. 13d, and convolved components {G} and {O} are summed into component {G} of FIG. 13d. Upon completion of process 174, the array of FIG. 13d is reconstructed.

The next step of reconstruction is performed by a second set of column-wise convolutions in processes 176, 178. Process 176 convolves, column-wise, each of lower-frequency components {X} and {A} and higher-frequency components {E} and {G} with spline reconstruction coefficient sequence $\{P_k\}$, while process 178 column-wise convolves each of lower-frequency components {B} and {C} and higher-frequency components {D} and {F} with wavelet reconstruction coefficient sequence $\{q_k\}$. In process 180, the results of processes 176, 178 are summed in paired fashion, with convolved components {X} and {D} summed into component {X} of FIG. 13c, convolved components {B} and {E} summed into component {B} of FIG. 13c, convolved components {A} and {F} summed into component {A} of FIG. 13c, and convolved components {C} and {G} summed into component {C} of FIG. 13c.

Row-wise convolution operations are now to be performed to reconstruct the original image. Process 181 convolves component sequence {X} (the blur image) in row-wise fashion with spline reconstruction coefficient sequence $\{p_k\}$ and process 183 convolves component sequence {B} in row-wise fashion with wavelet reconstruction coefficient sequence $\{q_k\}$. Process 186 sums the results of processes 181, 183 into component sequence {X} of FIG. 13b (i.e., the left-half-array). Similarly, process 185 convolves component sequence {A} in row-wise fashion with wavelet reconstruction coefficient sequence $\{q_k\}$ and process 187 convolves component sequence {c} in row-wise fashion with spline reconstruction coefficient sequence $\{p_k\}$. Process 184 sums the results of processes 185, 187 into component sequence {A} of FIG. 13b (i.e., the right-half-array).

The reconstruction operation of process 134c is completed, for this level of reconstruction, by the row-wise convolution of component sequence {X} with spline reconstruction coefficient sequence $\{p_k\}$ in process 186, and by the row-wise convolution of component sequence {A} with wavelet reconstruction coefficient sequence $\{q_k\}$ in process 188. Process 190 sums the results of processes 186, 188 into the document image {X}, and stores these results in image memory 167.

d. Completion of reconstruction

Referring back to FIG. 17, upon completion of the selected one of reconstruction processes 134a, 134b, 134c, decision 135 is performed under the direction of data controller 156 to determine if the document has been fully reconstructed according to the header compression information described hereinabove. For example, if the results of the completed process 134a, 134b, 134c returns a document that has a compression ratio, relative to the input document, of 1:1, spline-wavelet reconstruction process 134 is complete and decision 135 will pass control to process 136. In contrast, if in compression the decomposition process 48 was repeated to further compress the document, and thus if the compression ratio of the document image at the end of process 134 (e.g., at the first pass therethrough) relative to the input document is greater than 1:1, spline-wavelet reconstruction is not complete, and decision 135 will return control to dequantization process 132 for repetition of the appropriate spline-wavelet process 134.

Upon full reconstruction being reached (decision 135 returning a YES result), DSP 160 passes the results to data controller 156 for presentation to format converter 32 of decompression system 30 (FIG. 1). Format converter 32 is similarly constructed as format converter 12 discussed hereinabove, to perform the inverse operations of byte expansion and formatting for display. As discussed above, the document image data may have been byte-packed prior to spline-wavelet decompression, in which case byte-expansion process 136 will be necessary to recover the document. As such, format converter 32 will perform the necessary operations, according to information transmitted with the data that indicates the type of bytepacking performed and the numbers of bits per pixel of data that are to represent the decompressed document. Format converter 138 also performs format conversion process 138, in which the decompressed document is reformatted for display in the manner appropriate for the particular output medium (e.g., graphics display, printer output, disk storage in decompressed form, etc.). The reconstruction process is then complete, and the data may be presented in the desired manner.

4. Conclusion

The methods and systems for compressing and decompressing document image data described hereinabove relative to the present invention provide important advantages, as noted throughout the foregoing specification. These advantages include the fundamental benefits of wavelet analysis, where time-frequency localization of the input signal is implemented so that the time window narrows with increasing frequency and widens with decreasing frequency, thus providing highly accurate analysis for transient periods of the signal.

In addition, the document image compression and decompression techniques according to the preferred embodiments of the invention, in using spline-wavelet functions that have compact support, avoid boundary effect artifacts in the compressed documents. By avoiding boundary effects, the present invention greatly improves the accuracy of the reconstructed compressed document (relative to the input document), and also enables parallel processing (or computing) to be applied in the decomposition process by cutting the document into small pieces and, after reconstruction, piecing together the full image. Using the B-spline as the scaling function also provides display functions such as magnification and compression ("zoom-in" and "zoom-out") in the display of the reconstructed document. The usefulness of the reconstructed document, and thus the entire system, in allowing interactive display of the received or retrieved document is therefore much improved over conventional document compression and decompression systems.

In addition, it will have been appreciated that the present invention allows the compression and reconstruction operations to be done strictly with integer operations. As such, both compression and reconstruction operations according to the present invention may be done more efficiently, for a given compression ratio, than can conventional document compression and reconstruction processes. The ability to use integer operations also enables these processes to be performed with moderate performance data processing equipment, thus allowing wide-spread use of the present invention, as high-performance workstations are not necessarily required to practice the present invention.

Further, the present invention allows for several choices of compression and decompression routines, depending upon the desired tradeoff between processing complexity and document quality. It is therefore contemplated that the present invention will provide the industry with great flexibility in its implementation.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

APPENDIX B-continued

| | m = 2 | | m = 4 | |
|---|---|---|---|---|
| k | $p_k$ | $q_{k+1}$ | $p_{k+1}$ | $q_{k+4}$ |
| 3 | | $\frac{2}{4!}$ | $\frac{1}{8}$ | $-\frac{7904}{8!}$ |
| 4 | | | | $\frac{1677}{8!}$ |
| 5 | | | | $-\frac{124}{8!}$ |
| 6 | | | | $\frac{1}{8!}$ |

We claim:

1. A method of compressing digital data representative of a document, comprising the steps of:

formatting digital data corresponding to an image of the document into a two-dimensional array of digital values, each value corresponding to the appearance of the document at a corresponding location of the document;

performing a first decomposing of the array of digital values, in a first direction, into low-frequency and high-frequency portions by performing integer operations using a decomposition scaling function and a corresponding decomposition wavelet function, respectively, each of said decomposition scaling and wavelet functions described by a finite integer sequence of coefficients, the first decomposing step comprising the substeps of:

convolving the array, in the first direction, with a sequence of integer corresponding to the decomposition scaling function;

convolving the array, in the first direction, with a sequence of integers corresponding to the decomposition wavelet function; and storing the results of the convolving substeps in memory as an array of first decomposed sequences;

APPENDIX A

| | m = 2 | | m = 4 | |
|---|---|---|---|---|
| k | $a_k$ | $b_{k+1}$ | $a_{k+1}$ | $b_{k+4}$ |
| 1 | 0.683012701892 | 0.866025403784 | 0.893162856314 | −1.475394519892 |
| 2 | 0.316987298108 | −0.316987298108 | 0.400680825467 | 0.468422596633 |
| 3 | −0.116025403794 | −0.232050807569 | −0.282211870811 | 0.742097698477 |
| 4 | −0.084936490539 | 0.084936490539 | −0.232924626134 | −0.345770890775 |
| 5 | 0.031089913246 | 0.062177826491 | 0.129083571218 | −0.389745580800 |
| 6 | 0.022758664048 | −0.022758664047 | 0.126457446356 | 0.196794277304 |
| 7 | −0.008330249198 | −0.016660498395 | −0.066420837387 | 0.207690838380 |
| 8 | −0.006098165652 | 0.006098165652 | −0.067903608499 | −0.106775803373 |
| 9 | 0.002232083545 | 0.004464167091 | 0.035226101674 | −0.111058440711 |
| 10 | 0.001633998562 | −0.001633998561 | 0.036373586989 | 0.057330952254 |
| 11 | −0.000598084983 | −0.001196169967 | −0.018815686621 | 0.059433388390 |
| 12 | −0.000437828595 | 0.000437828595 | −0.019473269356 | −0.030709700871 |
| 13 | 0.000160256388 | 0.000320512777 | 0.010066747520 | −0.031811811318 |
| 14 | 0.000117315818 | −0.000117315818 | 0.010424052187 | 0.016440944687 |
| 15 | −0.000042940569 | −0.000085881139 | −0.005387929819 | 0.017028029466 |
| 16 | −0.000031434679 | 0.000031434678 | −0.005579839208 | −0.008800839839 |
| 17 | 0.000011505891 | 0.000023011782 | 0.002883979478 | −0.009114745138 |
| 18 | 0.000008422897 | −0.000008422897 | 0.002986784625 | 0.004710957034 |
| 19 | −0.000003082990 | −0.000006165980 | −0.001543728719 | 0.004878941541 |
| 20 | −0.000002256905 | 0.0000022569054 | −0.001598768083 | −0.002521687975 |
| 21 | 0.000000826079 | 0.0000016521587 | 0.000826326663 | −0.002611601542 |

APPENDIX B

| | m = 2 | | m = 4 | |
|---|---|---|---|---|
| k | $p_k$ | $q_{k+1}$ | $p_{k+1}$ | $q_{k+4}$ |
| 1 | $\frac{2}{2}$ | $\frac{20}{4!}$ | $\frac{6}{8}$ | $-\frac{24264}{8!}$ |
| 2 | $\frac{1}{2}$ | $-\frac{12}{4!}$ | $\frac{4}{8}$ | $\frac{18482}{8!}$ | performing a second decomposing of the results of the first decomposing step in a second direction, by performing integer operations using the decomposition scaling and wavelet functions, the second decomposing step comprising the substeps of:

convolving the array. of first decomposed sequences, in the second direction, with the sequence of integers corresponding to the decomposition scaling function;

convolving the array of first decomposed sequences, in the second direction, with the sequence of integers corresponding to the decomposition wavelet function; and storing the results of the convolving substeps in memory as an array of second decomposed sequences; and communicating the results of the decomposing steps to a receiving unit.

2. The method of claim 1, wherein said communicating step comprises:

storing the results of the decomposing steps in a memory.

3. The method of claim 1, wherein said communicating step comprises:

transmitting the results of the decomposing steps to a decompression system.

4. The method of claim 3, further comprising:

after the transmitting step, operating the decompression system-to perform a first reconstructing of the transmitted results in the second direction, by performing integer operations using a reconstruction scaling function and a reconstruction wavelet function, said scaling and wavelet functions described by finite integer sequences of coefficients, the first reconstructing step comprising the substeps of:

convolving, in the second direction, a low frequency portion of the transmitted results with a sequence of integers corresponding to the reconstruction scaling function;

convolving, in the second direction, a high frequency portion of the transmitted results with a sequence of integers corresponding to the reconstruction wavelet function; and summing the results of the convolving substeps into an array of first reconstructed sequences having a low frequency portion and a high frequency portion;

operating the decompression system to perform a second reconstructing of the array of first reconstructed sequences in the first direction, by performing integer operations using the reconstruction scaling function and the reconstruction wavelet function, the second reconstructing step comprising the substeps of:

convolving, in the first direction, the low frequency portion of the array of first reconstructed sequences with a sequence of integers corresponding to the reconstruction scaling function;

convolving, in the first direction, the high frequency portion of the array of first reconstructed sequences with a sequence of integers corresponding to the reconstruction wavelet function; and summing the results of the convolving substeps into an array of second reconstructed sequences; and generating a visual output of the results of the reconstructing steps.

5. The method of claim 4, wherein the reconstruction scaling function is equal to the decomposition scaling function, and wherein the reconstruction wavelet function is equal to the decomposition wavelet function.

6. The method of claim 1, further comprising:

before the first decomposing step, projecting the two-dimensional array of digital values into a dual spline approximation coefficient array;

and wherein said first and second decomposing steps are performed using a dual decomposition scaling function and a dual decomposition wavelet function.

7. The method of claim 1, wherein the decomposition scaling function is a centralized B-spline scaling function;

and wherein the decomposition wavelet function is an interpolatory wavelet function corresponding to the centralized B-spline scaling function.

8. The method of claim 1, wherein the results of the second decomposing step comprise:

an LL component, corresponding to the low-frequency component, taken in the second direction, of the low-frequency decomposition in the first direction of the first decomposing step;

an LH component, corresponding to the high-frequency component, taken in the second direction, of the low-frequency decomposition in the first direction of the first decomposing step;

an HL component, corresponding to the low-frequency component, taken in the second direction, of the high-frequency decomposition in the first direction of the first decomposing step; and an HH component, corresponding to the highfrequency component, taken in the second direction, of the high-frequency decomposition in the first direction of the first decomposing step;

and further comprising:

quantizing the LH, HL, and HH components prior to said communicating step.

9. The method of claim 8, further comprising:

after said quantizing step and prior to said communicating step, performing lossless compression on the LL, LH, HL, and HH components.

10. The method of claim 1, wherein said formatting step comprises:

substituting at least first and second digital values for display attributes corresponding to the image of the document, to generate a substituted array of the at least first and second digital values; and after said substituting step, byte-packing the substituted array.

11. The method of claim 10, wherein said substituting step substitutes at least first, second and third digital values for display attributes corresponding to the image of the document.

12. The method of claim 1, wherein each of the decomposition scaling function and the decomposition wavelet function does not require support from outside of the array.

13. The method of claim 1, wherein each integer sequence of coefficients expressing the decomposition scaling function and the decomposition wavelet function is symmetric.

14. The method of claim 1, further comprising:

prior to the communicating step, repeating the steps of performing a first decomposing and a second decomposing upon the array of second decomposed sequences.

15. A method of compressing digital data representative of a document, comprising the steps of:

formatting digital data corresponding to an image of the document into a two-dimensional array of digital values, each value corresponding to the appearance of the document at a corresponding location of the document;

performing a first decomposing of the array of digital values, in a first direction, into low-frequency and high-frequency portions using a decomposition scaling function and a corresponding decomposition wavelet function, respectively, wherein the decomposition scaling function and decomposition wavelet functions are based upon non-orthogonal, symmetric, spline-based wavelet packets, the first decomposing step comprising the substeps of:

(a) decomposing the array of digital values, in the first direction, into a first low-frequency portion and a first high-frequency portion using the decomposition scaling function and the decomposition wavelet function, respectively;

(b) decomposing the first low-frequency portion, in the first direction, into a low-low frequency portion and a low-high-frequency portion using the decomposition scaling function and the decomposition wavelet function, respectively; and (c) decomposing the high-frequency portion from substep (a), in the first direction, into a high-low-frequency portion and a high-high-frequency portion using the decomposition wavelet function and the decomposition scaling function, respectively;

performing a second decomposing of the results of the first decomposing step in a second direction, using the decomposition scaling and wavelet functions, the second decomposing step comprising the substeps of:

(d) decomposing the results of the first decomposing step, in the second direction, into a plurality of second-stage low-frequency portions and a plurality of second-stage high-frequency portion using the decomposition scaling function and the decomposition wavelet function, respectively;

(e) decomposing the plurality of second stage low-frequency portions from step (d), in the second direction, into a first plurality of third-stage low-frequency portions and a first plurality of third-stage high-frequency portions using the decomposition scaling function and the decomposition wavelet function, respectively; and (f) decomposing the plurality of second stage high-frequency portion from the step (e), in the second direction, into a second plurality of third-stage low-frequency portions and a second plurality of third-stage high-frequency portions using the decomposition wavelet function and the decomposition scaling function, respectively; and communicating the results of the decomposing steps to a receiving unit.

16. The method of claim 15, further comprising:

before the communicating steps, repeating the steps of performing a first decomposing and performing a second decomposing upon the second plurality of third-stage low-frequency portions and a second plurality of third-stage high-frequency portions.

17. A method of displaying compressed document image data, comprising:

receiving compressed image data corresponding to a document and storing the compressed image data in memory, said compressed image data arranged as blur and high-frequency coefficient sequences;

in a first image direction, applying a reconstruction scaling function and a reconstruction wavelet function, each of said reconstruction scaling function and reconstruction wavelet function described by a finite integer sequence of coefficients so that the applying is performed by using integer operations, to the compressed image data to reconstruct a low-frequency component and a high-frequency component, the applying step in the first direction comprising the substeps of:

convolving, in the first direction, the blur coefficient sequences of the transmitted results with a sequence of integers corresponding to the reconstruction scaling function;

convolving, in the first direction, the high frequency coefficient sequences of the transmitted results with a sequence of integers corresponding to the reconstruction wavelet function; and summing the results of the convolving substeps into an array of first reconstructed sequences having a low frequency component and a high frequency component;

in a second image direction, applying the reconstruction scaling function and the reconstruction wavelet function to the reconstructed low-frequency component and high-frequency component, respectively, using integer operations, to reconstruct the document image, the applying step in the second image direction comprising the substeps of:

convolving, in the second direction, the low frequency component of the array of first reconstructed sequences with a sequence of integers corresponding to the reconstruction scaling function;

convolving, in the second direction, the high frequency component of the array of first reconstructed sequences with a sequence of integers corresponding to the reconstruction wavelet function; and summing the results of the convolving substeps into an array of second reconstructed sequences; and displaying the reconstructed document image.

18. The method of claim 17, further comprising:

before the displaying step, repeating said steps of applying the reconstruction scaling function and the reconstruction wavelet function in the first and second image directions.

19. The method of claim 17, further comprising:

performing lossless decompression on the compressed document image data, prior to said applying steps.

20. The method of claim 17, further comprising:

transforming the compressed image data into dual spline coefficient sequences;

and wherein said first and second decomposing steps are performed using the dual decomposition scaling function and the dual decomposition wavelet function.

21. The method of claim 17, wherein the reconstruction scaling function is a centralized B-spline scaling function;

and wherein the reconstruction wavelet function is an interpolatory wavelet function corresponding to the centralized B-spline scaling function.

22. The method of claim 17, wherein each of the reconstruction scaling function and the reconstruction wavelet function does not require support from outside of the array.

23. The method of claim 17, wherein each integer sequence of coefficients expressing the reconstruction scaling function and the reconstruction wavelet function is symmetric.

24. A method of displaying compressed image data contained within first and second groups of coefficient sequences, each of the first and second groups having at least one non-zero coefficient sequence therein, comprising the steps of:

receiving compressed image data corresponding to a document and storing the compressed image data in memory;

in a first image direction, applying a reconstruction scaling function and a reconstruction wavelet function to the compressed image data, wherein the reconstruction scaling and wavelet functions are based upon non-orthogonal, symmetric, spline-based wavelet packets, wherein the step of applying the reconstruction scaling and wavelet functions in a first image direction comprises the substeps of:

convolving the reconstruction scaling function with the first group of coefficient sequences, in the first image direction;

convolving the reconstruction wavelet function with the second group of coefficient sequences, in the first image direction;

after the convolving steps, summing each of the first group of coefficient sequences to an associated one of the second group of coefficient sequences, to produce third and fourth groups of coefficient sequences, each having at least one non-zero coefficient sequence;

after the summing step, convolving the reconstruction scaling function with the third group of coefficient sequences, in the first image direction;

convolving the reconstruction wavelet function with the fourth group of coefficient sequences, in the first image direction; and then summing each of the third group of coefficient sequences to an associated one of the fourth group of coefficient sequences, to produce fifth and sixth groups of coefficient sequences, each having at least one non-zero coefficient sequence;

in a second image direction, applying the reconstruction scaling and wavelet functions in a second direction by the substeps of:

convolving the reconstruction scaling function with the fifth group of coefficient sequences, in the second image direction;

convolving the reconstruction wavelet function with the sixth group of coefficient sequences, in the second image direction;

after the convolving steps, summing each of the fifth group of coefficient sequences to an associated one of the sixth group of coefficient sequences, to produce a low-frequency component and a high-frequency component of the document image;

after the summing step, convolving the reconstruction scaling function with the low-frequency component of the document image, in the second image direction;

convolving the reconstruction wavelet function with the high-frequency component of the document image, in the second image direction; and then summing the low-frequency and high-frequency components to produce an array corresponding to the document image; and displaying the reconstructed document image.

25. The method of claim 24, further comprising:

before the step of applying a reconstruction scaling function and a reconstruction wavelet function in a first image direction, reading a tree map in the compressed image data to determine the ones of the first and second groups of coefficient sequences that are present in the compressed image data.

26. A system for communicating image information corresponding to documents, comprising:

an input source for providing digital image information corresponding to a document to be communicated; and compressor circuitry having an input coupled to said input source, for decomposing each frame of digital image information in a first image direction, by performing finite integer matrix multiplications of the digital image information using a scaling function and a corresponding wavelet function that are described by finite integer sequences of coefficients, into a first low-frequency component and a first high-frequency component, by performing the operations of:

convolving a frame, in the first image direction, with a sequence of integers corresponding to the decomposition scaling function;

convolving the frame, in the first image direction, with a sequence of integers corresponding to the decomposition wavelet function; and storing the results of the convolving operations in memory as an array containing the first low-frequency component and the first high-frequency component;

and for then further decomposing each of said low-frequency and high-frequency components of each frame of digital video image information in a second image direction, by performing finite integer matrix multiplications of the first low-frequency and high-frequency components using the scaling function and the corresponding wavelet function, into first and second pairs of low-frequency and second high-frequency components, said first pair being the decomposed representation of said first low-frequency component and said second pair corresponding to a decomposed representation of said first high-frequency component, by performing the operations of:

convolving each of the first low-frequency and high-frequency components, in the second image direction, with the sequence of integers corresponding to the decomposition scaling function;

convolving each of the first low-frequency and high-frequency components, in the second image direction, with the sequence of integers corresponding to the decomposition wavelet function; and storing the results of the convolving operations in memory as an array of the first and second pairs of low-frequency and high-frequency components;

said compressor circuitry also having an output for presenting the first and second pairs of low-frequency and high-frequency components.

27. The system of claim 26, further comprising:

a format converter circuit coupled between said input source and said compressor, for converting the digital input video information into a portable gray-level format.

28. The system of claim 27, wherein the format converter circuit comprises circuitry for byte-packing data corresponding to image data received from the input source.

29. The system of claim 28, wherein said input source provides color document information;

and wherein said byte-packing circuitry performs byte-packing of data containing more than one bit per picture element of the document.

30. The system of claim 26, wherein said compressor circuitry comprises:

decomposing circuitry for performing the decomposing of each frame of digital image information into the first and second pairs of low-frequency and high-frequency components;

quantization circuitry for quantizing the high-frequency component of said first pair, and for quantizing both the low-frequency and the high-frequency components of the second pair; and lossless compression circuitry, having an input coupled to said quantization circuitry, for performing lossless compression of the first and second low-frequency and high-frequency pairs, prior to presenting the decomposed flames of digital video image information at the output of the compressor circuitry.

31. The system of claim 30, further comprising:

main controller circuitry, for controlling the operation of the decomposing circuitry, so that the low-frequency component of said first pair may be repetitively provided to the decomposing circuitry for further decomposing.

32. The system of claim 26, wherein said compressor circuitry comprises:

an image buffer coupled to the input of the compressor circuitry for storing a frame of digital video image information; and a digital processor for performing the decomposing of each frame of digital image information into the first and second pairs of low-frequency and high-frequency components by performing finite integer matrix multiplications of the digital image information using a scaling function and a corresponding wavelet function that do not require support outside of the digital image interval.

33. The system of claim 32, wherein said digital processor operates according to matrix operations using precalculated matrices corresponding to spline and wavelet function coefficient sequences stored in said compressor circuitry.

34. The system of claim 33, further comprising:

a communications network coupled to the output of the compressor circuitry;

decompressor circuitry, having an input coupled to said communications network, for reconstructing the decomposed digital image information in the second image direction by performing finite integer matrix multiplications of the digital image information using a reconstruction scaling function and a corresponding reconstruction wavelet function, by performing the operations of:
- convolving, in the second image direction, a low frequency portion of the decomposed digital image information with a sequence of integers corresponding to the reconstruction scaling function;
- convolving, in the second image direction, a high frequency portion of the transmitted results with a sequence of integers corresponding to the reconstruction wavelet function; and
- summing the results of the convolving operations into an array of first reconstructed sequences having a low frequency portion and a high frequency portion;

and for then further reconstructing the array of first reconstructed sequences in the first image direction by performing finite integer matrix multiplications of the digital image information using the reconstruction scaling and wavelet functions by performing the operations of:
- convolving, in the first image direction, the low frequency portion of the array of first reconstructed sequences with a sequence of integers corresponding to the reconstruction scaling function;
- convolving, in the first image direction, the high frequency portion of the array of first reconstructed sequences with a sequence of integers corresponding to the reconstruction wavelet function; and
- summing the results of the convolving operations into an array of second reconstructed sequences; and means for displaying the reconstructed frames of digital image information.

35. The system of claim 26, wherein each of the scaling function and the corresponding wavelet function does not require support from outside of the array.

36. The system of claim 26, wherein each of the integer sequences of coefficients is symmetric.

37. The method of claim 24, further comprising:

before the displaying step, repeating the steps of applying a reconstruction scaling function and a reconstruction wavelet function in a first image direction and of applying a reconstruction scaling function and a reconstruction wavelet function in a second image direction.

38. A system for displaying compressed image data corresponding to a document, comprising:

a memory for storing the compressed image data;

decompressor circuitry for reconstructing the compressed image data in a first image direction by performing finite integer matrix multiplications of the digital image information using a reconstruction scaling function and a corresponding reconstruction wavelet function that are described by finite integer sequences of coefficients, by performing the operations of:
- convolving, in the first image direction, a low frequency portion of the compressed image data with a sequence of integers corresponding to the reconstruction scaling function;
- convolving, in the first image direction, a high frequency portion of the compressed image data with a sequence of integers corresponding to the reconstruction wavelet function; and
- summing the results of the convolving operations into an array of first reconstructed sequences having a low frequency portion and a high frequency portion;

and for then further reconstructing the compressed image data in a second image direction by performing finite integer matrix multiplications of the array of first reconstructed sequences using the reconstruction scaling and wavelet functions by performing the operations of:
- convolving, in the second image direction, the low frequency portion of the array of first reconstructed sequences with a sequence of integers corresponding to the reconstruction scaling function;
- convolving, in the second image direction, the high frequency portion of the array of first reconstructed sequences with a sequence of integers corresponding to the reconstruction wavelet function; and
- summing the results of the convolving operations into an array of second reconstructed sequences; and means, coupled to said decompressor circuitry, for outputting the reconstructed compressed image data.

39. The system of claim 38, wherein said memory is coupled to a communications network.

40. The system of claim 38, wherein said decompressor circuitry comprises:

a digital processor coupled to said memory, for reconstructing the digital image information using precalculated matrices of integers.

41. The system of claim 38, wherein each of the reconstruction scaling function and the corresponding reconstruction wavelet function does not require support from outside of the array.

42. The system of claim 38, wherein each of the integer sequences of coefficients is symmetric.

* * * * *